United States Patent
Cielak et al.

(10) Patent No.: US 12,041,287 B2
(45) Date of Patent: Jul. 16, 2024

(54) USER INTERFACES AND ASSOCIATED SYSTEMS AND PROCESSES FOR ACCESSING CONTENT ITEMS VIA CONTENT DELIVERY SERVICES

(71) Applicant: Apple Inc., Cupertino, CA (US)

(72) Inventors: Matthew J. Cielak, Seattle, WA (US); Niraj S. Shah, Oakland, CA (US); Daniel J. Tobolic, San Francisco, CA (US); Andrew J. Leung, Los Angeles, CA (US); Tiffany S. Reese, Cupertino, CA (US); Drew R. Domm, Oakland, CA (US); Evan Mills, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/931,715

(22) Filed: Sep. 13, 2022

(65) Prior Publication Data

US 2023/0082875 A1    Mar. 16, 2023

Related U.S. Application Data

(60) Provisional application No. 63/243,582, filed on Sep. 13, 2021.

(51) Int. Cl.
*H04N 21/2668* (2011.01)
*H04N 21/258* (2011.01)
*H04N 21/472* (2011.01)

(52) U.S. Cl.
CPC ... *H04N 21/2668* (2013.01); *H04N 21/25866* (2013.01); *H04N 21/47217* (2013.01)

(58) Field of Classification Search
None
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |

(Continued)

FOREIGN PATENT DOCUMENTS

| | | |
|---|---|---|
| WO | 2013/169849 A2 | 11/2013 |
| WO | 2014/105276 A1 | 7/2014 |

*Primary Examiner* — Jason K Lin
(74) *Attorney, Agent, or Firm* — Kubota & Basol LLP

(57) ABSTRACT

In some embodiments, an electronic device facilitates processes for subscribing to a content delivery service. For example, the electronic device subscribes to a voice-only subscription to a content delivery service or a voice and non-voice subscription to the content delivery service. In some embodiments, the electronic device accesses content items via a content delivery service.

45 Claims, 37 Drawing Sheets

(56) References Cited

U.S. PATENT DOCUMENTS

| | | |
|---|---|---|
| 9,348,458 B2 | 5/2016 | Hotelling et al. |
| 9,933,937 B2 | 4/2018 | Lemay et al. |
| 10,079,872 B1* | 9/2018 | Thomas ................ H04M 15/80 |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2009/0144789 A1* | 6/2009 | Yu ...................... H04N 21/4334 |
| | | 725/110 |
| 2014/0181855 A1* | 6/2014 | Fife ................... H04N 21/6543 |
| | | 725/25 |
| 2015/0382047 A1* | 12/2015 | Van Os .............. H04N 21/4316 |
| | | 725/38 |

* cited by examiner

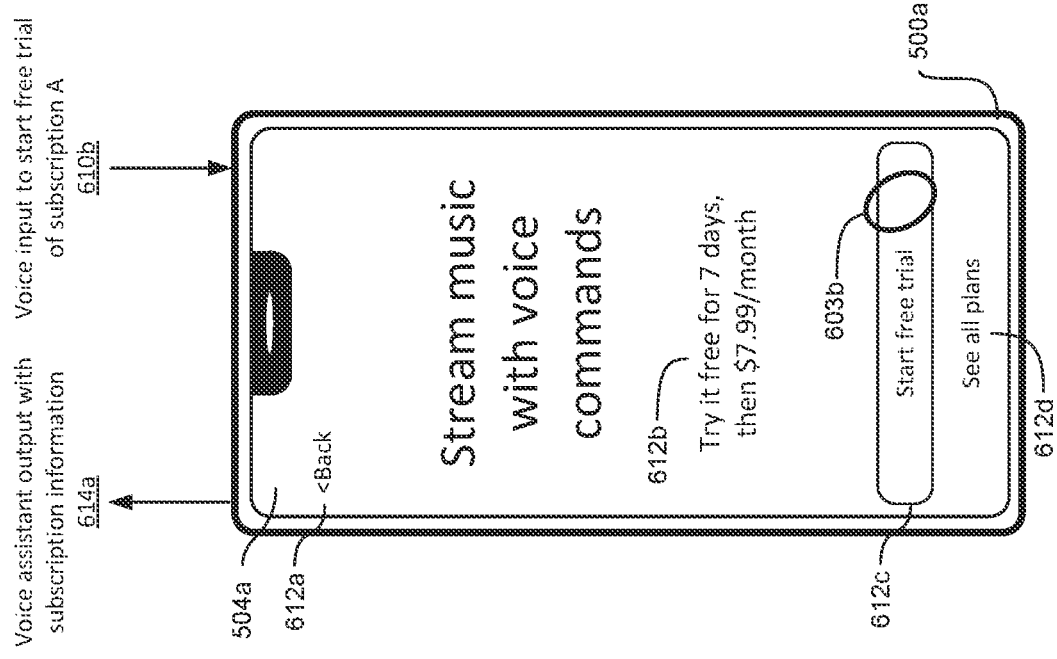
FIG. 6B   No subscription
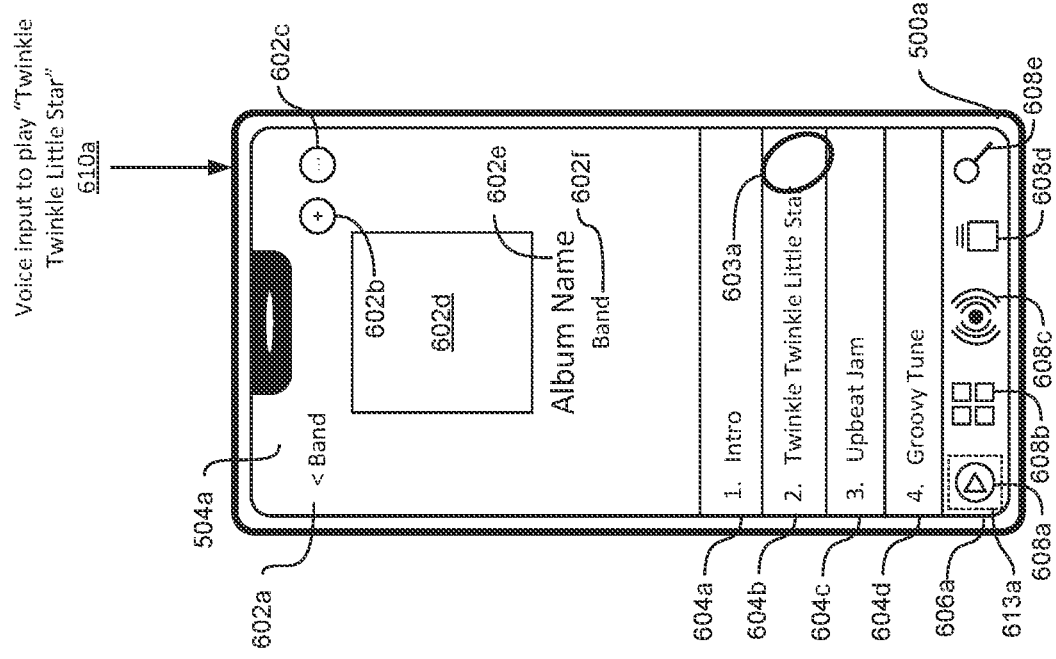
FIG. 6A   No subscription

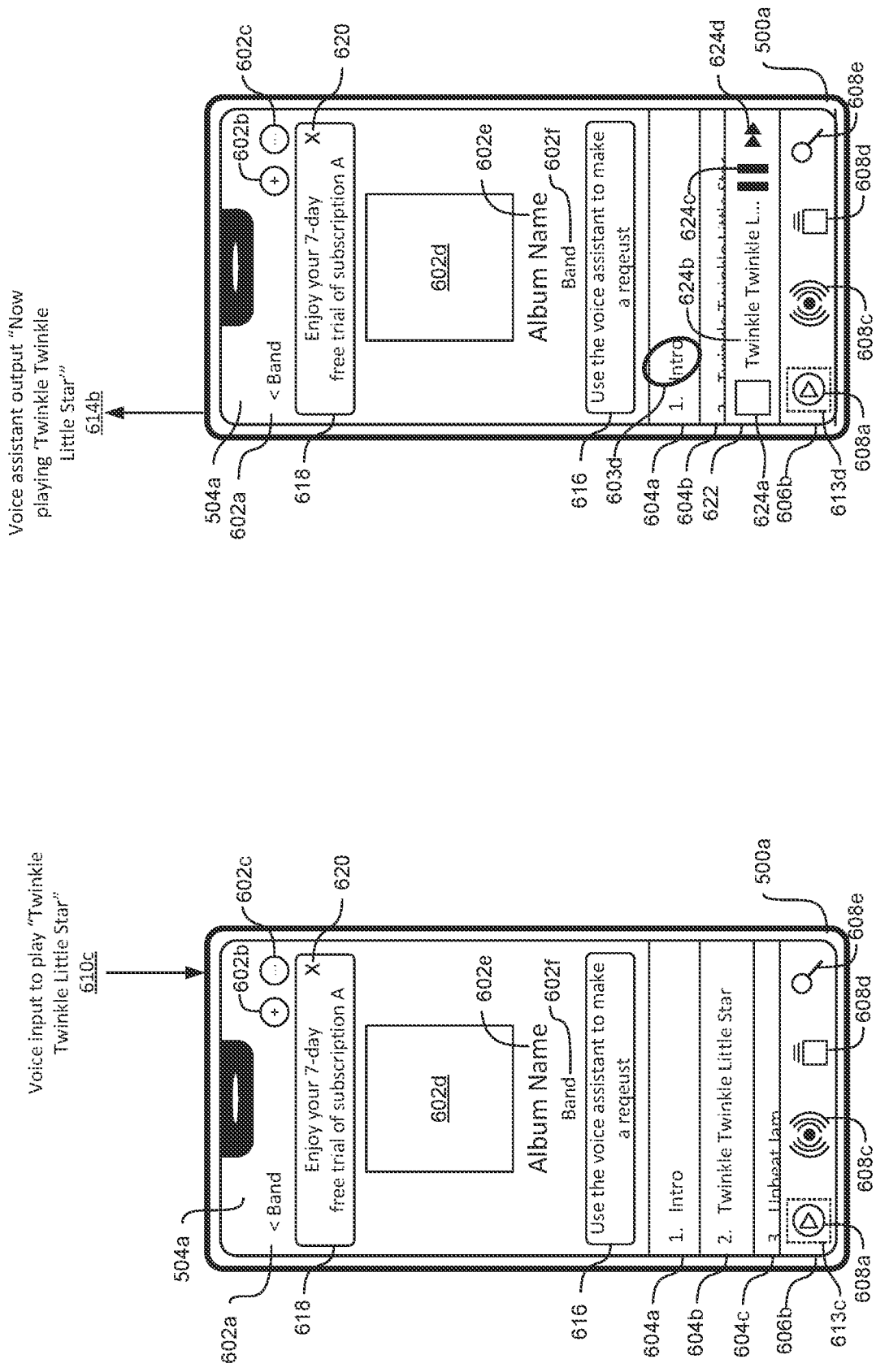

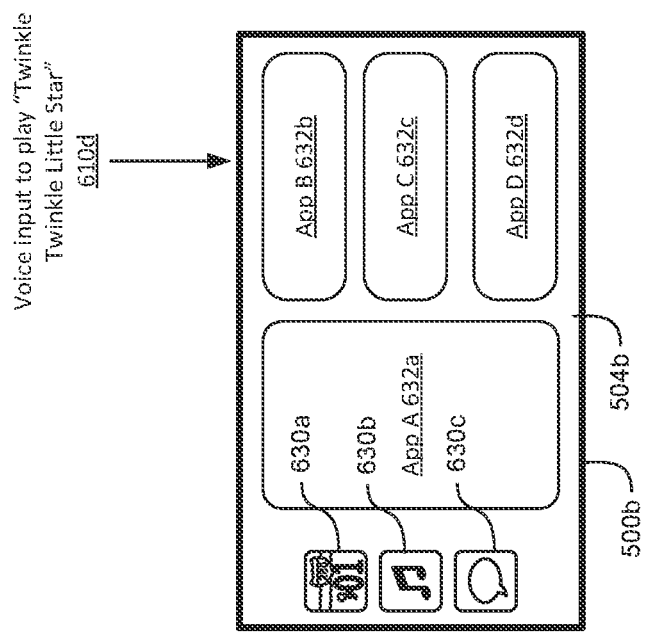
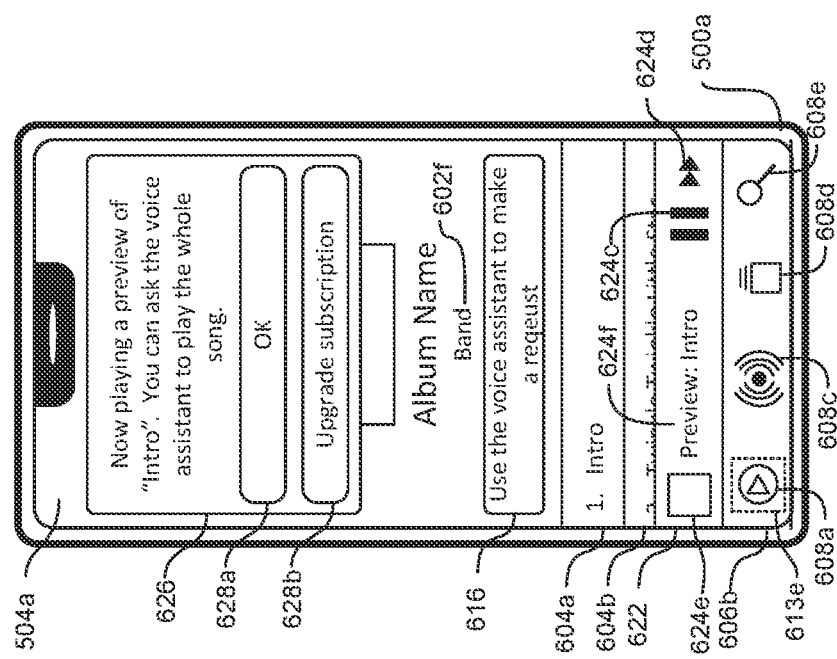
FIG. 6E  Subscription A
FIG. 6F  No Subscription

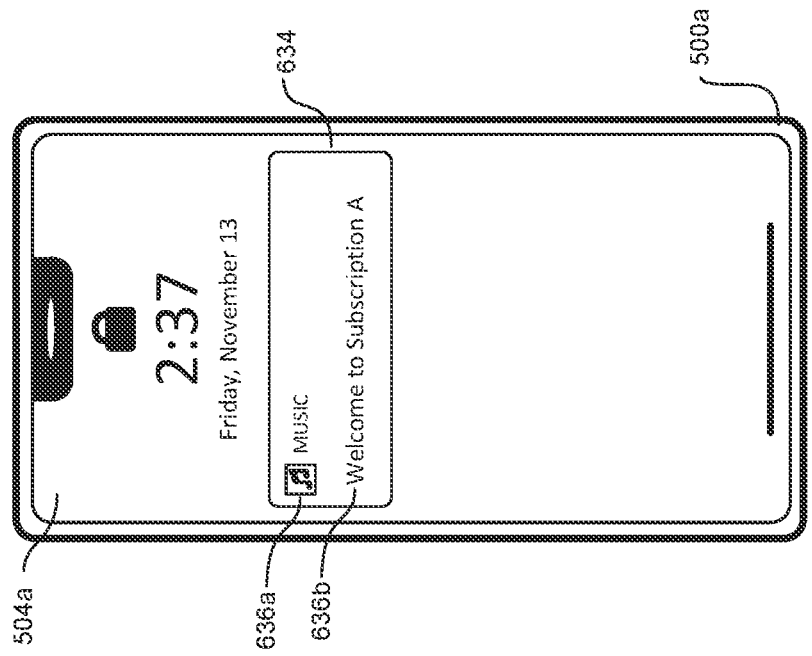
FIG. 6H   Subscription A
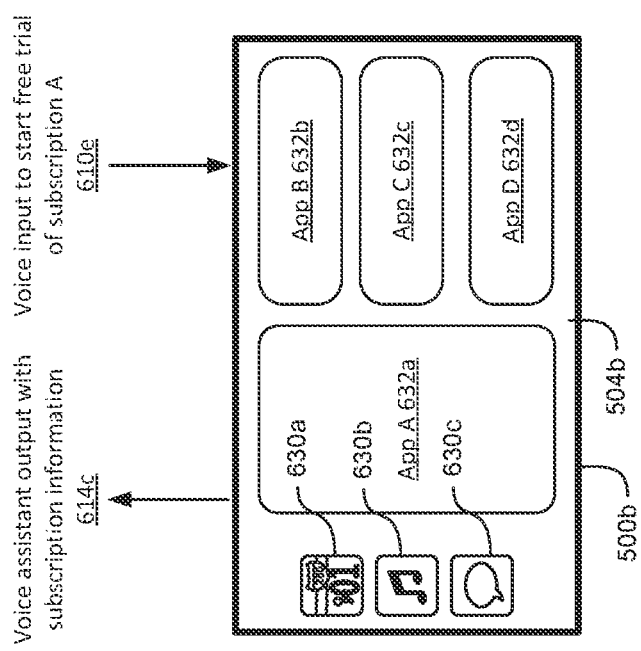
FIG. 6G   No Subscription

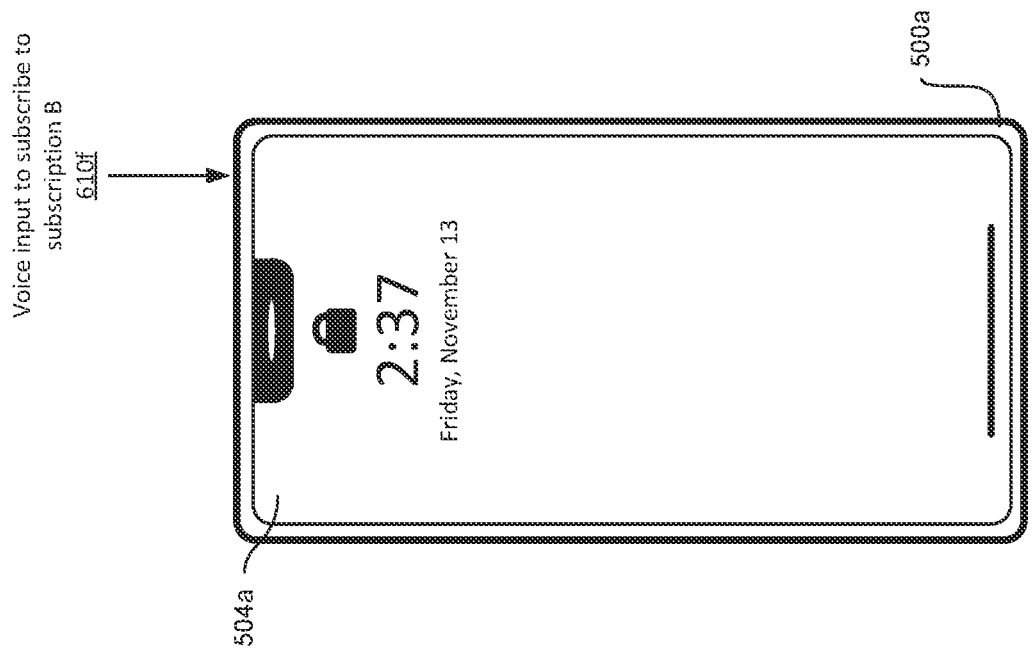
FIG. 6J
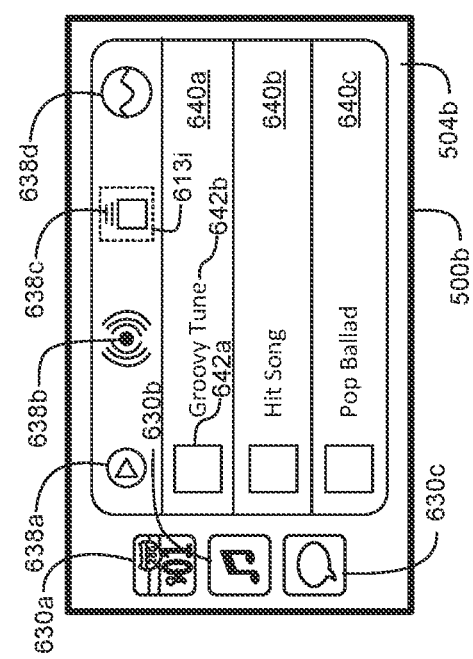
FIG. 6I    Subscription A

FIG. 6L    Subscription B

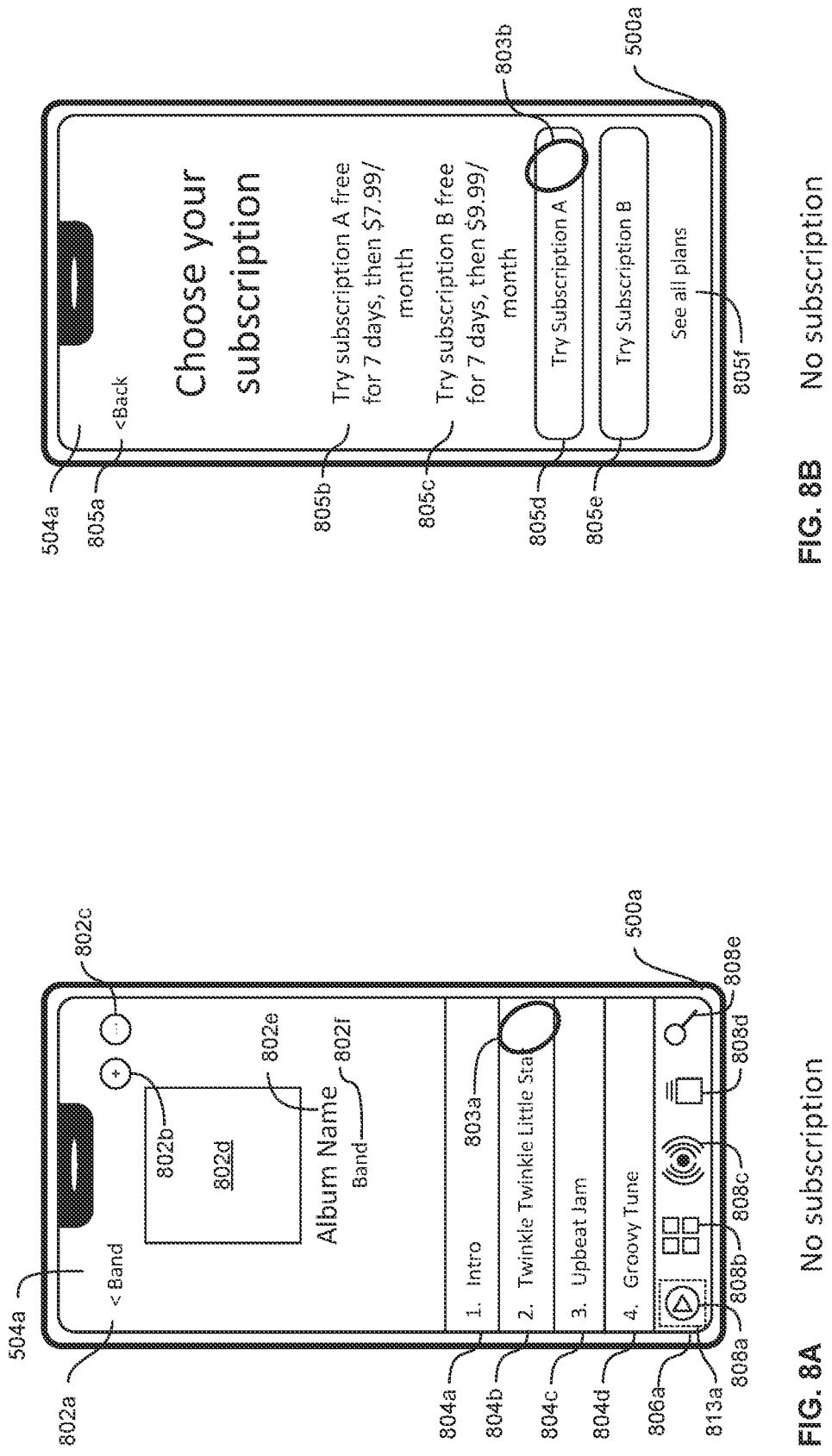

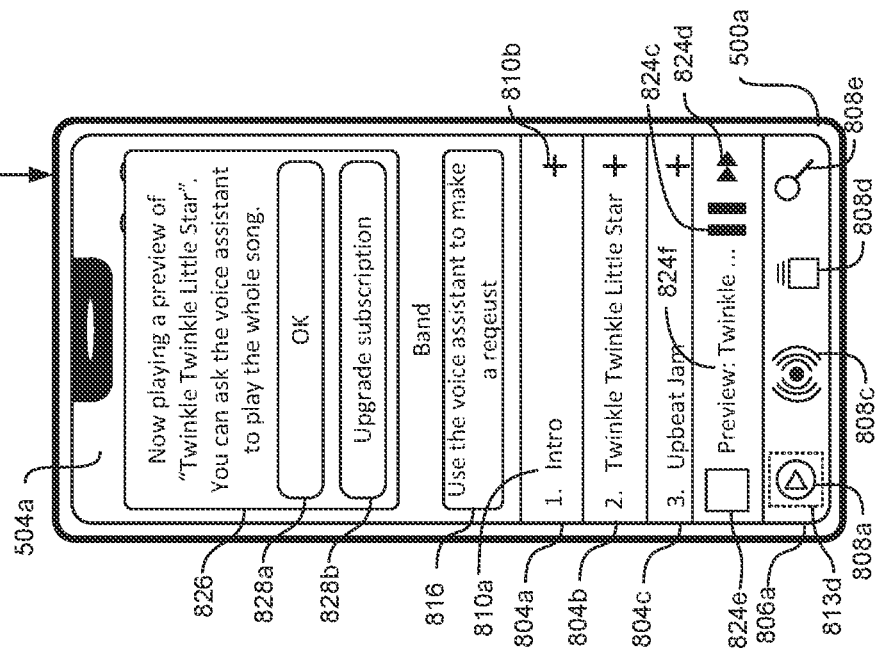
FIG. 8D  Subscription A
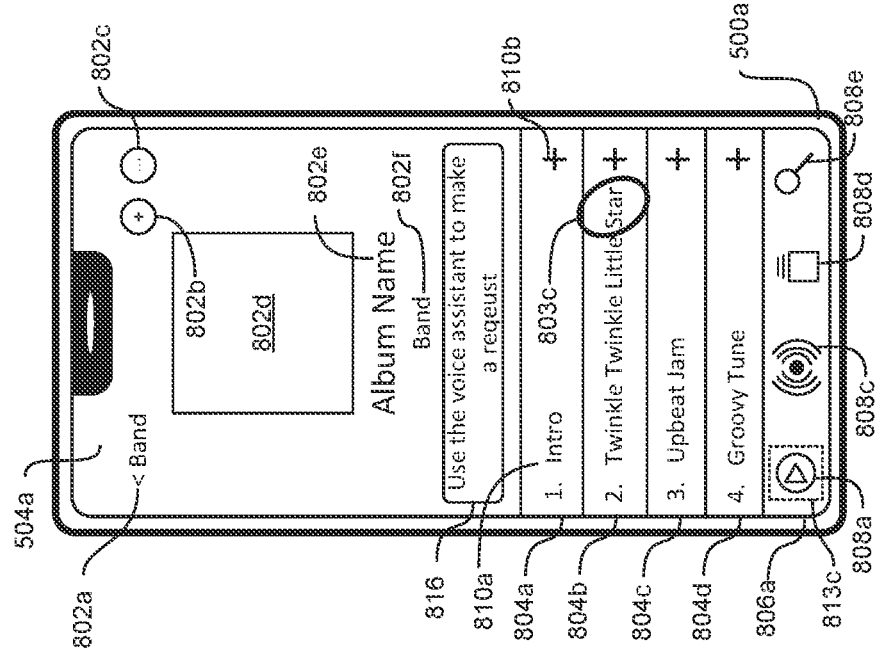
FIG. 8C  Subscription A

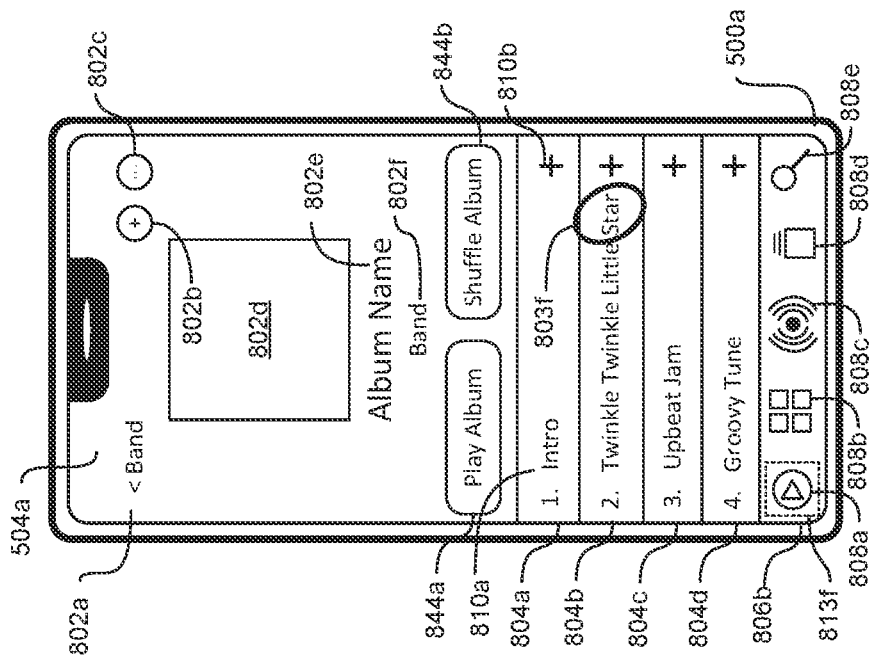
FIG. 8F  Subscription B
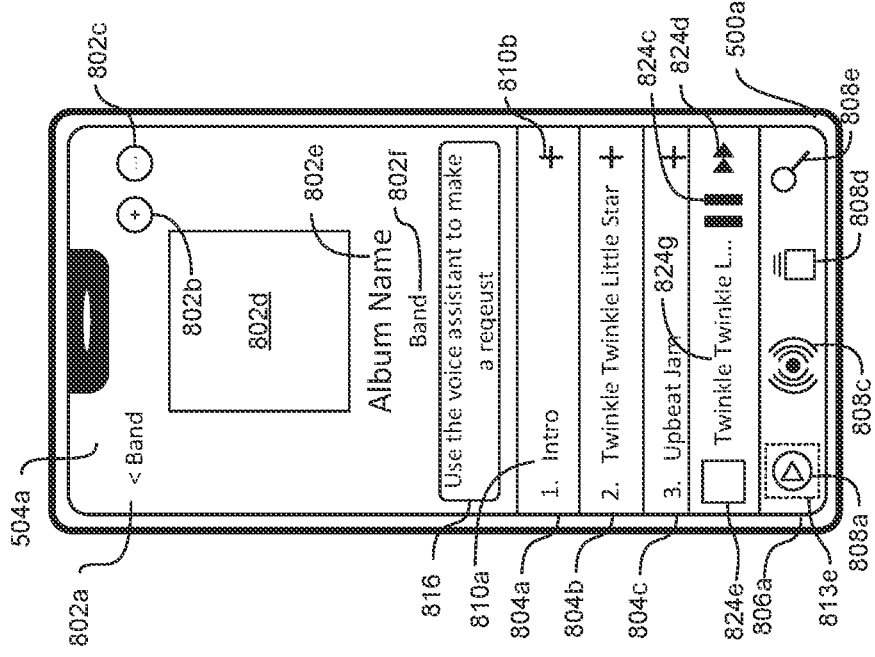
FIG. 8E  Subscription A

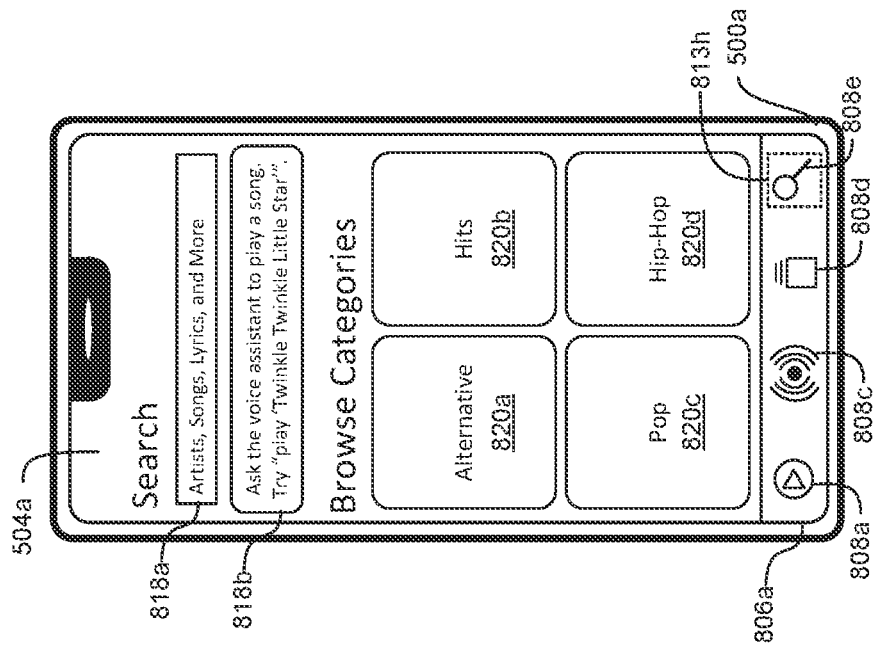
FIG. 8H
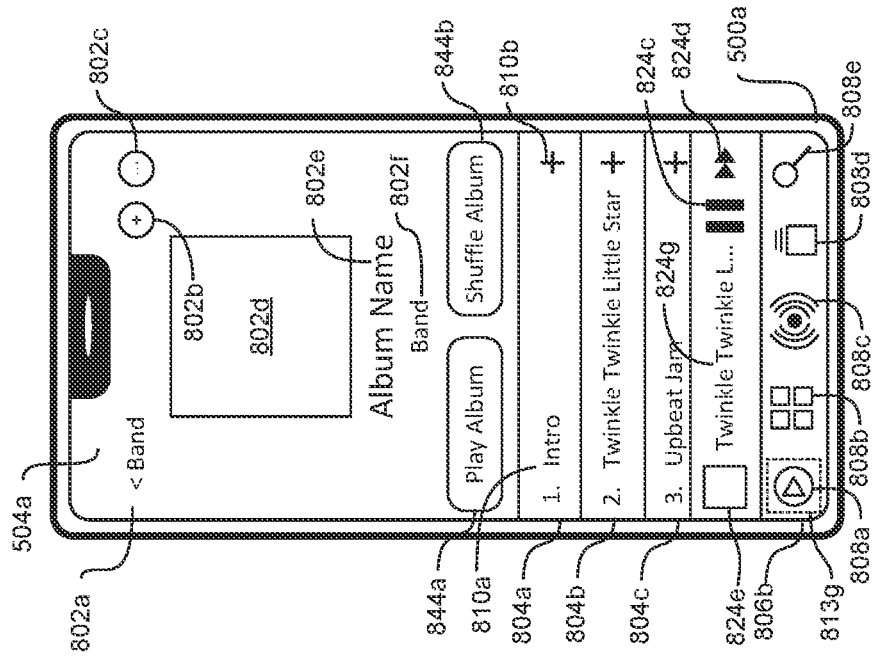
FIG. 8G    Subscription B

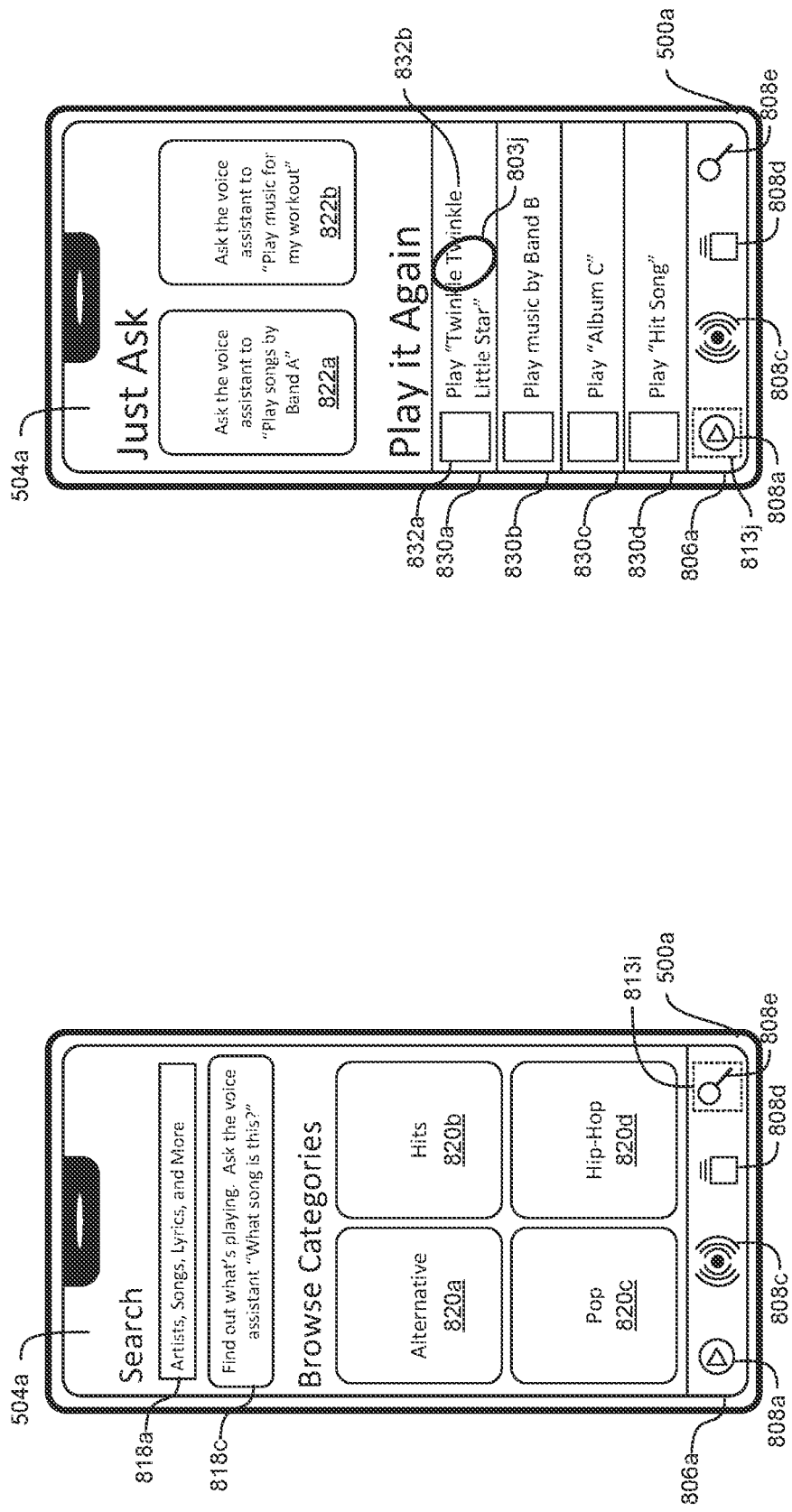

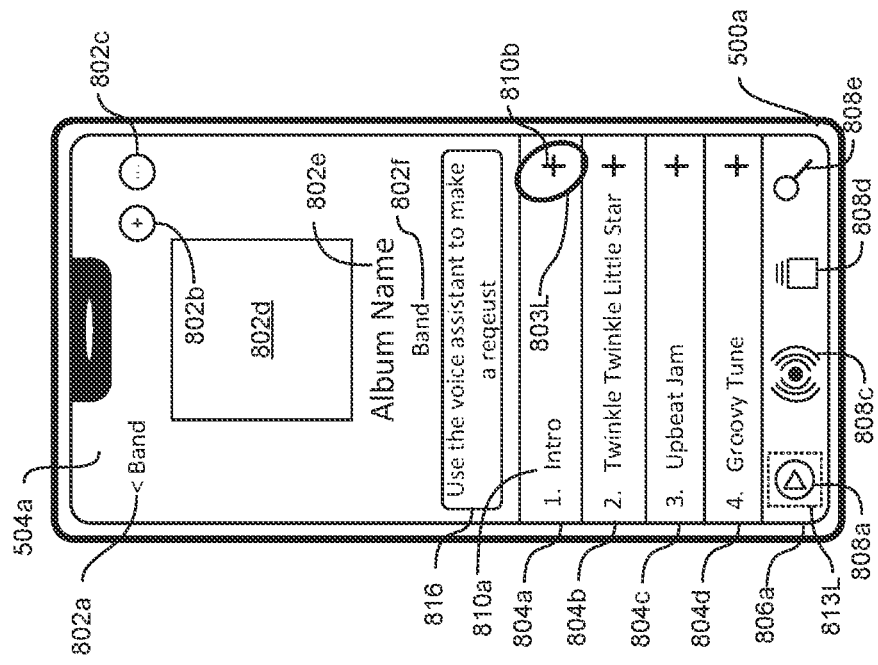
FIG. 8L     Subscription A
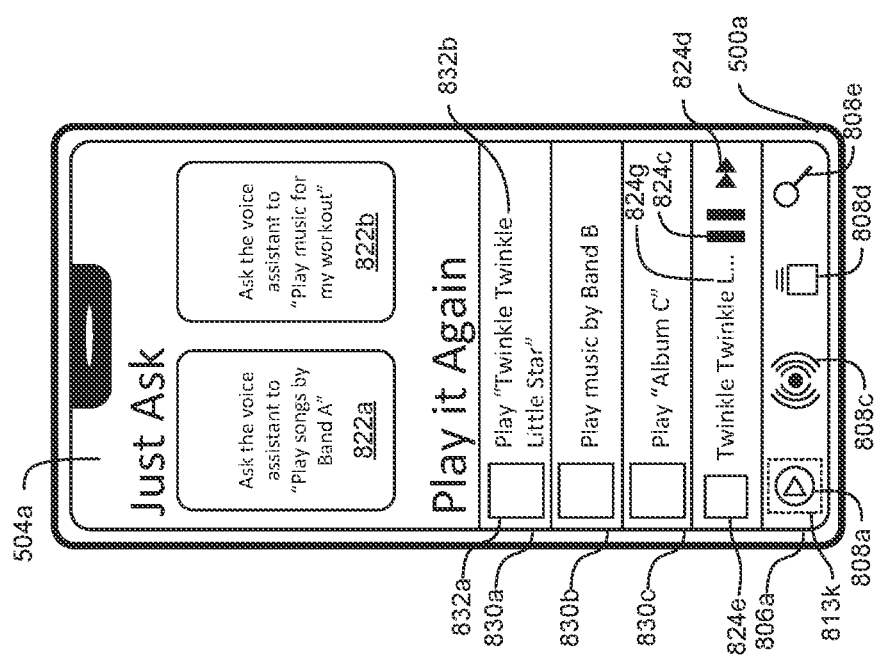
FIG. 8K     Subscription A

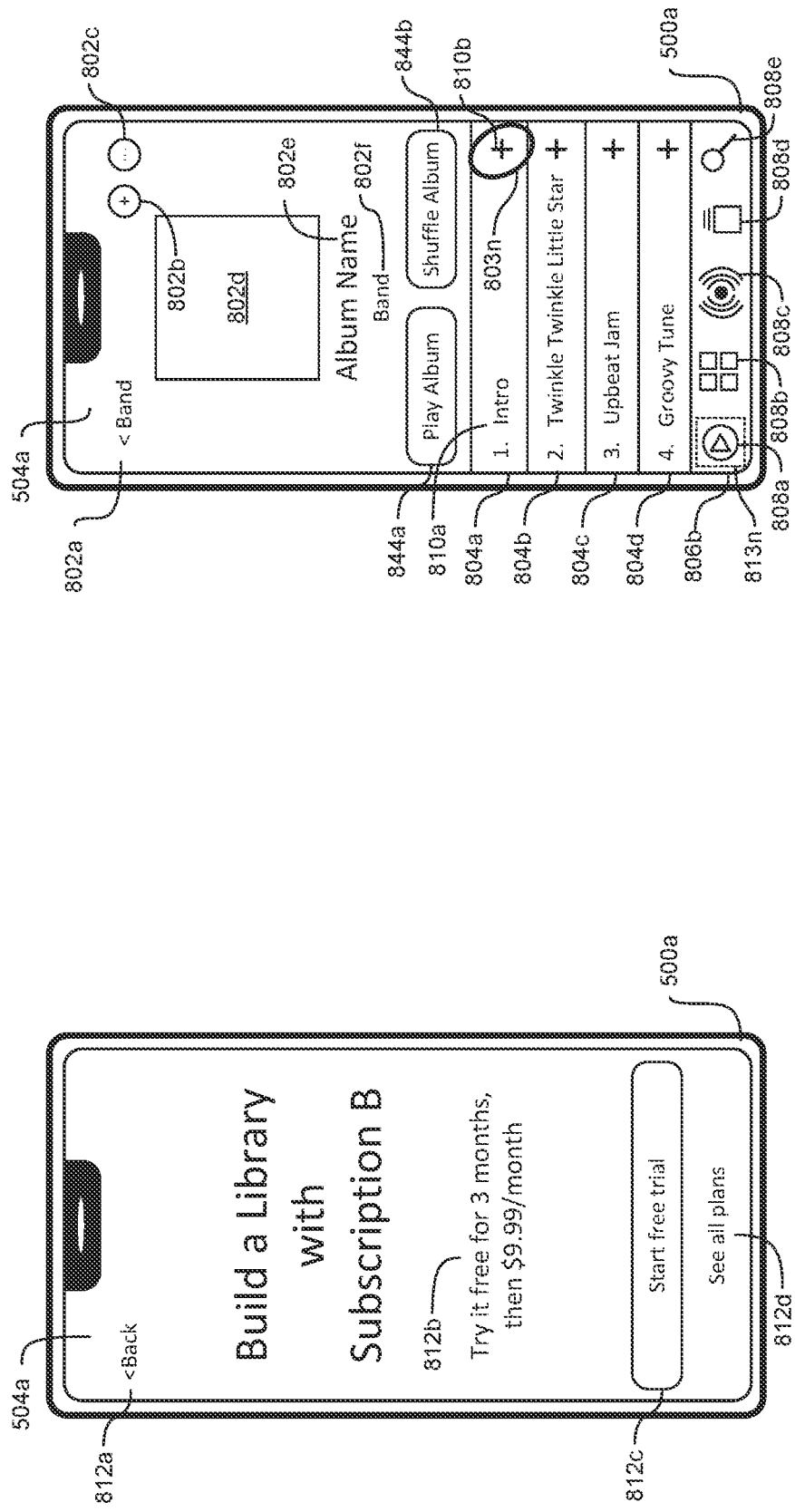

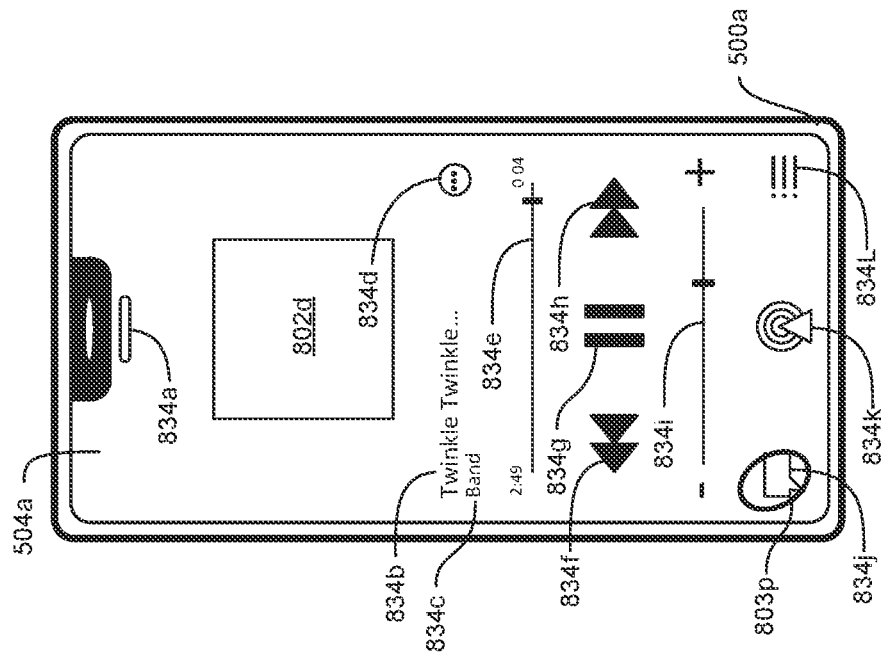
FIG. 8P  Subscription A
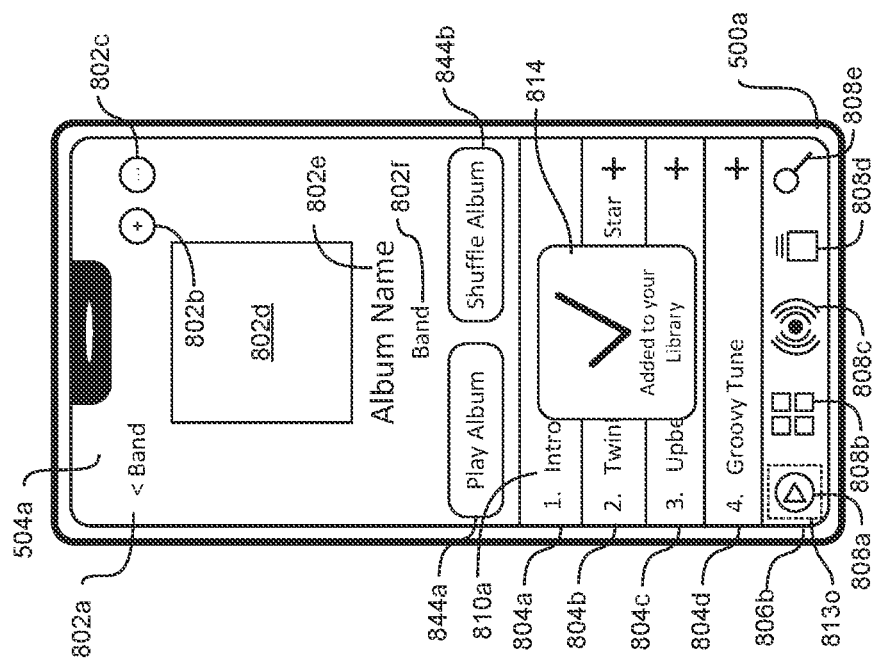
FIG. 8O  Subscription B

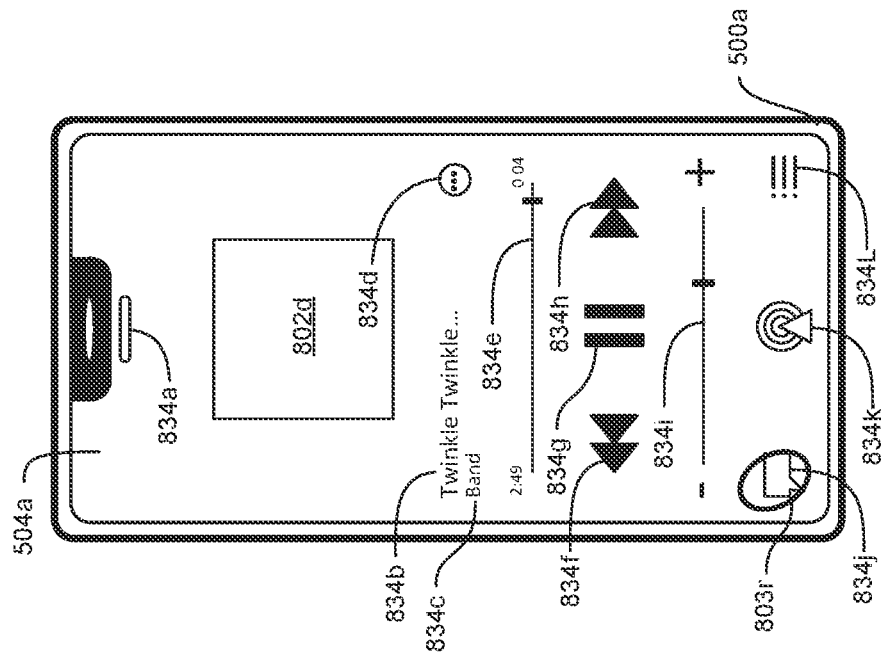
FIG. 8R  Subscription B
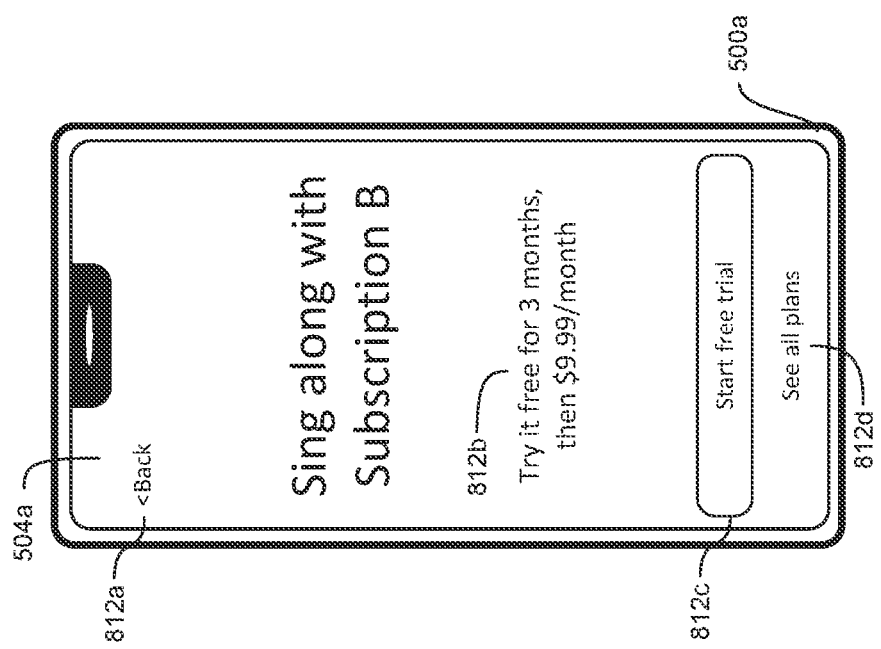
FIG. 8Q  Subscription A

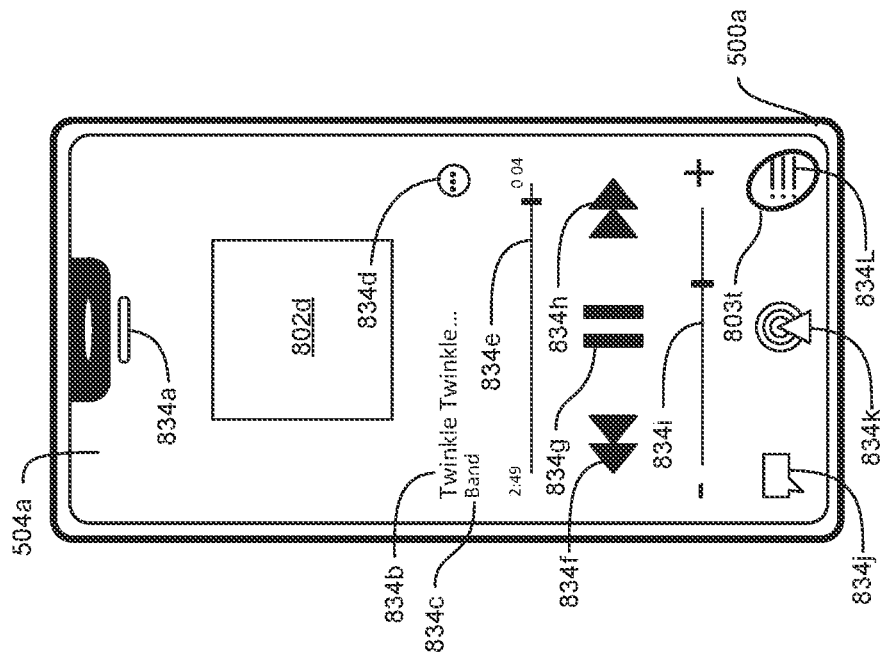
FIG. 8T    Subscription A
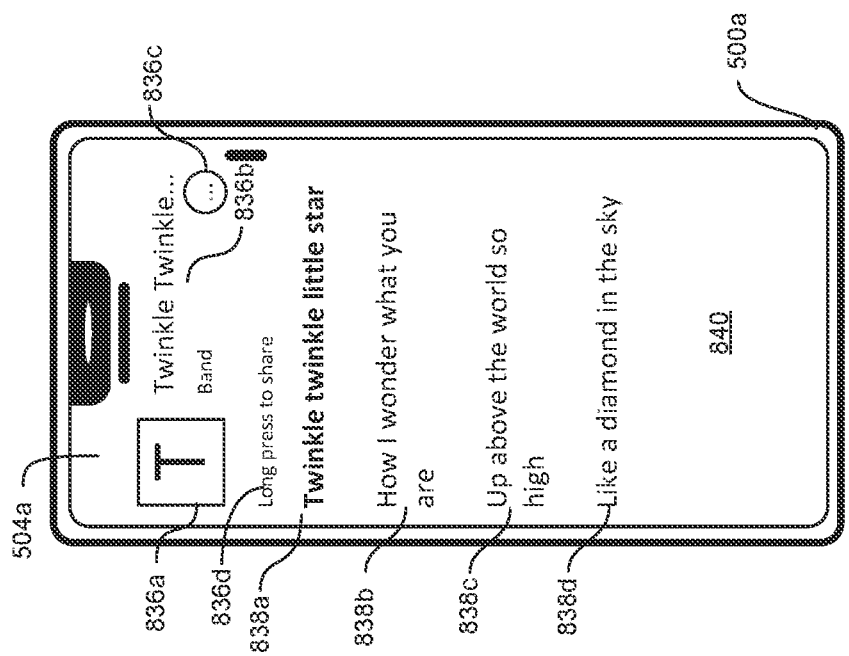
FIG. 8S    Subscription B

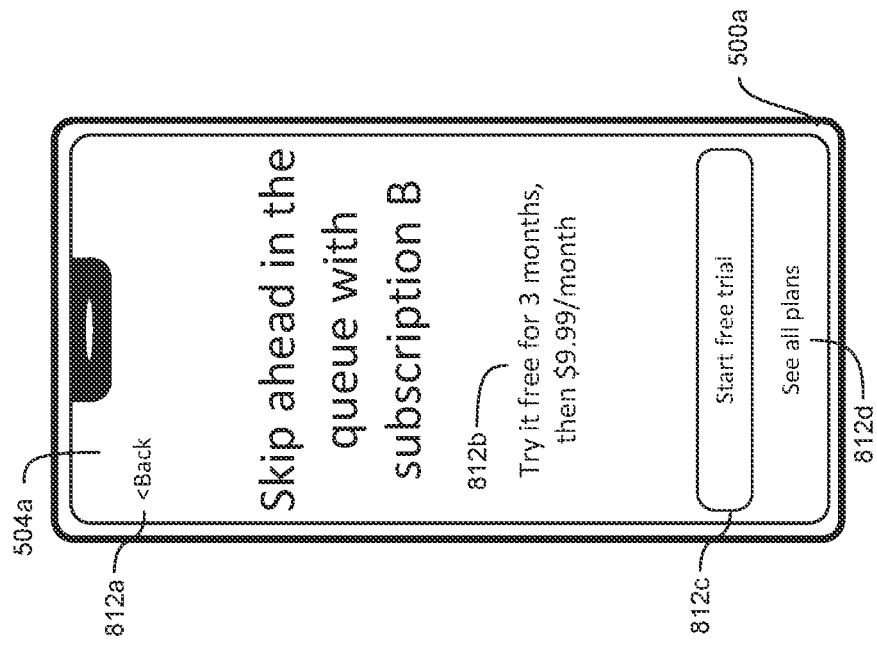
FIG. 8V  Subscription A
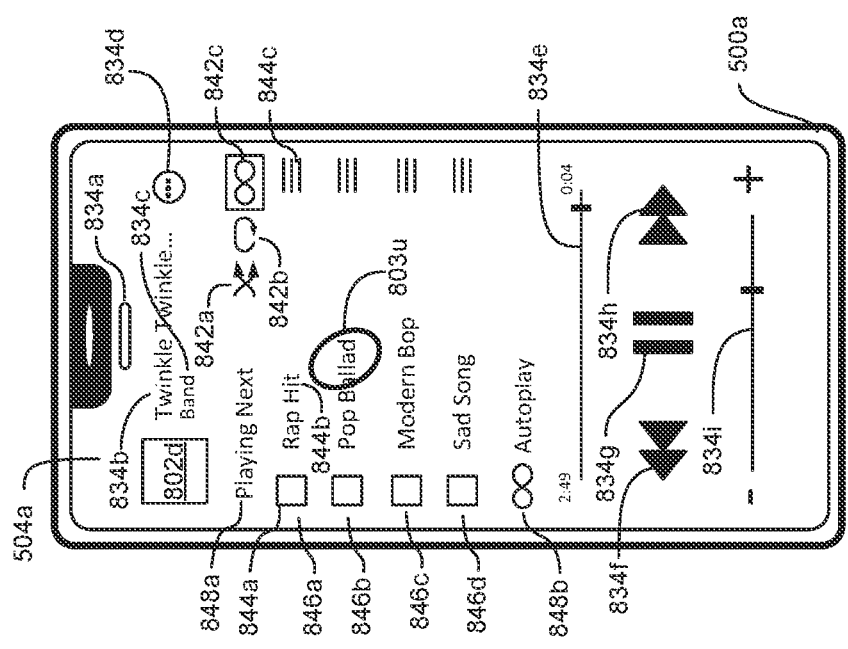
FIG. 8U  Subscription A

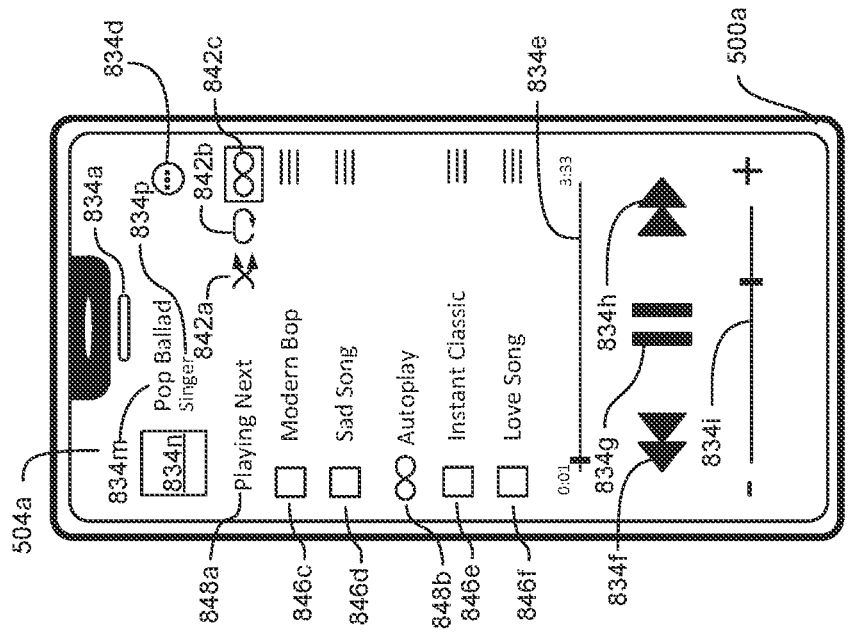
FIG. 8X  Subscription B
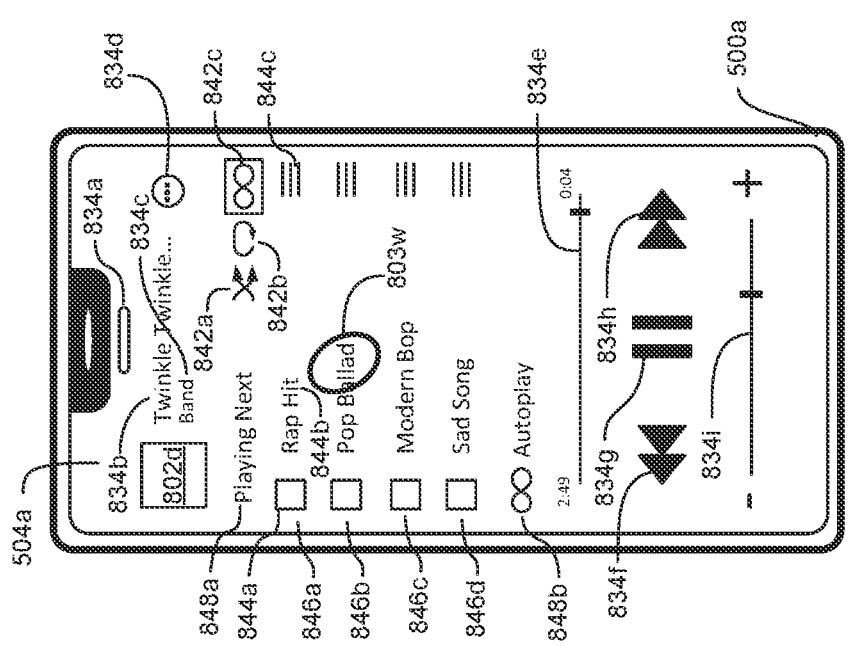
FIG. 8W  Subscription B

USER INTERFACES AND ASSOCIATED SYSTEMS AND PROCESSES FOR ACCESSING CONTENT ITEMS VIA CONTENT DELIVERY SERVICES

CROSS-REFERENCE TO RELATED APPLICATIONS

This application claims the benefit of U.S. Provisional Application No. 63/243,582, filed Sep. 13, 2021, the content of which is incorporated herein by reference in its entirety for all purposes.

FIELD OF THE DISCLOSURE

This specification relates generally to electronic devices that access content items via content delivery services, and user interactions with such devices.

BACKGROUND

User interaction with electronic devices has increased significantly in recent years. These devices can be devices such as computers, tablet computers, televisions, multimedia devices, mobile devices, smart watches, and the like. In some circumstances, users wish to use electronic devices to play content items accessible via content delivery services.

SUMMARY

Some embodiments described in this disclosure are directed to ways of subscribing to content delivery services. Some embodiments described in this disclosure are directed to ways of accessing content items via content delivery services. Enhancing a user's interactions with an electronic device in performing the above actions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 6A-6M illustrate exemplary ways in which an electronic device facilitates a process to subscribe to content delivery services in accordance with some embodiments.

DETAILED DESCRIPTION

Figure 1A:
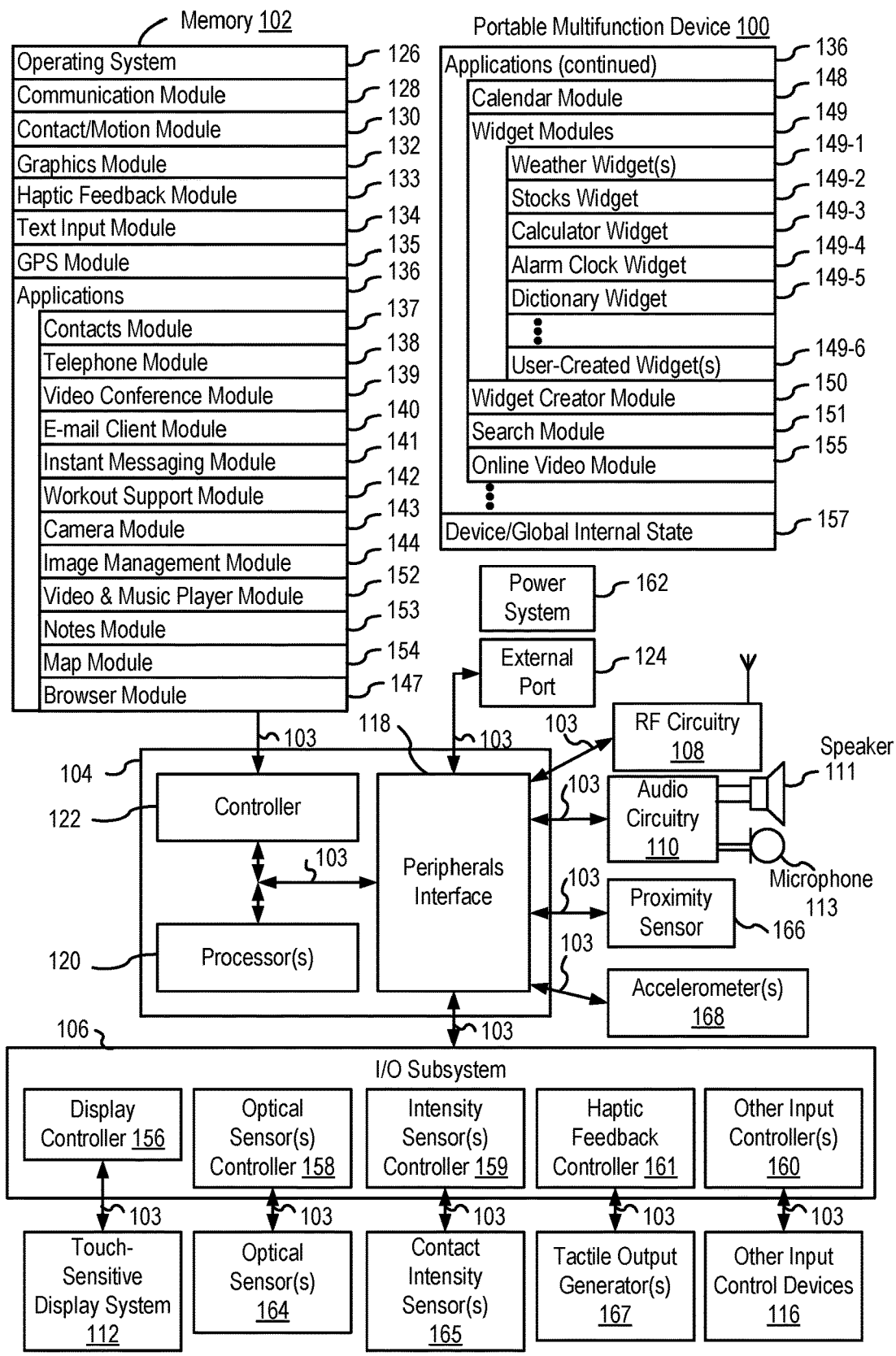
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device subscribes to a content delivery service that entitles the user account of the electronic device to access content items (e.g., for playback). For example, the electronic device subscribes the user account to a voice-only subscription that entitles the user account to access content items via voice inputs (e.g., but not via non-voice inputs). As another example, the electronic device subscribes the user account to a voice and non-voice subscription that entitles the user to access content items via voice inputs or non-voice inputs. Such techniques can reduce the cognitive burden on a user who uses an example electronic device and streamline a process for subscribing to a content delivery service.

In some implementations, an example electronic device accesses content items via a content delivery service. For example, in response to a non-voice input corresponding to a request to play a respective content item, if the user account is subscribed to the voice and non-voice subscription to the content delivery service, the electronic device initiates playback of the (e.g., entire) content item, but if the user account is subscribed to the voice-only subscription to the content delivery service, the electronic device initiates playback of a predefined portion of the content item (e.g., without playing the entire content item). Such techniques can reduce the cognitive burden on a user who uses an example electronic device and streamline a process for accessing content items via the content delivery service.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
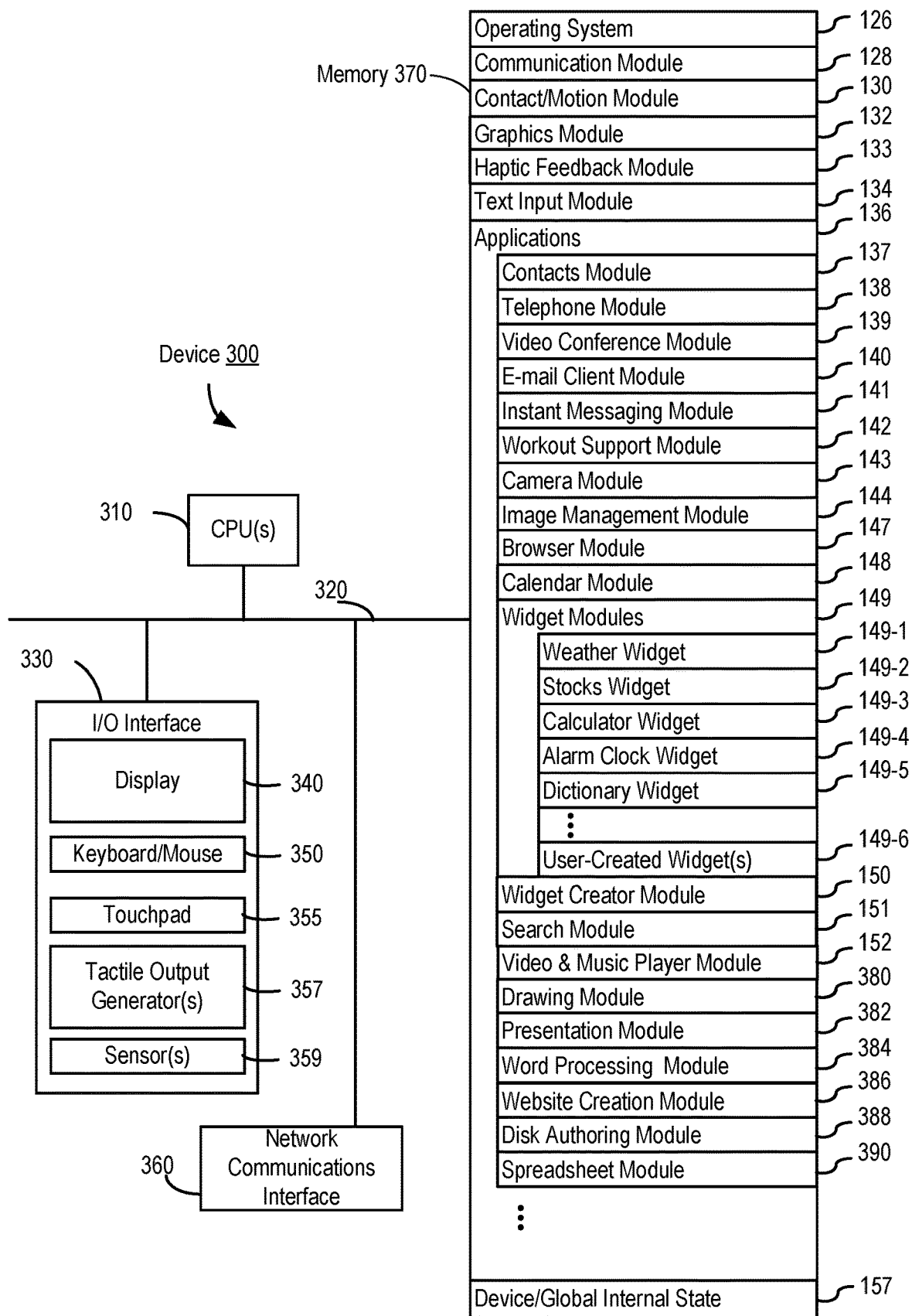
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
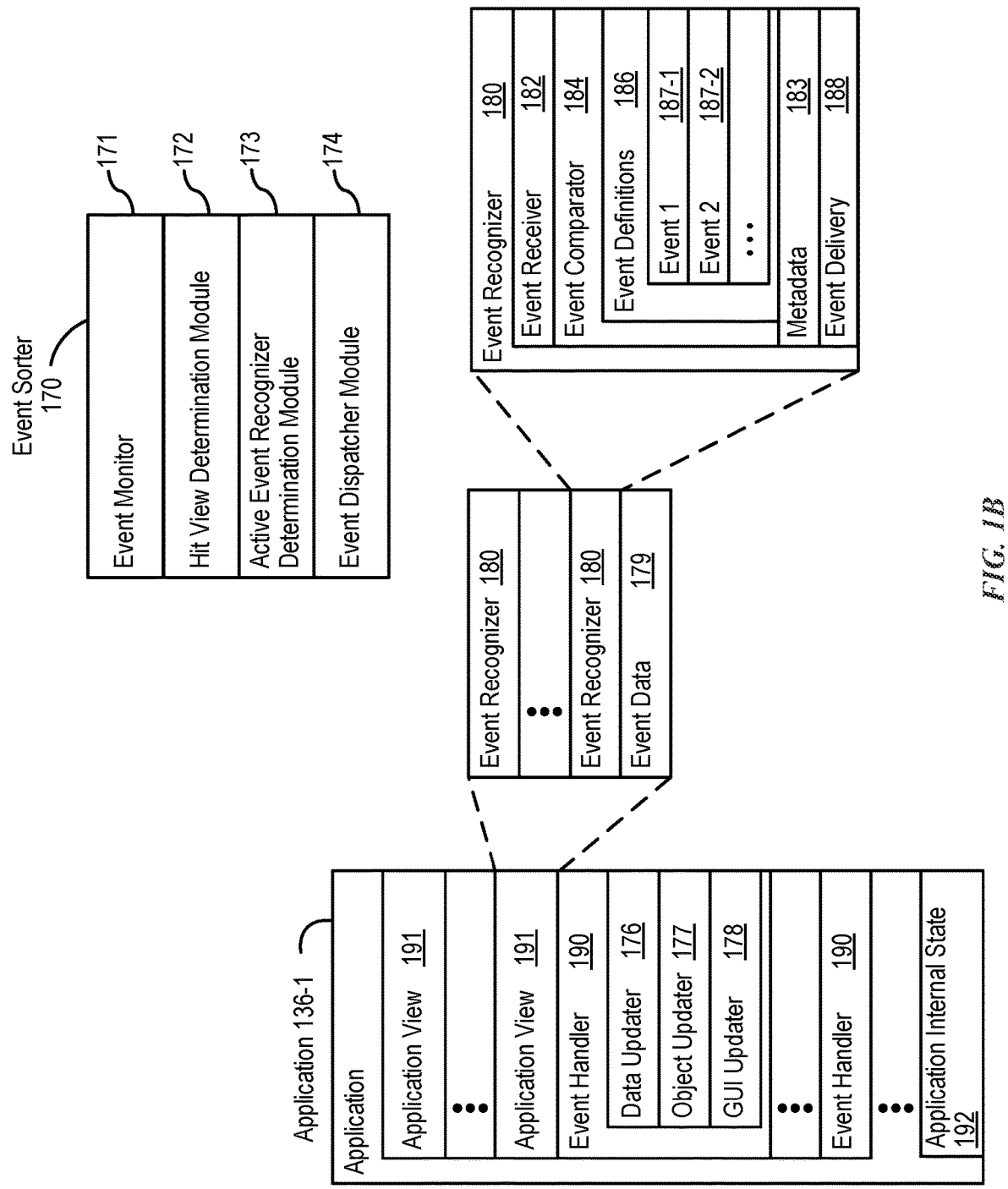
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
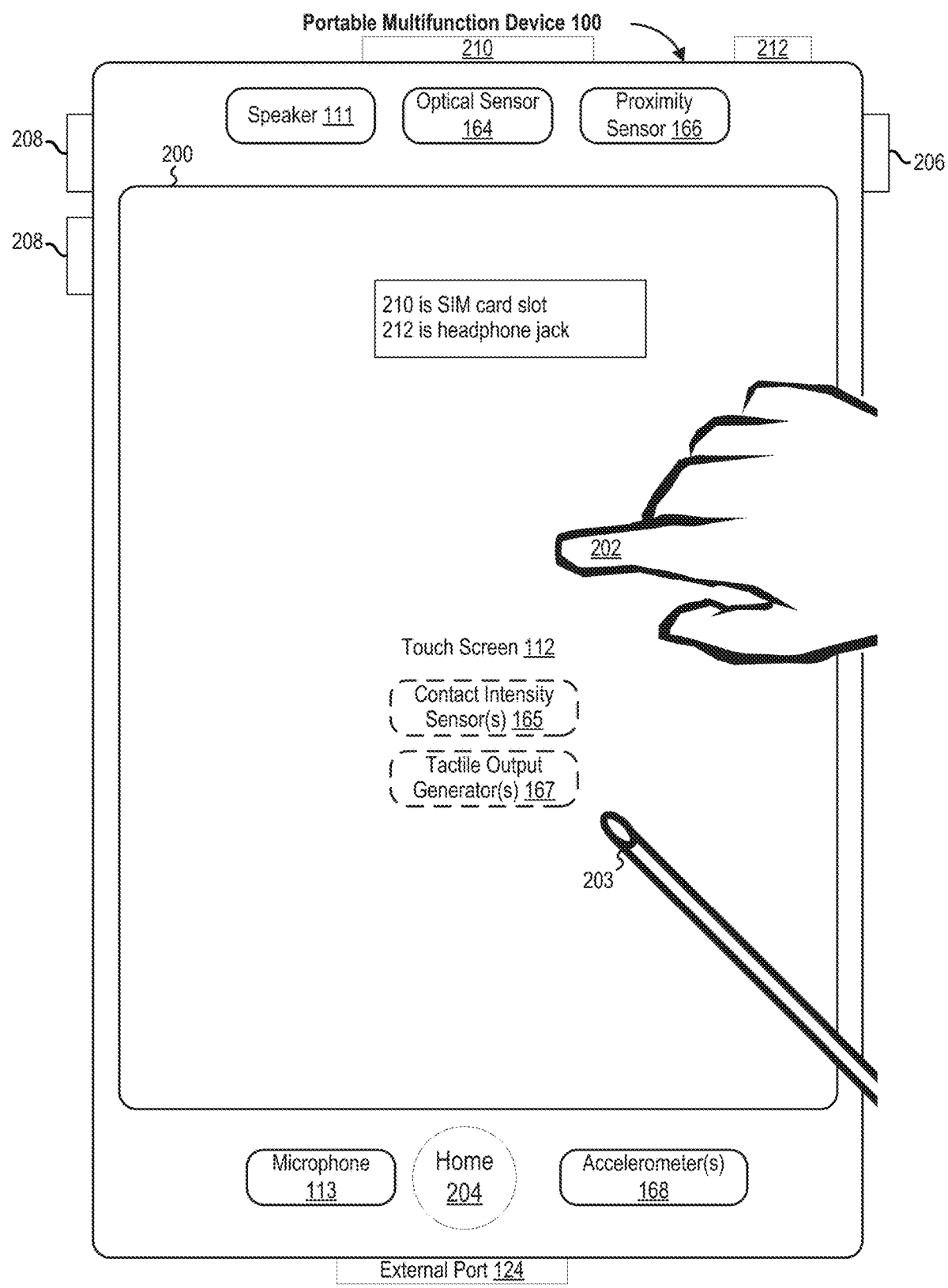
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
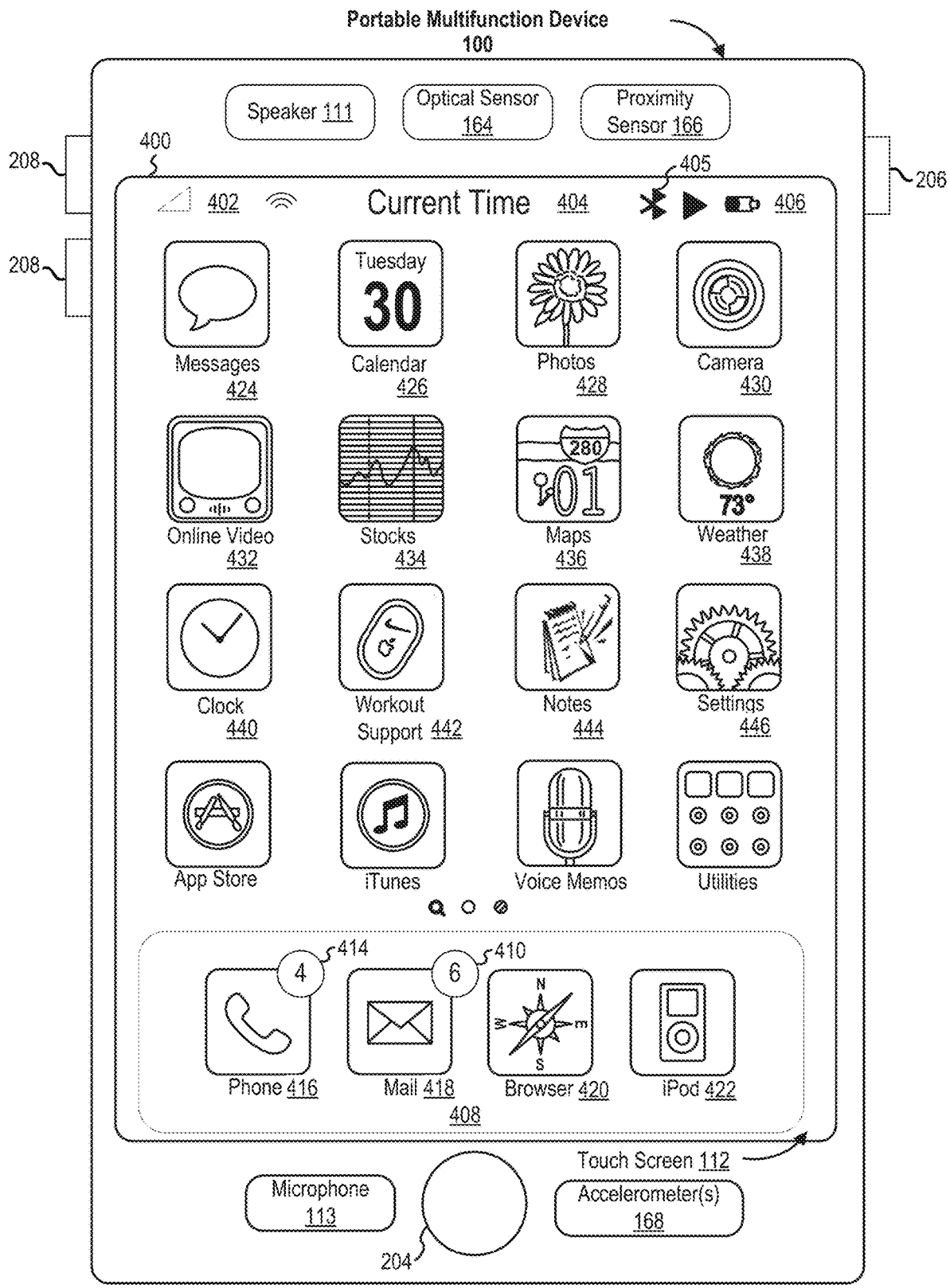
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
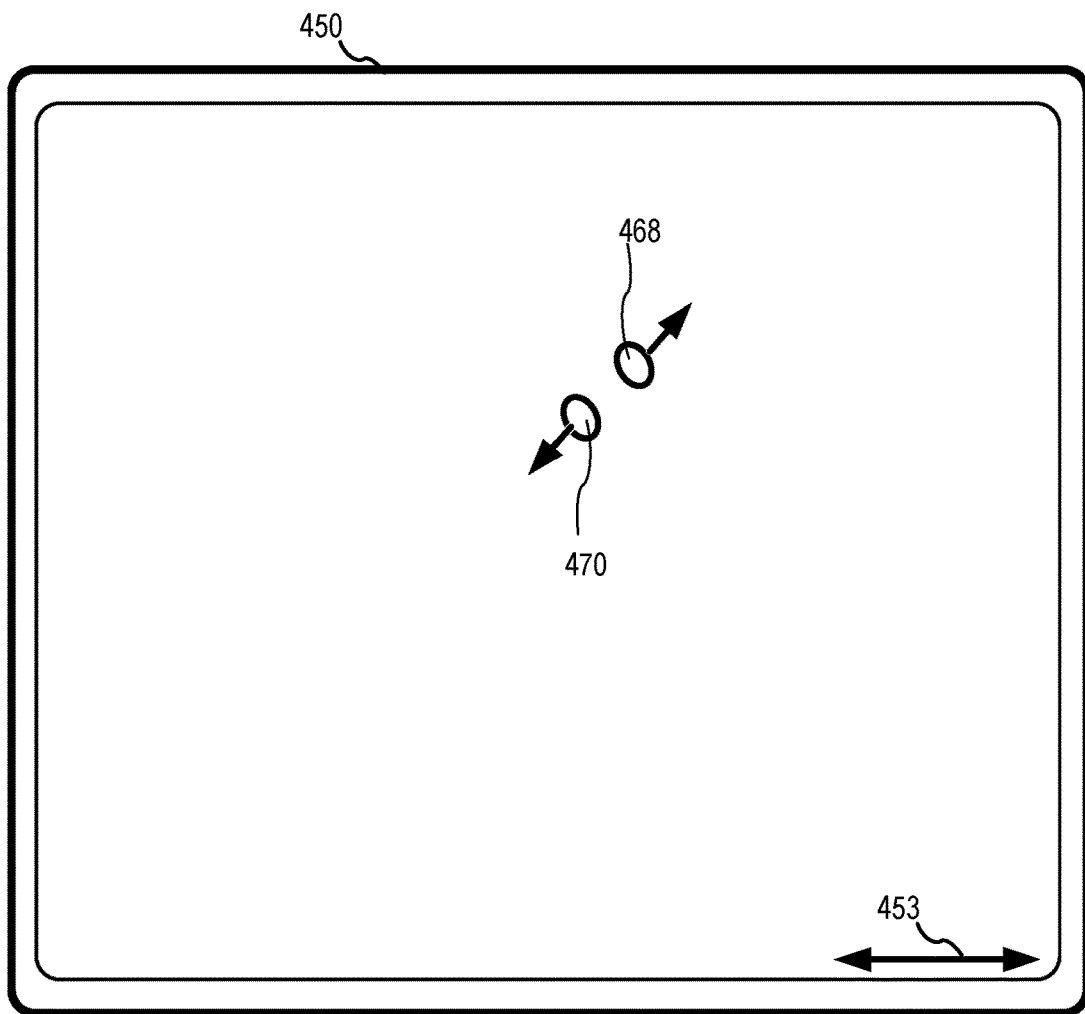
FIG. 4B illustrates an exemplary user interface for a multifunction device with a touch-sensitive surface that is separate from the display in accordance with some embodiments.
Figure 4B:
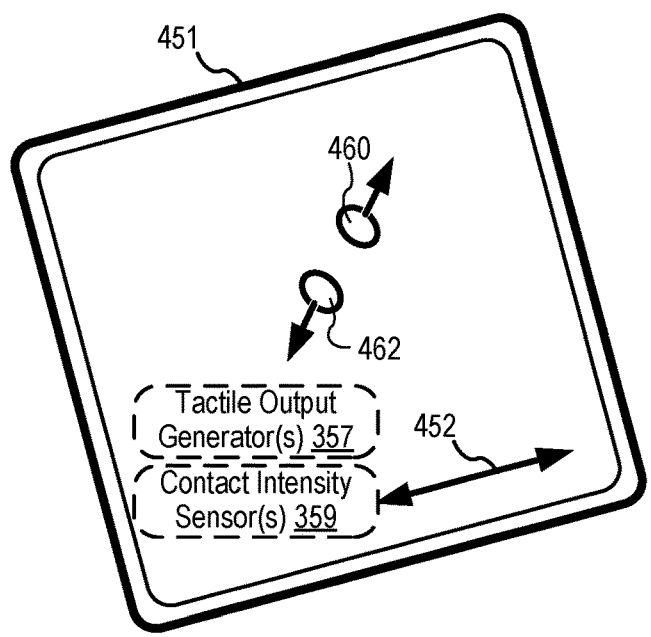

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
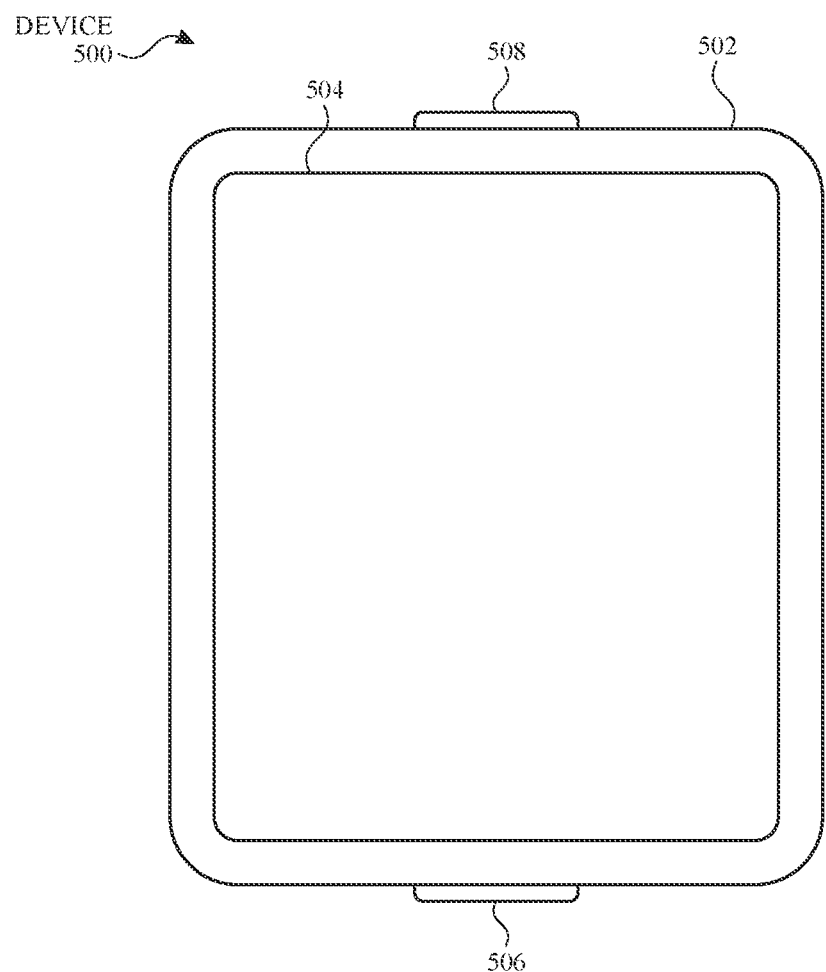
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
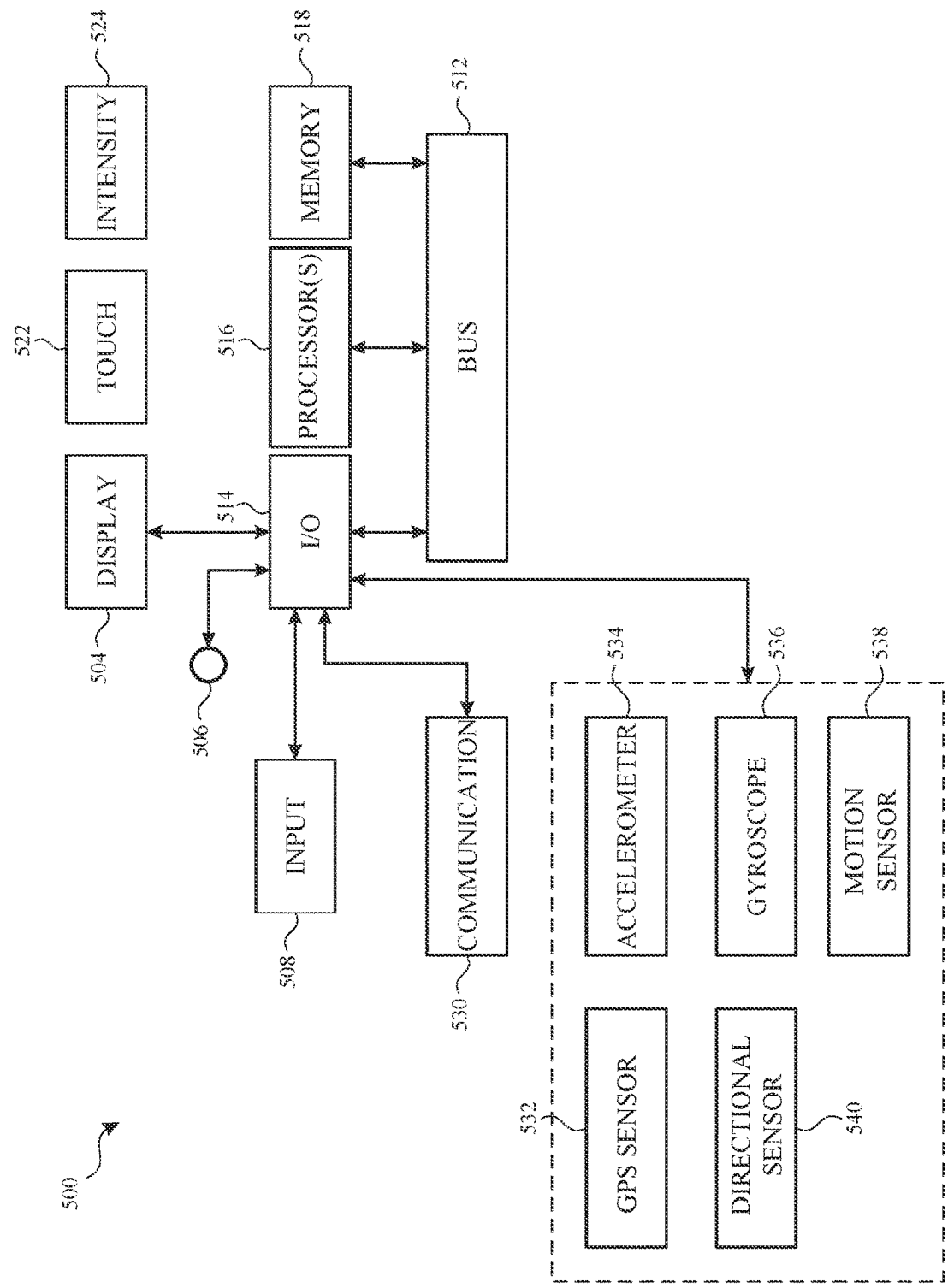
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
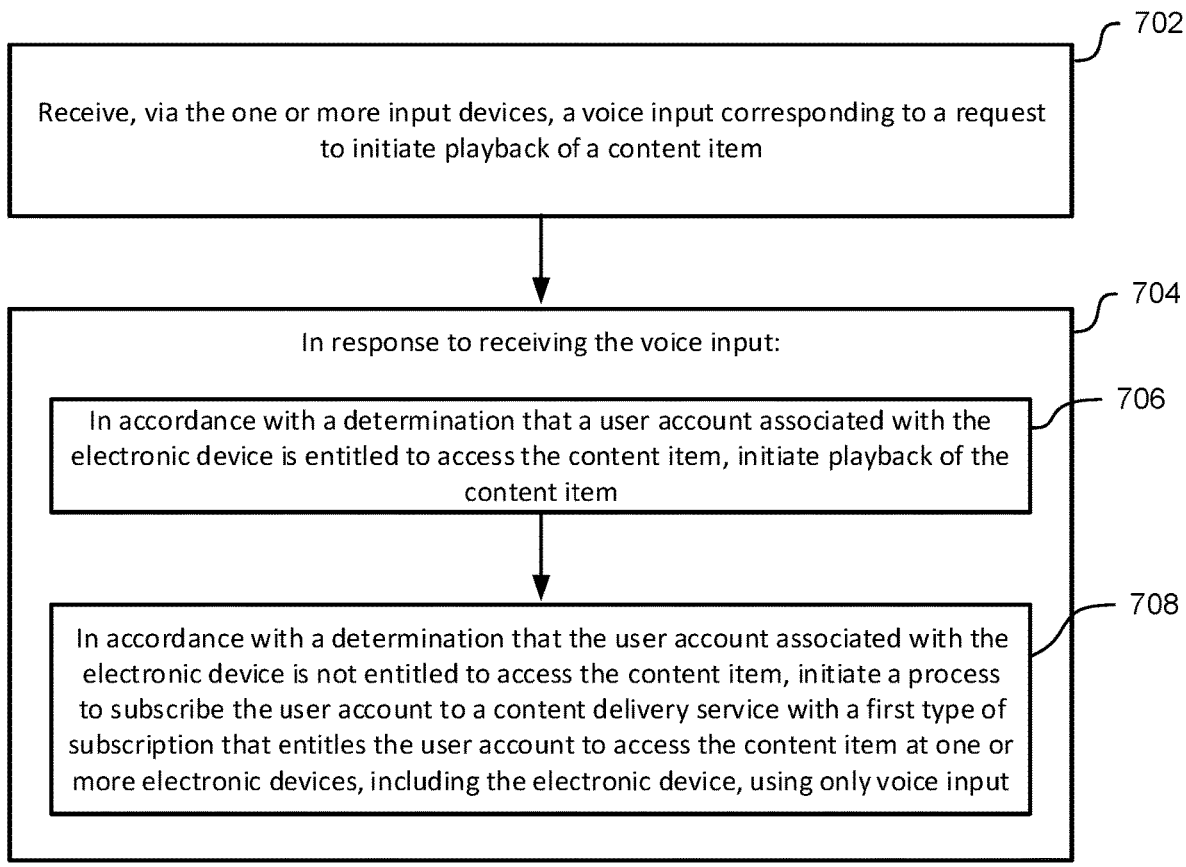
FIG. 7 is a flow diagram illustrating a method of facilitating a process to subscribe to content delivery services in accordance with some embodiments.
Figure 9:
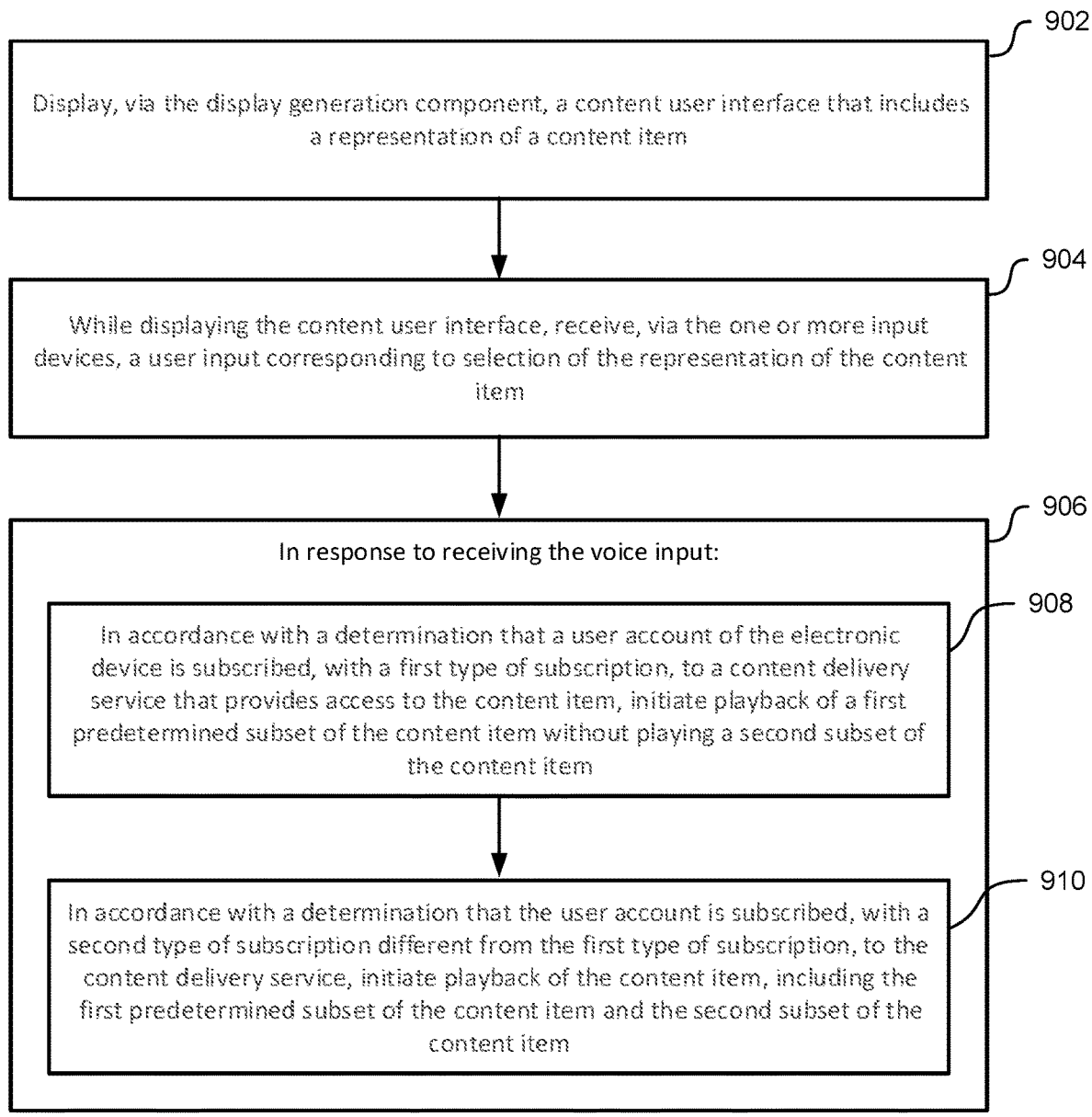
FIG. 9 is a flow diagram illustrating a method of accessing content items via a content delivery service in accordance with some embodiments.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
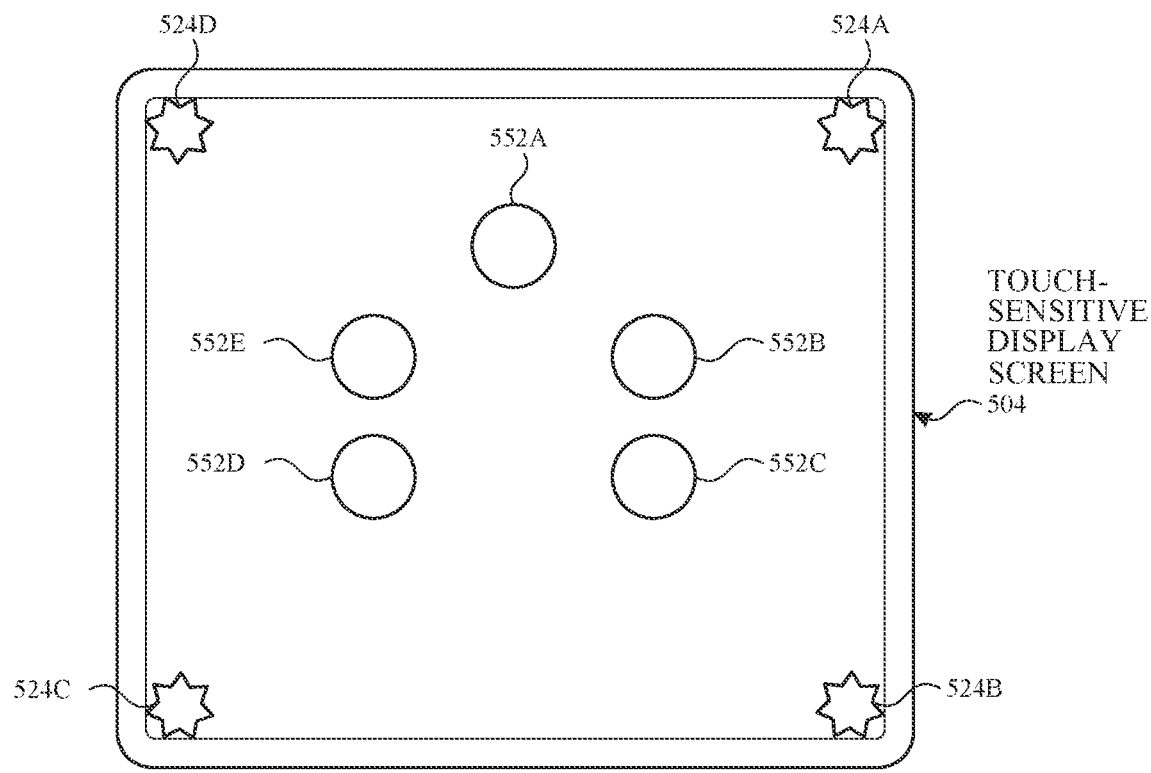
FIGS. 5C-5D illustrate exemplary components of a personal electronic device having a touch-sensitive display and intensity sensors in accordance with some embodiments.
Figure 5C:
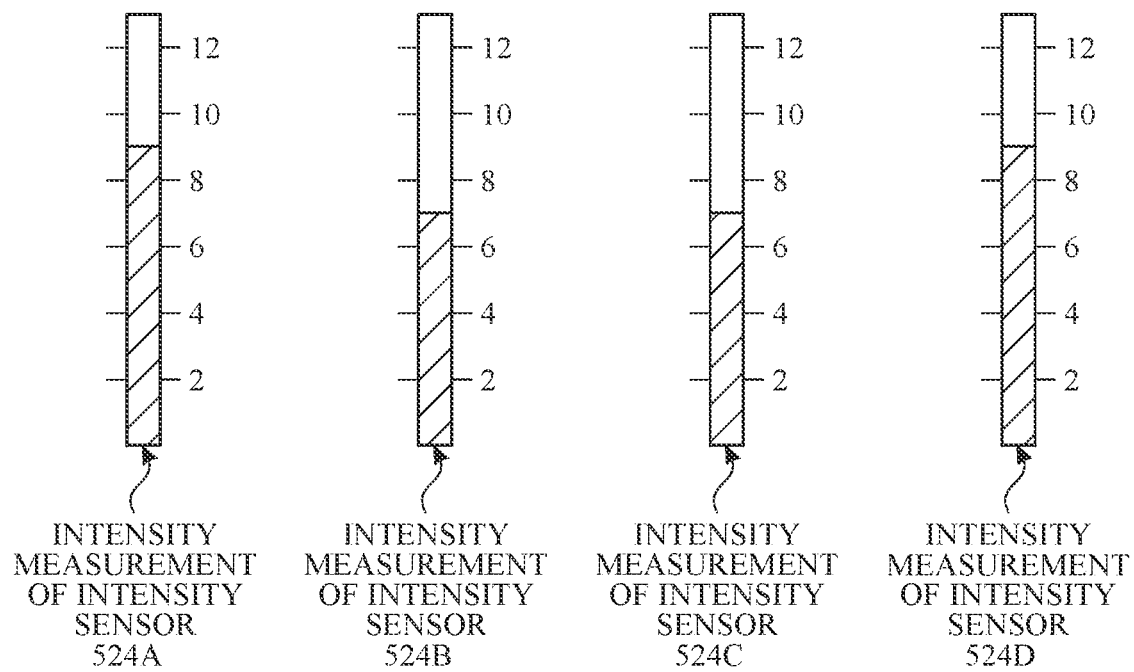
Figure 5D:
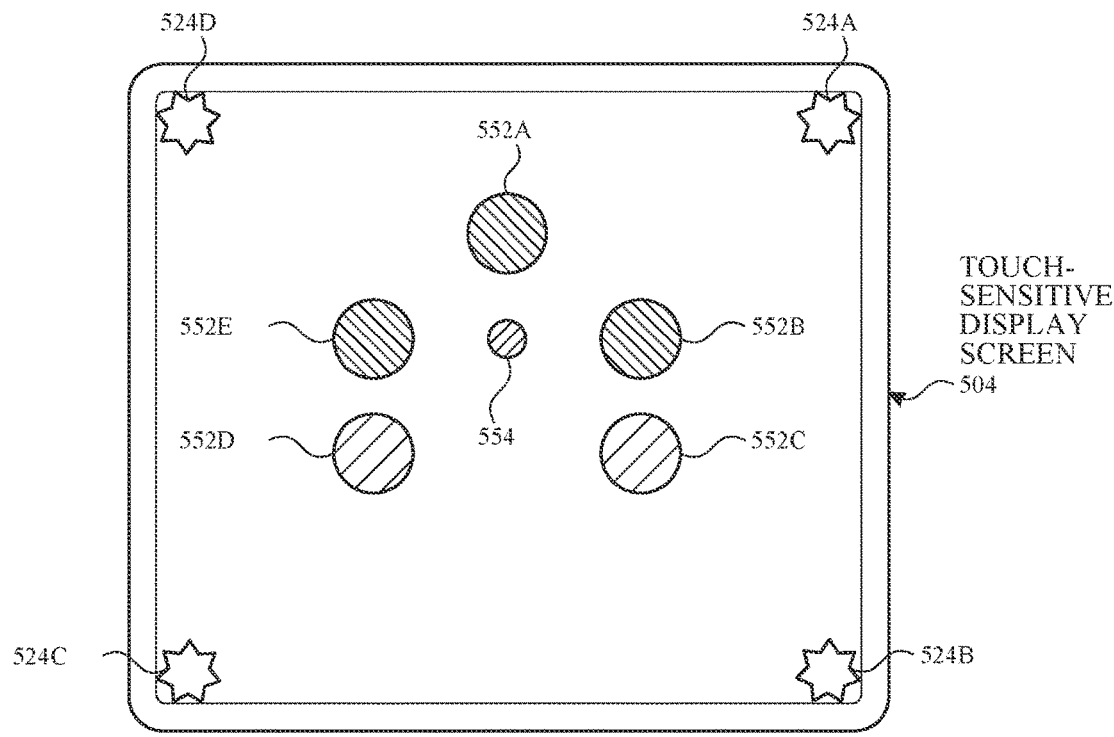
Figure 5D:
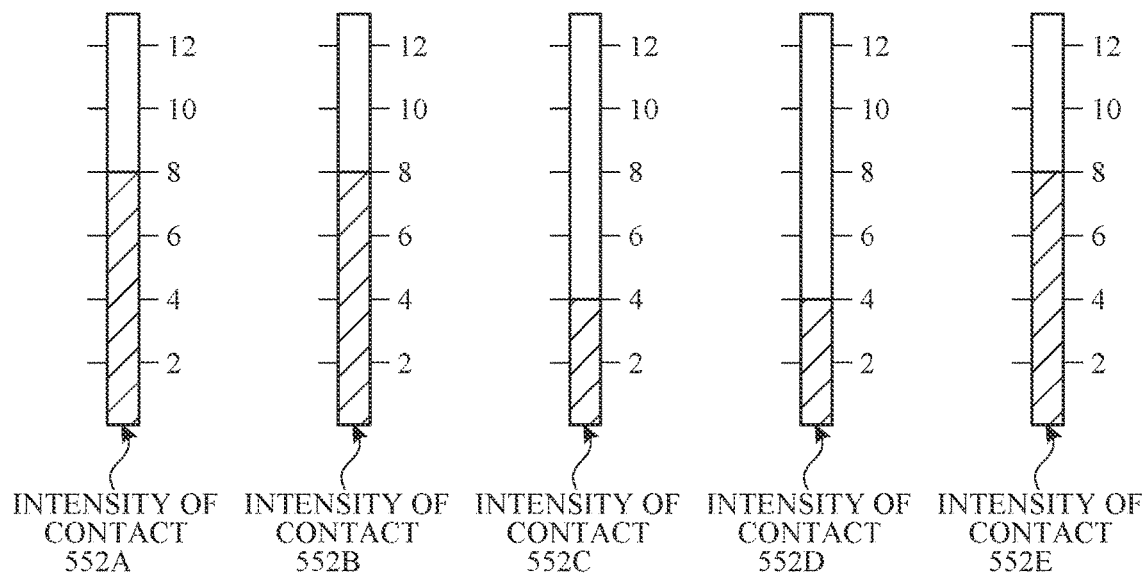

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $Ij$ that is a portion of the aggregate intensity, $A$, in accordance with a predefined mathematical function, $Ij=A \cdot (Dj/\Sigma Di)$, where $Dj$ is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
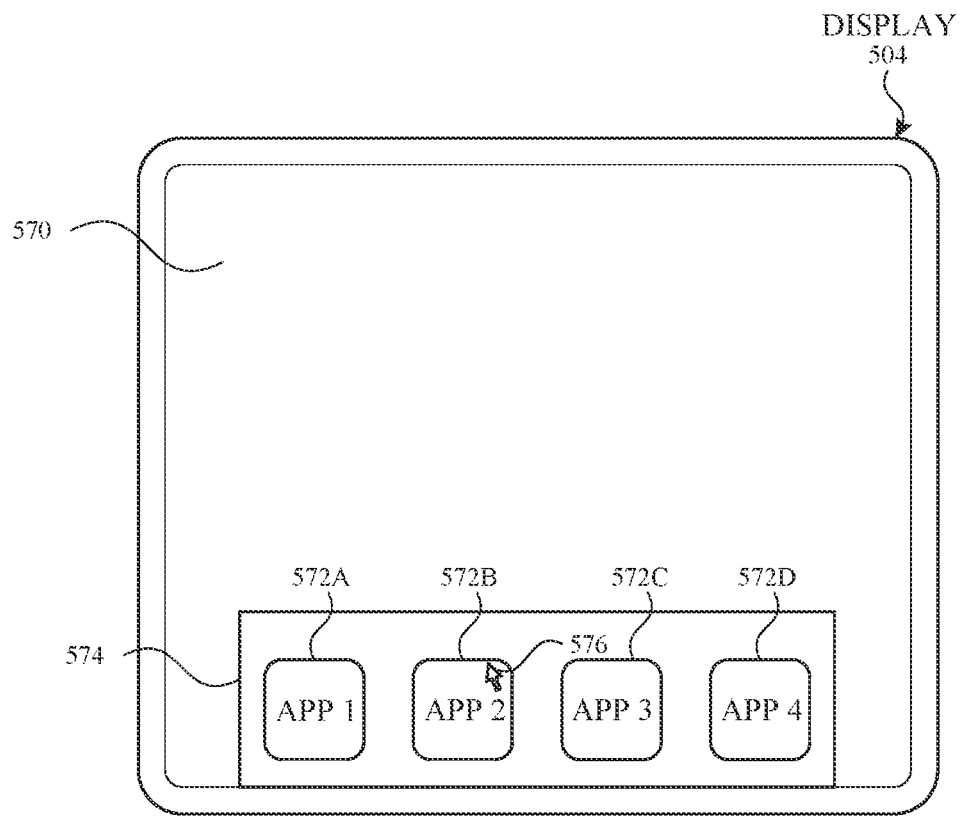
FIGS. 5E-5H illustrate exemplary components and user interfaces of a personal electronic device in accordance with some embodiments.
Figure 5E:
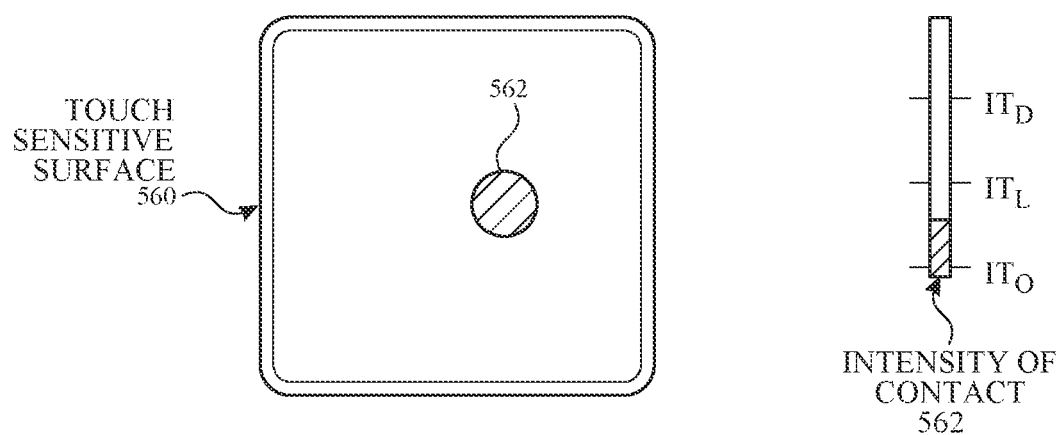
Figure 5F:
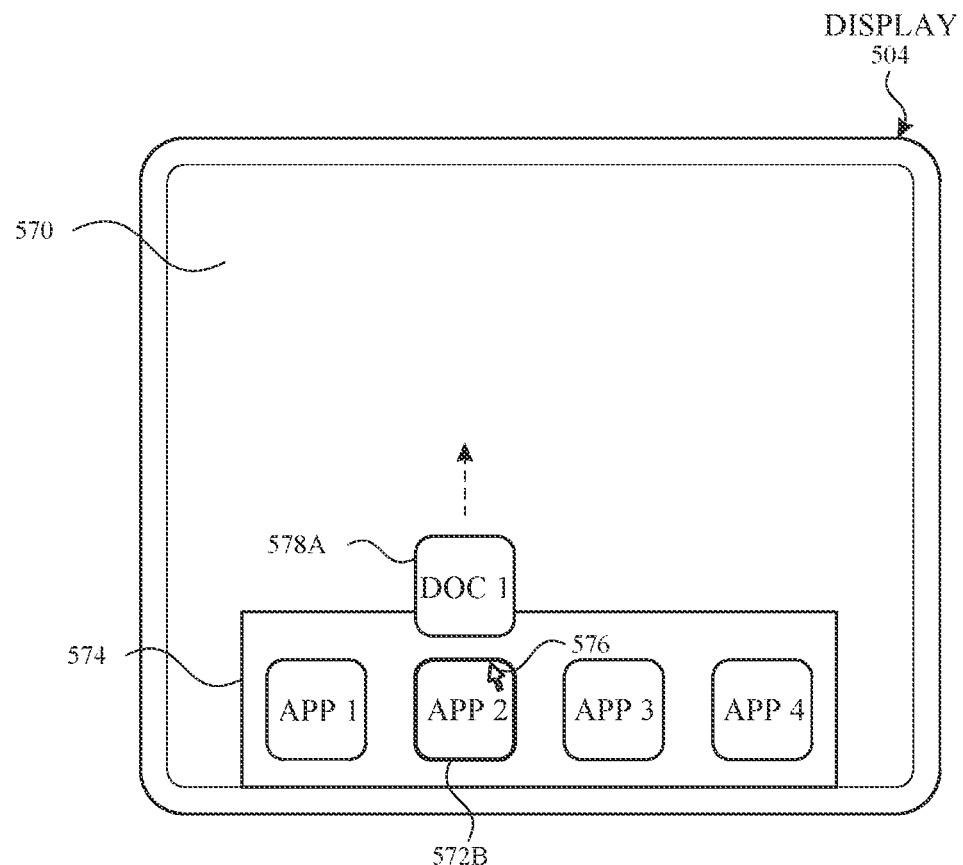
Figure 5F:
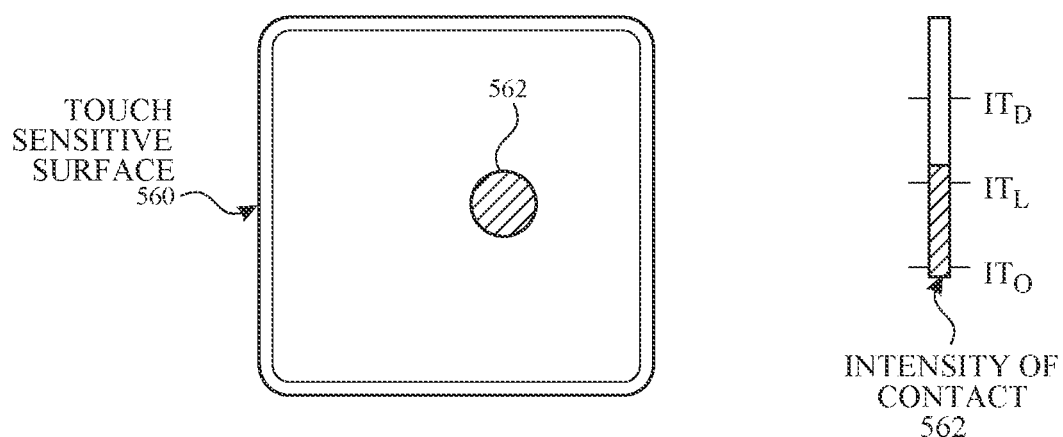
Figure 5G:
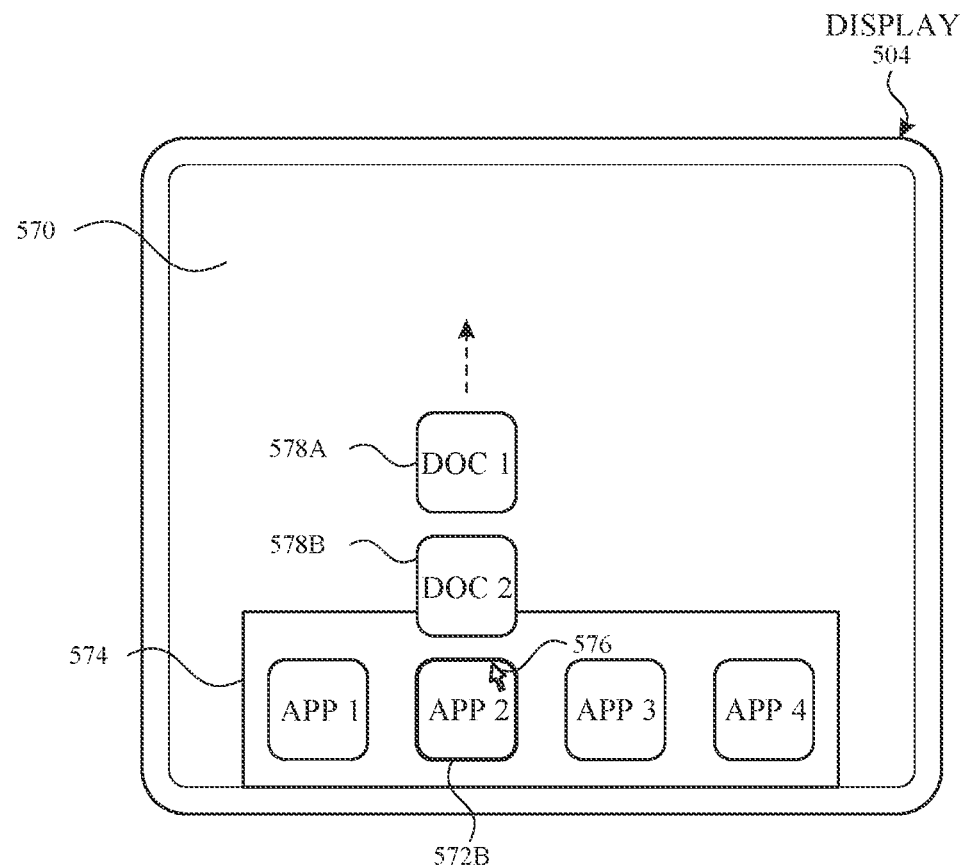
Figure 5G:
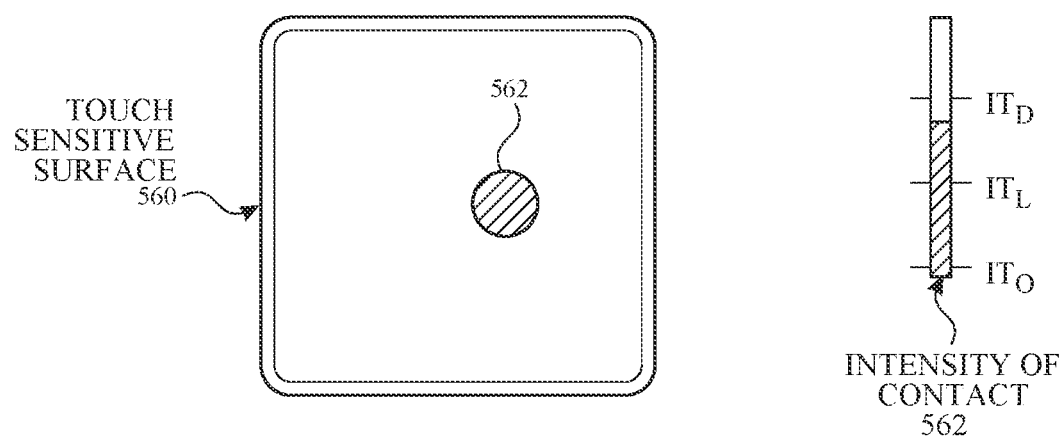
Figure 5H:
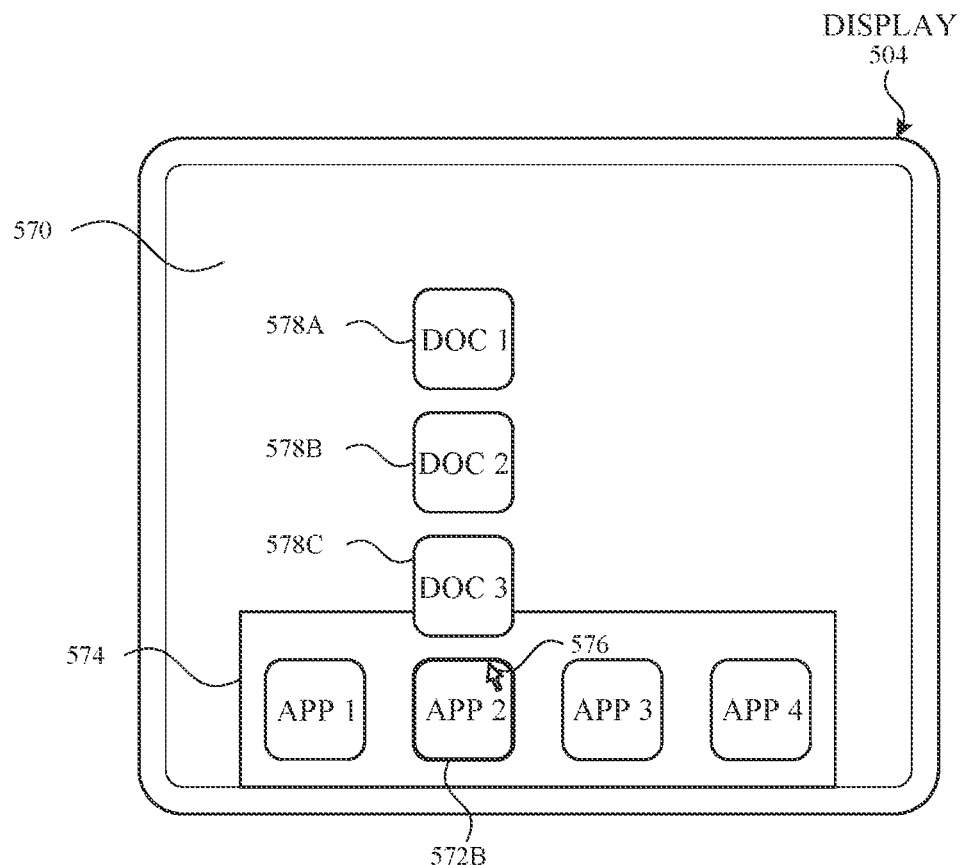
Figure 5H:
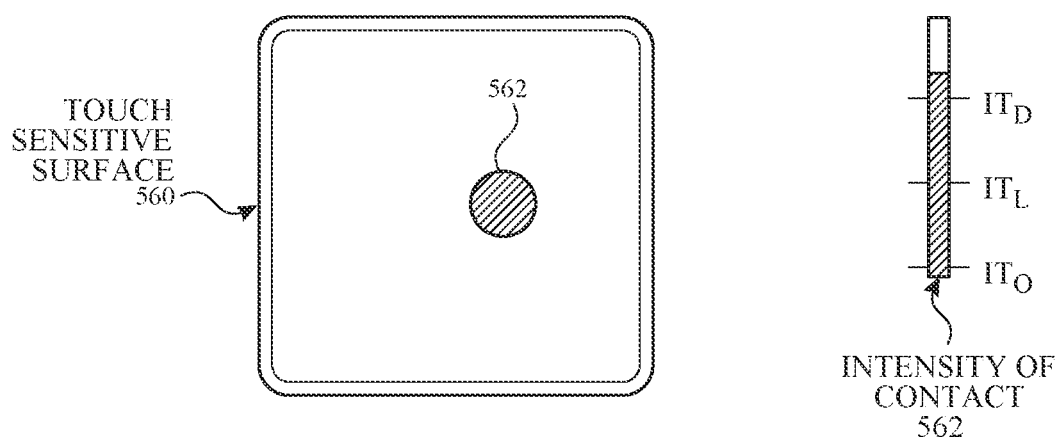

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Attention is now directed towards embodiments of user interfaces ("UI") and associated processes that are implemented on an electronic device, such as portable multifunction device 100, device 300, or device 500.

User Interfaces and Associated Processes

User Interfaces for Subscribing to Content Delivery Services

Users interact with electronic devices in many different manners, including using electronic devices to access content items via content delivery services. The embodiments described below provide ways in which an electronic device facilitates processes for subscribing to content services. Providing efficient manners of subscribing to content delivery services enhances interactions with a device, thus reducing the amount of time and number of inputs a user needs to access content items via a content delivery service and reducing the power usage of the device, which increases battery life for battery-powered devices. It is understood that people use devices. When a person uses a device, that person is optionally referred to as a user of the device.

FIGS. 6A-6M illustrate exemplary ways in which an electronic device 500a facilitates a process to subscribe to content delivery services in accordance with some embodiments. The embodiments in these figures are used to illustrate the processes described below, including the processes described with reference to FIG. 7. Although FIGS. 6A-6M illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6M.

In some embodiments, various subscriptions to a content service are available. For example, for a respective content service, a subscription that entitles the user to access content items via voice inputs and non-voice inputs (e.g., a "voice and non-voice subscription" or "Subscription B") is available and a subscription that entitles the user to access content items via voice inputs, but not via non-voice inputs (e.g., a "voice-only subscription" or "Subscription A") is available. In some embodiments, a voice input is an input detected by a microphone in communication with the electronic device 500a into which the user speaks requests to access content items via the content delivery service. In some embodiments, a non-voice input is an input detected by another (e.g., non-voice-detecting) input device in communication with the electronic device 500a, such as inputs detected by a touch screen (e.g., inputs selecting selectable options displayed via the touch screen or another display generation component in communication with the electronic device). The description herein discusses examples related to the voice-only subscription, which can correspond to "subscription A" in the drawings and the voice and non-voice subscription, which can correspond to "subscription B" in the drawings. In some embodiments, it is possible to subscribe to the content service with the voice-only subscription via voice input or by non-voice input. In some embodiments, it is possible to subscribe to the content service with the voice and non-voice subscription via non-voice inputs, but not via a voice input. In some embodiments, it is possible to subscribe to the content service with the voice and non-voice subscription via voice input or by non-voice input.

FIGS. 6A-6B illustrate an example of an electronic device 500a performing a process to subscribe a user account to a content delivery service. In some embodiments, the subscription to the content delivery service entitles the user to access content items in a catalog of content items of the content delivery service.

In FIG. 6A, for example, the electronic device 500a displays a user interface of an application associated with the content delivery service (e.g., an application installed on device 500a via with the user is able to browse and/or play content items available via the content delivery service). The user interface (e.g., a "product page" user interface) is associated with a collection of content items (e.g., an album of music) accessible via the content delivery service, for example. In some embodiments, the product page user interface includes a selectable option 602a that, when selected, causes the electronic device 500a to navigate back to a user interface that was displayed prior to display of the user interface illustrated in FIG. 6A. In some embodiments, the product page user interface includes a selectable option 602b that, when selected, causes the electronic device 500a to add the collection of content items to a content library of the user account (e.g., if the user account is subscribed to the content service). In some embodiments, if the user account is not subscribed to the content delivery service, selection of selectable option 602b causes the electronic device 500a to initiate a process to subscribe to the content delivery service to enable the user account to build a content library with the content delivery service. In some embodiments, the product page user interface includes a selectable option 602c that, when selected, causes the electronic device 500a to display a menu with additional selectable options that, when selected, cause the electronic device 500a to perform respective actions associated with the collection of content items. In some embodiments, the product page user interface includes an image 602d associated with the collection of content items, such as album artwork. In some embodiments, the product page user interface includes an indication 602e of the name of the collection of content items. In some embodiments, the product page user interface includes an indication 602f of an artist of the content items included in the collection of content items. In some embodiments, the product page user interface includes a plurality of indications 604a-d of content items included in the collection of content items. In some embodiments, if the user account is subscribed to the content delivery service with the voice and non-voice subscription, in response to detecting selection of one of the indications 604a-d, the electronic device 500a initiates playback of the content item.

In some embodiments, the product page user interface further includes a navigation bar 606a including selectable option 608a-e associated with various user interfaces of the application, such as a "listen now" user interface associated with option 608a, a "browse" user interface associated with option 608b, a "radio" user interface associated with option 608c, a "library" user interface associated with option 608d, and a "search" user interface associated with option 608e. For example, the "listen now" user interface associated with option 608a is a user interface that includes representations of content items suggested to the user for playback based on the content consumption history of the user account and/or based on listening trends among other users of the content delivery service. As another example, the "browse" user interface associated with option 608b is a user interface that includes representations of various content items available via the content delivery service sorted by artist, genre, and/or other criteria. As another example, the "radio" user interface associated with option 608c includes information about and selectable options to play streaming radio content accessible via the content delivery service. As another example, the "library" user interface associated with option 608d includes representations of content items included in a user's content library, such as content owned by the user or content accessible via the content delivery service added to the library (e.g., if the user account is subscribed to the voice and non-voice subscription). As another example, the "search" user interface associated with option 608e includes a user interface element to which an input defining a search query can be directed, thus enabling the user to search for particular items of content available via the content delivery service.

As shown in FIG. 6A, while the user account is not subscribed to the content delivery service with either the voice-only subscription or the voice and non-voice subscription, the electronic device 500a detects an input corresponding to a request to play a respective content item (e.g., "Twinkle, Twinkle Little Star"). In some embodiments, the input is a contact 603a detected via touch screen 504a that selects representation 604b. In some embodiments, the input is a voice input 610a. For example, the voice input 610a includes speech saying "play 'Twinkle Twinkle Little Star'," or something similar. Although FIG. 6A illustrates two inputs to play the content item for the purpose of illustrating a voice input 610a and a non-voice input (e.g., via contact 603a), it should be understood that, in some embodiments, the electronic device 500a detects one of these inputs, but not both. In some embodiments, in response to one of the inputs illustrated in FIG. 6A, the electronic device 500a presents the user interface illustrated in FIG. 6B.

FIG. 6B is an exemplary user interface for initiating a process to subscribe to the content delivery service. In some embodiments, the electronic device 500a presents the user interface illustrated in FIG. 6B in response to detecting one of the inputs illustrated in FIG. 6A. In some embodiments, the user interface includes an option 612a that, when selected, causes the electronic device to navigate back to the user interface previously displayed (e.g., the user interface illustrated in FIG. 6A). In some embodiments, the user interface includes an indication 612b of the terms of the subscription to the content delivery service. For example, in FIG. 6B, the user interface is associated with the voice-only subscription to the content delivery service and includes the terms of subscription and renewal for the voice-only subscription to the content delivery service. In some embodiments, the electronic device 500a displays the user interface illustrated in FIG. 6B in response to detecting a voice input corresponding to a request to play the content item and the electronic device 500a would instead display a user interface associated with the voice and non-voice subscription if the electronic device detected a non-voice input corresponding to a request to play the content item. In some embodiments, the user interface includes a selectable option 612c that, when selected, causes the electronic device 500a to initiate the process to subscribe to the content delivery service. For example, in response to detecting selection of option 612c, the electronic device 500a enrolls the user account in a free trial to the voice-only subscription to the content delivery service. In some embodiments, the user interface includes a selectable option 612d that, when selected, causes the electronic device 500a to present a user interface including selectable options for subscribing to other subscriptions to access the content delivery service, such as the voice and non-voice subscription and/or subscription plans that also include access to other services (e.g., video content services, cloud storage services, news services, fitness streaming services, etc.).

In some embodiments, in response to one of the inputs illustrated in FIG. 6A, the electronic device 500a presents a voice assistant output 614a with information about the subscription to the content delivery service (e.g., the voice-only subscription). The electronic device 500a optionally presents the voice assistant output 614a concurrently with the user interface illustrated in FIG. 6B or, in some embodiments, presents the voice assistant output 614a while continuing to display the user interface in FIG. 6A. For example, if the input received in FIG. 6A is a voice input, the electronic device 500a presents the voice assistant output 614a while continuing to display the user interface illustrated in FIG. 6A, but if the input received is a non-voice input, the electronic device 500a presents the user interface illustrated in FIG. 6B (e.g., with or without presenting the voice assistant output 614a). In some embodiments, the voice assistant output indicates that the electronic device can access the content item in response to voice inputs if the user subscribes to the content delivery service (e.g., with the voice-only subscription), includes information about the subscription, such as a free trial period and renewal terms, and an indication that, in response to further voice input from the user requesting to subscribe, the electronic device 500a can subscribe to the content delivery service (e.g., with the voice-only subscription). In some embodiments, the electronic device 500a can present analogous information about the voice and non-voice subscription. In some embodiments, the electronic device 500a can subscribe to the voice-only subscription through the voice assistant, but does not subscribe to the voice and non-voice subscription through the voice assistant.

In some embodiments, the electronic device 500a receives an input corresponding to a request to initiate a process to subscribe to the (e.g., voice only) subscription to the content delivery service, such as a voice input 610b or a non-voice input. For example, detecting selection of option 612c via contact 603b is a non-voice input and detecting the user speaking a request to subscribe to the content delivery service is a voice input 610b. In some embodiments, the voice input 610b includes speech saying "subscribe to the voice-only subscription to the content delivery service," or something similar. In some embodiments, in response to the input corresponding to the request to subscribe to the (e.g., voice only) subscription to the content delivery service, the electronic device 500a initiates the process to subscribe the user account to the (e.g., voice only) subscription to the content delivery service. For example, the electronic device 500a enrolls the user account in a limited-time free trial to the (e.g., voice only) subscription to the content delivery service that automatically renews as a paid subscription when the free trial period is over. In some embodiments, after subscribing the user account to the voice only subscription to the content delivery service, the user account is entitled to access content items from the content delivery service via voice inputs. In some embodiments, the electronic device 500a is able to subscribe the user account to the content delivery service (e.g., with the voice only subscription) in response to a sequence of voice inputs that does not include non-voice inputs. In some embodiments, the electronic device 500a is able to subscribe the user account to the content delivery service in response to the voice inputs when the voice inputs are received while the electronic device displays a user interface other than the user interface illustrated in FIG. 6B, such as while displaying a home screen user interface the same as or similar to the home screen user interface illustrated in FIG. 4A or while the electronic device 500a is not displaying a user interface (e.g., the display generation component 504a is off or on standby, or the electronic device 500a is not in communication with a display generation component).

FIGS. 6C-6E illustrate examples of various inputs corresponding to requests to access content items with the content service while the user account is subscribed to the content service with the voice-only subscription.

FIG. 6C illustrates the product page user interface once the user account of the electronic device 500a is subscribed to the content delivery service with the voice-only subscription. In some embodiments, the product page user interface in FIG. 6C can be the same as the product page user interface in FIG. 6A except for the differences noted herein. For example, the product page user interface includes an indication 618 that the user account is enrolled in a trial subscription to the content service with the voice-only subscription. In some embodiments, the indication 618 includes text indicating the period of the free trial and an option 620 that, when selected, causes the electronic device 500a to cease display of the indication 618. As another example, the product page user interface includes an indication 616 instructing the user to provide a voice input to play content items included in the collection of content items associated with the product page user interface (or any other content items). In some embodiments, while the user account is subscribed to the content delivery service with the voice-only subscription, selecting a representation 604a-c of a content item included in the collection of content items will cause the electronic device 500a to play a sample of the content item without playing the full content item, as will be described in more detail below with reference to method 900. As another example, the navigation bar 606b in the product page user interface that is displayed while the user account is subscribed to the content delivery service with the voice-only subscription is different from the navigation bar 606a illustrated in FIG. 6A in that the navigation bar 606b in FIG. 6C does not include a browse option 608b. In some embodiments, the electronic device 500a does not display the browse option 608b while the user account is subscribed to the content delivery service with the voice-only subscription because the browse user interface includes selectable options for initiating playback of content items with the content delivery service, and the user account is not entitled to access content items via the content delivery service in response to non-voice inputs.

As shown in FIG. 6C, in some embodiments, the electronic device 500a detects a voice input 610c corresponding to a request to play a respective content item (e.g., "Twinkle Twinkle Little Star"). In some embodiments, the electronic device 500a receives the voice input 610c while displaying the user interface illustrated in FIG. 6C. In some embodiments, the electronic device 500a receives the voice input while displaying a different user interface, such as the home screen user interface illustrated in FIG. 4A. In some embodiments, the electronic device 500a receives the voice input 610c while not displaying a user interface (e.g., the display generation component 504a is off or on standby or the electronic device 500a is not in communication with a display generation component). In some embodiments, the voice input 610c includes speech saying "play 'Twinkle Twinkle Little Star,'" or something similar. As shown in FIG. 6D, for example, in response to the input illustrated in FIG. 6C, the electronic device 500a initiates playback of the requested content item.

In FIG. 6D, while playing the requested content item, the electronic device 500a displays, in the user interface, a content playback element 622, for example. In some embodiments, the content playback element 622 includes an image 624a associated with the content item (e.g., a smaller version of image 602d, which can be album artwork associated with the collection of content items in which the content item is included), an indication 624b of the title of the content item, an option 624c to pause the content item, and an option 624d to skip to the next content item in a content item playback queue. In some embodiments, in addition to initiating playback of the content item in response to the input illustrated in FIG. 6C, the electronic device 500a provides an audio indication 614b indicating that the electronic device 500a is initiating playback of the requested content item. In some embodiments, the electronic device 500a provides output 614b while displaying the user interface illustrated in FIG. 6D. In some embodiments, the electronic device 500a provides output 614b while displaying a different user interface, such as the home screen user interface illustrated in FIG. 4A. In some embodiments, the electronic device 500a provides output 614b while not displaying a user interface (e.g., the display generation component 504a is off or on standby or the electronic device 500a is not in communication with a display generation component).

As shown in FIG. 6D, in some embodiments, the electronic device 500a detects a non-voice input corresponding to a request to play another content item in the collection of content items. For example, the non-voice input is detecting selection of option 604a via contact 603d. In some embodiments, in response to the input illustrated in FIG. 6D, the electronic device 500a initiates playback of a predetermined sample of the content item without playing the entire content item, as shown in FIG. 6E.

FIG. 6E illustrates an example of the electronic device 500a presenting a predetermined sample (e.g., a preview) of a content item in response to the input illustrated in FIG. 6D. In some embodiments, the electronic device 500a updates the content playback element 622 to include an image 624e associated with the predetermined sample of the content item (e.g., the same as an image associated with the content item itself) and an indication 624f that the electronic device 500a is playing a predefined sample of the content item. In some embodiments, the predefined sample is a subset of the content item that has a duration that is less than the duration of the entire content item and/or has a duration of a predefined threshold time for a predefined sample of a content item (e.g., 10, 15, 30, 45, 60, etc. seconds). In some embodiments, while presenting the predefined sample of the content item, the electronic device 500a presents an indication 626 that the electronic device 500a is presenting a predefined sample of the content item that includes text indicating that the electronic device 500a will play the entire content item in response to a voice input requesting the electronic device 500a to do so. In some embodiments, the indication 626 further includes a selectable option 628a that, when selected, causes the electronic device 500a to cease display of indication 626 and a selectable option 628b that, when selected, causes the electronic device 500a to initiate a process to subscribe the user account to the content delivery service with the voice and non-voice subscription. In some embodiments, while the user account is subscribed to the content delivery service with the voice and non-voice subscription, the electronic device 500a plays entire content items (e.g., and not just a predefined sample) in response to non-voice inputs, such as the input illustrated in FIG. 6D.

FIGS. 6F-6I illustrate examples of a second electronic device 500b in communication with the electronic device 500a subscribing the user account to the content delivery service and accessing content items. In some embodiments, the second electronic device 500b is an in-vehicle infotainment system. In some embodiments, similar processes can be performed by other devices, such as tablet computers, computers, set-top boxes, wearable devices, smart speakers, or similar. In some embodiments, the electronic device 500a is a smart phone, tablet computer, wearable device, computer, or similar.

FIG. 6F illustrates an example of the second electronic device 500b displaying a home screen, dashboard, or widget user interface that includes a plurality of application icons 630a-c and application user interfaces 632a-d. In some embodiments, in response to detecting selection of one of the application icons 630a-c, the second electronic device 500b presents a user interface of the application corresponding to the selected icon in place of one of the user interfaces 632a-d or as a full-screen user interface. In some embodiments, the second electronic device 500b detects a voice input 610d corresponding to a request to play a content item while the user account is not subscribed to the content delivery service and does not own the content item. In some embodiments, the voice input 610d includes speech saying "play 'Twinkle Twinkle Little Star,'" or something similar. In some embodiments, the electronic device 500b receives the voice input 610d while displaying a different user interface or while not displaying a user interface (e.g., the display generation component 504b is off or on standby, or the electronic device 500b is not in communication with a display generation component).

FIG. 6G illustrates an example of the second electronic device 500b presenting a voice assistant output 614c with information about subscribing to the content delivery service (e.g., with the voice-only subscription) in response to the input illustrated in FIG. 6F. In some embodiments, the information includes the terms of a free trial period and renewal. In some embodiments, the information includes instructions to provide a subsequent (e.g., voice) input to initiate the process to subscribe to the content delivery service (e.g., with the voice-only subscription). In some embodiments, the second electronic device 500b detects a voice input 610e corresponding to a request to subscribe to the content delivery service (e.g., with the voice-only subscription). In some embodiments, the voice input 610e includes speech saying "start free trial," or something similar. In some embodiments, the voice assistant output 614c and the voice input 610e are specific to the voice-only subscription to the content delivery service and it is not possible to subscribe to the voice and non-voice subscription to the content delivery service via voice inputs.

In some embodiments, the electronic device 500b provides the voice assistant output 614c and/or receives the voice input 610e while displaying the user interface illustrated in FIG. 6G. In some embodiments, the electronic device 500b provides the voice assistant output 614c and/or receives the voice input 610e while displaying a different user interface. In some embodiments, the electronic device 500b provides the voice assistant output 614c and/or receives the voice input 610c while not displaying a user interface (e.g., the display generation component 504a is off or on standby or the electronic device 500a is not in communication with a display generation component).

In some embodiments, in response to the voice input 610e illustrated in FIG. 6G, the second electronic device 500b initiates a process to subscribe the user account to the content delivery service with the voice-only subscription. In some embodiments, in response to the user account being subscribed to the content delivery service with the voice-only subscription via the inputs provided to device 500b, the electronic device 500a presents additional information about the subscription, as shown in FIG. 6H.

FIG. 6H illustrates an example of the electronic device 500a presenting an indication 634 that the user account of the electronic device 500a is subscribed to the content delivery service (e.g., with the voice-only subscription). In some embodiments, the indication 634 includes an indication 636a of an application associated with the content delivery service (e.g., an application associated with the user interfaces illustrated in FIGS. 6A-6E) and an indication 636b of the subscription to which the user is subscribed (e.g., the voice only subscription). In some embodiments, in response to detecting selection of indication 634, the electronic device 500a presents additional information about the subscription, such as renewal terms and how to access content items via voice input and/or a user interface of an application associated with the content delivery service. In some embodiments, the indication 634 is displayed until the user views or interacts with the indication 634, so if the user is not interacting with electronic device 500a when the electronic device 500a initially displays indication 634 (e.g., when the user account initially subscribes to the content delivery service), the user is able to view indication 634 later.

FIG. 6I illustrates an example of the second electronic device 500b presenting a user interface of an application associated with the content delivery service once the user account is subscribed to the content delivery service with the voice-only subscription. In some embodiments, the user interface is concurrently displayed with application icons 630a-c. In some embodiments, the user interface includes navigation options 638a-d, including a "listen now" option 638a similar to "listen now" option 608a described above with reference to FIG. 6A, a "radio" option 638b similar to the "radio" option 608c described above with reference to FIG. 6A, a "library" option 638c and a "voice input" option 638d. In some embodiments, the "library" option 638c is selectable to display a library user interface, such as the user interface illustrated in FIG. 6I which will be described in more detail shortly. In some embodiments, in response to detecting selection of the "voice input" option 638d, the electronic device 500b initiates a process to accept a voice input from the user (e.g., a voice input corresponding to a request to play a content item via the voice-only subscription to the content delivery service, or via the voice and non-voice subscription to the content delivery service).

In some embodiments, while the user account is subscribed to the content delivery service, the electronic device 500b displays the library user interface illustrated in FIG. 6I. In some embodiments, the user interface includes an indication 613i that the application is currently navigated to the library user interface. In some embodiments, the library user interface includes representations 640a-c of content items owned by the user (e.g., but does not include indications of content items accessible via the content delivery service but not owned by the user) because the user account is subscribed to the content delivery service with the voice-only subscription. If the user were subscribed to the content delivery service with the voice and non-voice subscription, the library user interface would optionally include content items owned by the user and content items accessible via the voice and non-voice subscription to the content delivery service, for example. In some embodiments, each representation 640a includes an image 642a associated with the content item (e.g., album artwork) and an indication 642b of the title of the content item. In some embodiments, in response to detecting a non-voice input selecting one of the representations 640a-c, the electronic device 500b initiates playback of the content item associated with the selected representation because the content items corresponding to the representations 640a-c are owned by the user (e.g., rather than being accessed via the voice-only subscription to the content delivery service)

Figure 6K:
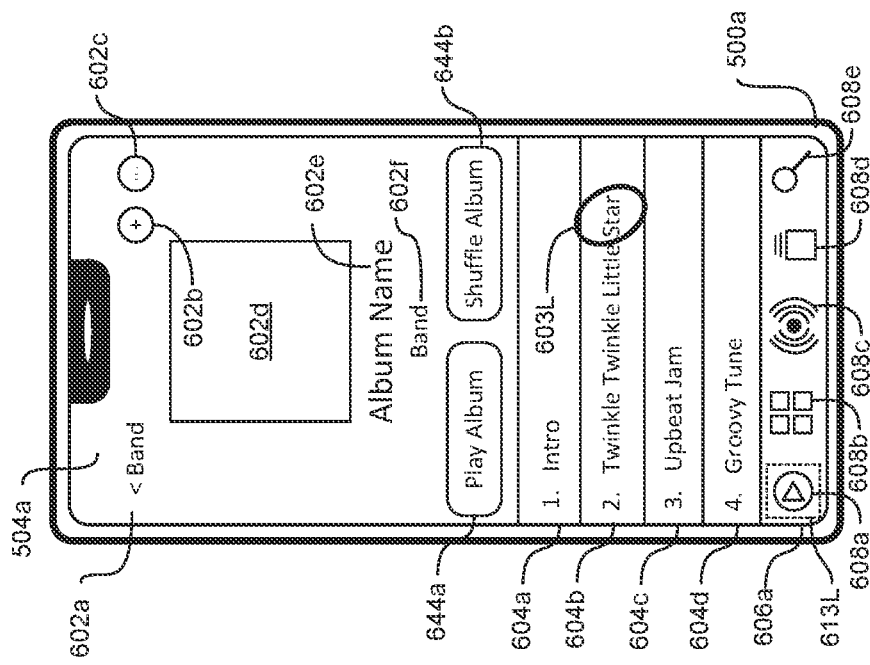
Figure 6K:
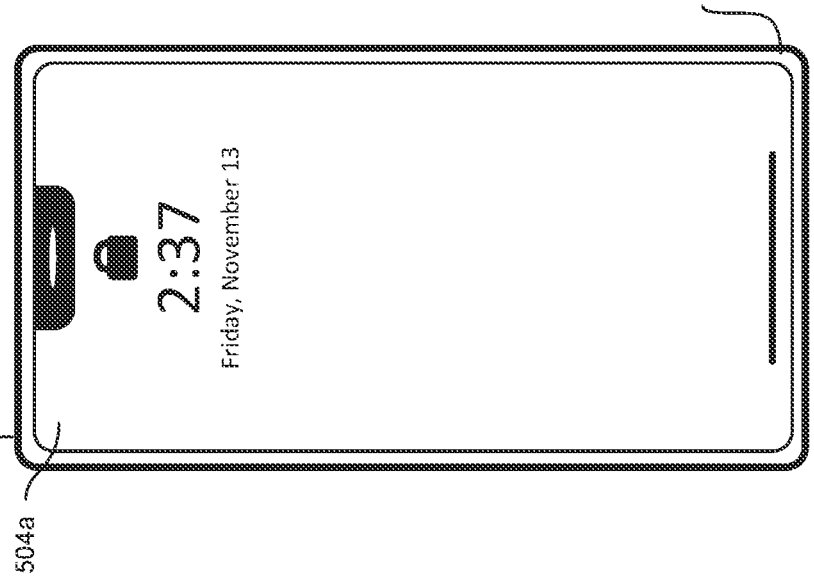

FIGS. 6J-6K illustrate examples of the user attempting to subscribe to the voice and non-voice subscription to the content delivery service via voice input and the response of the electronic device. In some embodiments, it is not possible to subscribe to the voice and non-voice subscription to the content delivery service via voice input.

FIG. 6J illustrates an example of the electronic device 500a presenting a lock screen user interface (e.g., the first user interface displayed by device 500a upon waking from a no- or low-power state). In some embodiments, the electronic device 500a receives a voice input 610f corresponding to a request to subscribe the user account to the content delivery service with the voice and non-voice subscription. For example, the voice input includes speech saying "subscribe to the voice and non-voice subscription to the content delivery service," or something similar. In some embodiments, the voice input 610f is received while the electronic device 500a presents a different user interface. In some embodiments, the electronic device 500a receives the voice input 610f while not displaying a user interface (e.g., the display generation component 504a is off or on standby or the electronic device 500a is not in communication with a display generation component). In some embodiments, in response to the input and irrespective of the user interface presented by the electronic device 500a while the voice input 610f is received, the electronic device 500a presents a voice assistant output 614d as shown in FIG. 6K.

FIG. 6K illustrates an example of the electronic device 500a presenting a voice assistant output 614d in response to the voice input 610f illustrated in FIG. 6J. In some embodiments, the voice assistant output 614d indicates that it is not possible to subscribe the user account to the voice and non-voice subscription via voice input. In some embodiments, the voice assistant output 614d includes information about how to subscribe to the voice and non-voice subscription to the content delivery service, such as navigating to a user interface associated with the content delivery service and subscribing via non-voice inputs provided to that user interface (e.g., such as the user interface described below with reference to FIG. 8B and other similar user interfaces). In some embodiments, the voice assistant output 614d includes an indication that it is possible to subscribe to the voice-only subscription to the content delivery service via voice input.

In some embodiments, the electronic device 500a provides the voice output 614d while displaying the user interface illustrated in FIG. 6K. In some embodiments, the electronic device 500a provides the voice assistant output 614d while displaying a different user interface, such as the home screen user interface illustrated in FIG. 4A. In some embodiments, the electronic device 500a provides the voice assistant output 614d while not displaying a user interface (e.g., the display generation component 504a is off or on standby or the electronic device 500a is not in communication with a display generation component).

Figure 6M:
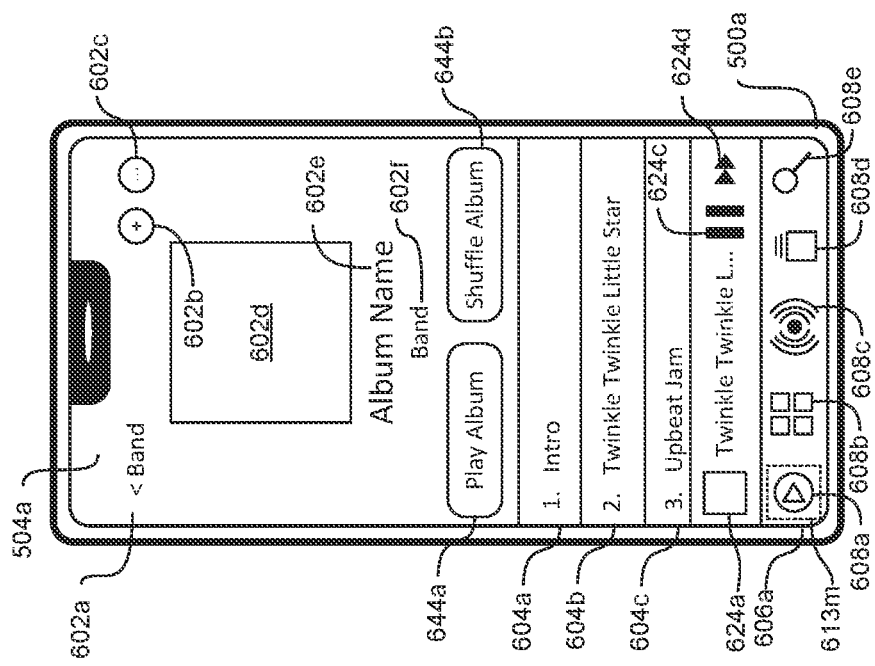

In some embodiments, there are differences in how the electronic device 500a presents the product page user interface depending on whether the user is subscribed to the voice-only subscription to the content delivery service, as shown in FIGS. 6C-6E for example, or the voice and non-voice subscription to the content delivery service. FIGS. 6L-6M illustrate examples of the electronic device 500a presenting the product page user interface while the user account is subscribed to the content delivery service with the voice and non-voice subscription.

FIG. 6L illustrates an example of the electronic device 500a presenting the product page user interface while the user account is subscribed to the content delivery service with the voice and non-voice subscription. The product page user interface in FIG. 6L is optionally the same as the product page in FIG. 6A when the user was not subscribed to the content delivery service and the product page in FIG. 6C when the user was subscribed to the content delivery service with the voice-only subscription except for the differences noted herein. In some embodiments, the product page user interface includes selectable options 644a and 644b that, when selected, cause the electronic device 500a to play the collection of content items instead of displaying the indication 616 illustrated in FIG. 6C. In some embodiments, the electronic device 500a does not display the selectable options 644a and 644b while the user account is subscribed with the voice-only subscription, as shown in FIG. 6C, for example. In some embodiments, in response to detecting selection of option 644a, the electronic device 500a initiates playback of the collection of content items in a predetermined order (e.g., the order indicated in the product page user interface). In some embodiments, in response to detecting selection of option 644b, the electronic device 500a initiates playback of the collection of content items in a shuffled order different from predetermined order (e.g., the order indicated in the product page user interface). In some embodiments, while the user account is subscribed to the content delivery service with the voice and non-voice subscription, the product page user interface includes the navigation bar 606a including the browse option 608b described above with reference to FIG. 6A. In some embodiments, while the user account is subscribed to the content delivery service with the voice and non-voice subscription, the electronic device 500a initiates playback of respective content items included in the collection of content items in response to detecting selection of the representations 604a-d of the content items. For example, in FIG. 6L, the electronic device 500a detects selection of option 604b, via contact 603L, associated with "Twinkle Twinkle Little Star".

FIG. 6M illustrates an example of the electronic device 500a initiating playback of a content item in response to the input illustrated in FIG. 6L. In some embodiments, while playing the content item, the electronic device 500a presents the content playback element described above with reference to FIG. 6D. Thus, in some embodiments, while the user account is subscribed to the content delivery service with the voice and non-voice subscription, in response to receiving a non-voice input corresponding to a request to play a content item, the electronic device 500a initiates playback of the (e.g., entire) content item, and not just a preview of the content item. In some embodiments, the electronic device 500a would also initiate playback of the (e.g., entire) content item in response to a voice input that is received while the user account is subscribed to the content delivery service with the voice and non-voice subscription.

FIG. 7 is a flow diagram illustrating a method of facilitating a process to subscribe to content delivery services in accordance with some embodiments. The method 700 is optionally performed at an electronic device such as device 100, device 300, device 500, device 500a, and 500b as described above with reference to FIGS. 1A-1B, 2-3, 4A-4B and 5A-5H. Some operations in method 700 are, optionally, combined and/or order of some operations is, optionally, changed.

As described below, the method 700 provides ways in which an electronic device subscribes to content delivery services. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., 500*a*) in communication with one or more input devices (e.g., a mobile device (e.g., a tablet, a smartphone, a media player), a computer (e.g., a desktop computer, a laptop computer), or a wearable device (e.g., a watch, a head-mounted device), or a set-top box in communication one or more input devices (e.g., a remote control), or a smart speaker (e.g., an electronic device including one or more speakers and input devices, but not including a touch screen or other touch input device for initiating a process to subscribe to a subscription that provides access to content, as described below), or an in-vehicle infotainment system. In some embodiments, the one or more input devices include a microphone or other audio sensor.

In some embodiments, the electronic device (e.g., 500*a*) receives (702), via the one or more input devices (e.g., a microphone or other audio sensor), a voice input (e.g., 610*a*) corresponding to a request to initiate playback of a content item (e.g., at the electronic device), such as in FIG. 6A. In some embodiments, the content item is audio content, such as music or spoken audio (e.g., podcasts, audiobooks). In some embodiments, the content item is video content, such as an episode in a series of episodic content or a movie. In some embodiments, the voice input is processed by a voice assistant application of the electronic device. In some embodiments, the voice input specifies the content item to be played (e.g., "play 'Twinkle, Twinkle Little Star'"). In some embodiments, the voice input does not specify the content item to be played (e.g., "play music"). In some embodiments, the input corresponds to a request to play the content at the electronic device. For example, a smart speaker detects an input to play the content on the smart speaker. In some embodiments, the input corresponds to a request to play the content at a second electronic device in communication with the electronic device. For example, a smartphone detects an input to play the content on a smart speaker in communication with the smartphone.

In some embodiments, in response to receiving the voice input (e.g., 610*a* in FIG. 6A) (704), in accordance with a determination that a user account associated with the electronic device is entitled to access the content item, the electronic device (e.g., 500*a*) initiates (706) playback of the content item (e.g., at the electronic device, or at another electronic device in communication with the electronic device), such as in FIG. 6D. In some embodiments, the user account associated with the electronic device is a user account for backing up data, purchasing applications, and/or receiving messages from other electronic devices and is not specific to a content application on one or more electronic devices, including the electronic device. For example, the user account is used to access content items, access applications, store and access data, send and receive messages, and perform other operations on the electronic device (e.g., and one or more additional electronic device associated with the user account, if any) associated with a plurality of applications and/or the operating system of the electronic device (e.g., and one or more additional electronic device associated with the user account, if any). In some embodiments, the user account is specific to a content application. For example, the user account is used to access content items on one or more electronic devices using a respective application but is not associated with (e.g., any, one or more) other applications accessible to the one or more electronic devices. In some embodiments, the user account is entitled to access the content item because the content item is downloaded to the electronic device, owned by the user account, and/or accessible via an active (e.g., content streaming) subscription associated with the user account.

In some embodiments, in response to receiving the voice input (704) (e.g., 610*a* in FIG. 6A), in accordance with a determination that the user account associated with the electronic device (e.g., 500*a*) is not entitled to access the content item, the electronic device (e.g., 500*a*) initiates (708) a process to subscribe the user account to a content delivery service with a first type of subscription that entitles the user account to access the content item at one or more electronic devices, including the electronic device (e.g., 500*a*), using only voice input, such as in FIG. 6B. In some embodiments, the user account is not entitled to access the content item because the content item is not downloaded to the electronic device, not owned by the user account, and not accessible via an active (e.g., content streaming) subscription to a content delivery service associated with the user account. In some embodiments, the first type of subscription is a subscription to a content delivery (e.g., streaming, playback, etc.) service that entitles the user to access a plurality of content items via voice inputs but not using non-voice input. In some embodiments, non-voice inputs include inputs detected via input devices other than microphones and other audio sensors, such as touch inputs. In some embodiments, non-voice inputs include selection of user interface elements displayed in a user interface presented via a display generation component in communication with the electronic device, such as described with reference to method 900. In some embodiments, a second type of subscription entitles the user account to access a plurality of content items (including the content item) using voice inputs and non-voice inputs. In some embodiments, the process to subscribe the user account to the content delivery service with the first type of subscription is a voice-input process in which the electronic device presents audio including information about the subscription and accepts audio inputs to proceed with the process to subscribe the user account to the content delivery service with the first type of subscription. For example, in response to the voice input to access the content item, the electronic device presents audio information about the first type of subscription to the content delivery service and/or audio requesting further voice input to continue the process to subscribe to the content delivery service with the first type of subscription. In some embodiments, in response to receiving an additional voice input confirming the user wishes to subscribe to the content delivery service with the first type of subscription, the electronic device subscribes the user account to the content delivery service with the first type of subscription. In some embodiments, subscribing (or initiating a subscription) the user account to the content delivery service with the first type of subscription includes starting a free trial period of the subscription to the content delivery service with the first type of subscription and, after the free trial period ends, the electronic device initiates a payment process to collect payment for continued access to the content delivery service with the first type of subscription. In some embodiments, the user is not able to subscribe to the content delivery service with the second type of subscription (e.g., a subscription that entitles the user to access content items via both voice input and non-voice input) via the electronic device. In some embodiments, the user is able to subscribe to the content delivery service with the second type of subscription via a second electronic device and then access the content delivery service with the second type of subscription via the electronic device if the electronic device and second electronic device are both associated with the same user account (e.g., the user account used to subscribe to the second type of subscription). In some embodiments, while the user is subscribed to the content delivery service with the first type of subscription, in response to a subsequent voice input corresponding to a request to play the content item, the electronic device plays the content item without initiating a process to subscribe to the content delivery service with the first type of subscription.

The above-described manner of initiating the process to subscribe to the content delivery service with the first type of subscription in response to the voice input provides an efficient way of providing access to a content item to which the user is not entitled to access, which additionally reduces power usage and improves battery life of the electronic device by enabling the user to use the electronic device more quickly and efficiently.

In some embodiments, such as in FIG. 6D, the determination that the user account associated with the electronic device (e.g., 500a) is entitled to access the content item is a determination that the user account is subscribed to the content delivery service with the first type of subscription, or the user account is subscribed to the content delivery service with a second type of subscription that entitles the user account to access the content at the one or more electronic devices using voice input and non-voice input, or the user account owns (e.g., access rights to) the content item. In some embodiments, the first type of subscription and second type of subscriptions are subscriptions to the same content delivery service at different tier levels. For example, the first type of subscription to the content delivery service entitles the user to access content via voice input, but not non-voice input and the second type of subscription to the content delivery service entitles the user to access content via voice input and non-voice input. In some embodiments, the user owns the content item if the user has previously purchased access rights to the content item or been gifted the item, such as through a content item (e.g., download) store or the content item had been provided for free download from the content item store or content provider (e.g., artist gifting free music, content delivery service giving music). In some embodiments, the user account is entitled to access the content item through a content delivery service other than the content delivery service associated with the first or send type of subscription and, in response to the input, the electronic device initiates playback of the content item. In some embodiments, if the user account is entitled to access the content item in at least one way (e.g., through a content delivery service or by owning the content item), the electronic device plays the content item in response to the voice input corresponding to the request to initiate playback of the content item.

In some embodiments, such as in FIG. 6B, the determination that the user account associated with the electronic device (e.g., 500a) is not entitled to access the content item includes a determination that the user account is not subscribed to the content delivery service with the first type of subscription, the user account is not subscribed to the content delivery service with the second type of subscription, and the user account does not own (e.g., access rights to) the content item. In some embodiments, the user account is entitled to access the content item through a content delivery service other than the content delivery service associated with the first and second types of subscriptions and, in response to the voice input corresponding to the request to initiate playback of the content item, the electronic device initiates the process to subscribe the user account to the content delivery service with the first type of subscription. In some embodiments, if the user account is not entitled to access the content item through the subscription service associated with the first and second types of subscriptions (e.g., or another content delivery service) or because the user does not own the content, the electronic device initiates the process to subscribe the user account to the content delivery service with the first type of subscription in response to the voice input corresponding to the request to initiate playback of the content item.

Determining whether the user is entitled to access the content item based on subscriptions and/or ownership provides an efficient way of initiating playback of the content item independent of the way the user is entitled to access the content item, which reduces the number of inputs needed to initiate playback of the content item.

In some embodiments, if the user account is entitled to access the content item through a subscription to a content delivery service, the electronic device initiates playback to the content item via the content delivery service to which the user has the subscription.

In some embodiments, initiating the process to subscribe the user account to the content delivery service with a first type of subscription includes transmitting an indication of subscribing to the content delivery service with the first type of subscription to a second electronic device (e.g., 500a in FIG. 6H) (e.g., a smartphone, a tablet, a laptop or desktop computer) in communication with the electronic device (e.g., 500b in FIG. 6F) (e.g., a wearable device (e.g., smart watch), a smart speaker, an infotainment device in a vehicle, a tablet), wherein the second electronic device (e.g., 500a) presents information (e.g., 634 in FIG. 6H) (e.g., via a display generation component in communication with the second electronic device) about the first type of subscription in response to receiving the indication of subscribing to the content delivery service with the first type of subscription. In some embodiments, the second electronic device communicates with a server (e.g., associated with the content delivery service) to enroll the user account in the first type of subscription to the content delivery service and, once the user account is subscribed to the first type of subscription to the content delivery service, presents information about the subscription, such as how to access content with the first type of subscription to the content delivery service, the terms for renewing the subscription (e.g., cost and frequency of renewal), and information about a free trial period, if any. In some embodiments, in response to the user account enrolling the user in the first type of subscription to the content delivery service, the electronic device presents an audio indication confirming enrollment in the first type of subscription to the content delivery service (e.g., without presenting information about the subscription on a display generation component). In some embodiments, the second electronic device presents the information in an indication that, when selected, causes the electronic device to either present additional information about the first type of subscription to the content delivery service or present a user interface of an application associated with the content delivery service.

Presenting the information about the first type of subscription with the second electronic device provides an efficient way of enabling the user to review the information at a time that is convenient to them, which reduces the number of inputs needed to access the information at that time.

In some embodiments, the information about the first type of subscription includes an indication (e.g., 636a) of one or more content items available via the first type of subscription, such as in FIG. 6H. In some embodiments, the one or more content items available via the first type of subscription are the same as the one or more content items available via the second type of subscription. In some embodiments, the indication of the one or more content items is presented in a user interface including other information relevant to the user upon subscribing to the first type of subscription (e.g., pricing and renewal information, information about accessing the content via voice input). In some embodiments, the indication of the one or more content items is presented in a user interface of a content (e.g., streaming, playback) application associated with the content delivery service that includes indications of content items available through the content delivery service that, if the user is subscribed to a second type of subscription, are selectable to initiate playback of the content item corresponding to the selected indication.

Presenting indications of the one or more content items available via the first type of subscription in response to the user subscribing to the first type of subscription to the content delivery service provides an efficient way for the user to browse content items accessible via the first type of subscription, which reduces the number of inputs and time to use the first subscription to access content.

In some embodiments, such as in FIG. 6D, while the user account associated with the electronic device (e.g., 500a) is subscribed to the content delivery service with the first type of subscription, the electronic device (e.g., 500a) receives, via the one or more input devices, an input (e.g., via contact 603d) corresponding to a request to present a respective item of content, such as in FIG. 6D. In some embodiments, the first type of subscription entitles the user to access content via the content delivery service using voice inputs but not via non-voice inputs.

In some embodiments, such as in FIG. 6C, while the user account associated with the electronic device (e.g., 500a) is subscribed to the content delivery service with the first type of subscription, in response to receiving the input (e.g., 610c) corresponding to the request to present the respective item of content, in accordance with a determination that the input (e.g., 610c) corresponding to the request to present the respective item of content is a voice input, the electronic device (e.g., 500a) presents the respective item of content, such as in FIG. 6D. In some embodiments, the voice input is an audio input, such as a request made to a virtual assistant of the electronic device or of the content delivery service. In some embodiments, presenting the respective item of content includes presenting audio content and displaying a visual indication that the audio content is being presented.

In some embodiments, such as in FIG. 6D, while the user account associated with the electronic device (e.g., 500a) is subscribed to the content delivery service with the first type of subscription, in response to receiving the input (e.g., via contact 603d) corresponding to the request to present the respective item of content, in accordance with a determination that the input (e.g., via contact 603d) corresponding to the request to present the respective item of content is a non-voice input, the electronic device (e.g., 500a) displays, via the display generation component (e.g., 504a), a visual indication (e.g., 626) that the respective content item is only accessible via voice input without presenting the respective item of content, such as in FIG. 6E. In some embodiments, the non-voice input is selection of an indication of the respective item of content. In some embodiments, the visual indication includes an indication that the electronic device will present the item of content in response to a voice input for presenting the content. In some embodiments, the visual indication includes a selectable option that, when selected, causes the electronic device to initiate a process to subscribe to a second type of subscription to the content delivery service that entitles the user to access content via the content delivery service in response to non-voice inputs in addition to in response to voice inputs. In some embodiments, in accordance with the determination that the user account is subscribed to the content delivery service with the first type of subscription and the input is a non-voice input, the electronic device presents a predefined subset of the respective item of content without presenting a second portion of the content item (e.g., the rest of the content item, the entire content item) according to one or more steps of method 900 while presenting the visual indication. In some embodiments, in accordance with a determination that the user is subscribed to the content delivery service with the second type of subscription, in response to the input corresponding to the request to present the respective item of content, irrespective of whether the input is a voice input or a non-voice input, the electronic device presents the respective item of content.

Presenting the visual indication that the respective content item is only accessible via voice input in response to the non-voice input provides an efficient way of informing the user how to access the content item with the first type of subscription to the content delivery service, which reduces the time and number of inputs needed to access the content item via the first type of subscription to the content delivery service.

In some embodiments, such as in FIG. 6E, the visual indication (e.g., 626) that the respective content item is only accessible via voice input includes information about a second type of subscription that entitles the user account to access the content at the one or more electronic devices using voice input and non-voice input, and a selectable option (e.g., 628b) that, when selected, causes the electronic device (e.g., 500a) to initiate a process to subscribe the user account associated with the electronic device (e.g., 500a) to the content delivery service with the second type of subscription. In some embodiments, once the user account is subscribed to the content delivery service with the second type of subscription, in response to detecting a non-voice input corresponding to a request to present the respective item of content, the electronic device presents the respective item of content without presenting the visual indication.

Including information about the second type of subscription and the selectable option that causes the electronic device to initiate the process to subscribe the user account to the second type of subscription provides an efficient way of accessing the respective content item with a non-voice input which reduces the time and inputs needed to access the respective content item.

In some embodiments, while the user account of the electronic device (e.g., 500b) is subscribed to the content delivery service with the first type of subscription, such as in FIG. 6I, while displaying, via the display generation component (e.g., 504b), a user interface associated with the first type of subscription that includes a visual indication (e.g., 640a) of a first respective content item owned by the user account associated with the electronic device (e.g., 500b), the electronic device (e.g., 500b) receives, via the one or more input devices, an (e.g., non-voice, voice) input corresponding to selection of the visual indication (e.g., 640a) of the first respective content item. In some embodiments, the first type of subscription entitles the user to access content via the content delivery service using voice inputs but not via non-voice inputs. In some embodiments, the user interface includes visual indications of content items owned by the user account associated with the electronic device and does not include visual indications of content items not owned by the user account (e.g., including content items accessible via the first type of subscription to the content delivery service). In some embodiments, the user account is entitled to play content items owned by the user account without having a subscription to the content delivery service.

In some embodiments, while the user account of the electronic device (e.g., 500b) is subscribed to the content delivery service with the first type of subscription, such as in FIG. 6I, while displaying, via the display generation component (e.g., 504b), a user interface associated with the first type of subscription that includes a visual indication (e.g., 640a) of a first respective content item owned by the user account associated with the electronic device (e.g., 500b), in response to receiving the input corresponding to selection of the visual indication (e.g., 640a) of the first respective content item, the electronic device (e.g., 500b) presents the first respective content item. In some embodiments, the electronic device presents the first respective content item in response to a voice input or in response to a non-voice input because the user account owns the first respective content item.

In some embodiments, while the user account of the electronic device (e.g., 500b) is subscribed to the content delivery service with the first type of subscription, such as in FIG. 6I, while displaying, via the display generation component (e.g., 504b), a user interface associated with the first type of subscription that includes a visual indication (e.g., 640a) of a first respective content item owned by the user account associated with the electronic device (e.g., 500b), the electronic device (e.g., 500b) receives, via the one or more input devices, a voice input corresponding to a request to present a second respective content item (e.g., the user account associated with the electronic device is entitled to access the second respective content item through the first type of subscription using a voice input but not a non-voice input). In some embodiments, the user account does not own the second respective content item.

In some embodiments, while the user account of the electronic device (e.g., 500b) is subscribed to the content delivery service with the first type of subscription, such as in FIG. 6I, while displaying, via the display generation component (e.g., 504b), a user interface associated with the first type of subscription that includes a visual indication (e.g., 640a) of a first respective content item owned by the user account associated with the electronic device (e.g., 500b), in response to receiving the voice input corresponding to the request to present the second respective content item, the electronic device (e.g., 500b) presents the second respective content item. In some embodiments, if the user account does not own the second respective content item and is entitled to access it via the first type of subscription to the content delivery service, in response to a non-voice input corresponding to a request to access the second respective content item, the electronic device forgoes presenting the non-voice input.

Presenting content items owned by the user account in response to voice inputs and non-voice inputs provides an efficient way of accessing content owned by the user, which reduces the time and inputs needed to access content items owned by the user account.

In some embodiments, such as in FIG. 6A, while the user account associated with the electronic device (e.g., 500a) is not entitled to access a respective content item, (e.g., the first type of subscription entitles the user to access the respective content item in response to a voice input, but not a non-voice input, a second type of subscription entitles the user to access the respective content item in response to a voice input or a non-voice input), the electronic device (e.g., 500a) displays, via the display generation component (e.g., 504a), a representation (e.g., 604b) of a respective content item; In some embodiments, the representation of the respective content item is displayed in a user interface associated with the content delivery service. In some embodiments, such as in FIG. 6A, while the user account associated with the electronic device (e.g., 500a) is not entitled to access a respective content item, the electronic device (e.g., 500a) receives, via the one or more input devices, an (e.g., non-voice) input (e.g., via contact 603a) corresponding to selection of the representation (e.g., 604b) of the respective content item. In some embodiments, while the user account associated with the electronic device (e.g., 500a) is not entitled to access a respective content item, in response to receiving the input (e.g., via contact 603a) corresponding to selection of the representation (e.g., 604b) of the respective content item, such as in FIG. 6A, the electronic device (e.g., 500a) initiates the process to subscribe the user account to the content delivery service with the first type of subscription, such as in FIG. 6B. In some embodiments, in response to a non-voice input corresponding to selection of the representation of the respective content item, the process to subscribe to the content delivery service with the first type of subscription includes displaying, via the display generation component, a selectable option that, when selected, causes the electronic device to subscribe to the first type of subscription. In some embodiments, in response to the voice input to access the content item, the process to subscribe the user account to the first type of subscription does not include displaying a selectable option and, instead, includes a process to subscribe to the first type of subscription using a voice assistant of the electronic device (e.g., without requiring display of information or non-voice input detected via, for example, a touch screen of the device). Initiating the process to subscribe the user account to the content delivery service with the first type of subscription in response to the input corresponding to selection of the representation of the respective content item provides an efficient way of gaining access to the respective content item via the content delivery service, which reduces the amount of time and inputs needed to access content items.

In some embodiments, such as in FIG. 6J, the electronic device (e.g., 500a) receives, via the one or more input devices, an input (e.g., 6100 corresponding to a request to subscribe the user account to the content delivery service with a second type of subscription that entitles the user account to access the content item using voice input or non-voice input. In some embodiments, in accordance with a determination that the user account is subscribed to the content delivery service with the second type of subscription, in response to an input corresponding to a request to access a respective content item via the content delivery service, the electronic device presents the respective content item irrespective of whether the input is a voice input or a non-voice input.

In some embodiments, in response to receiving the input corresponding to the request to subscribe the user account to the content delivery service with the second type of subscription, in accordance with a determination that the input corresponding to the request to subscribe the user account to the content delivery service with the second type of subscription is a non-voice input (e.g., selection of option 628b in FIG. 6E), the electronic device (e.g., 500a) initiates a process to subscribe the user account to the content delivery service with the second type of subscription. In some embodiments, the electronic device presents a user interface including a selectable option that, when selected, causes the electronic device to subscribe to the content delivery service with the second type of subscription and the input corresponding to the request to subscribe the user account to the content delivery service with the second type of subscription includes selection of the selectable option.

In some embodiments, in response to receiving the input corresponding to the request to subscribe the user account to the content delivery service with the second type of subscription, in accordance with a determination that the input (e.g., 6100 corresponding to the request to subscribe the user account to the content delivery service with the second type of subscription is a voice input, such as in FIG. 6J, the electronic device (e.g., 500a) forgoes initiating the process to subscribe the user account to the content delivery service with the second type of subscription. In some embodiments, it is not possible to subscribe to the content delivery service with the second type of subscription via voice input. In some embodiments, it is possible to subscribe to the content delivery service with the first type of subscription in response to either voice input or non-voice input. In some embodiments, in response to the voice input to subscribe to the content delivery service with the second type of subscription, the voice assistant of the electronic device provides information about subscribing to the content delivery service with the second type of subscription through inputs other than voice input (e.g., navigating a user interface presented via a display generation component). Subscribing to the content delivery service with the second type of subscription in response to the non-voice input provides an efficient way of accessing content items via voice input or non-voice input, which reduces the time and number of inputs needed to access content items via the content delivery service.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the ways of facilitating processes to subscribe to content delivery services described above with reference to method 700 optionally have one or more of the characteristics of the ways of accessing content items via content delivery services, described herein with reference to other methods described herein (e.g., method 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, receiving operation 702 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Accessing Content Via Content Delivery Services

Users interact with electronic devices in many different manners, including using electronic devices to access content items via content delivery services. The embodiments described below provide ways in which an electronic device accesses content items via content delivery services. Providing efficient manners of accessing content items via content delivery services enhances interactions with a device, thus reducing the amount of time and number of inputs a user needs to access content items and reducing the power usage of the device, which increases battery life for battery-powered devices. It is understood that people use devices. When a person uses a device, that person is optionally referred to as a user of the device.

Figure 8Z:
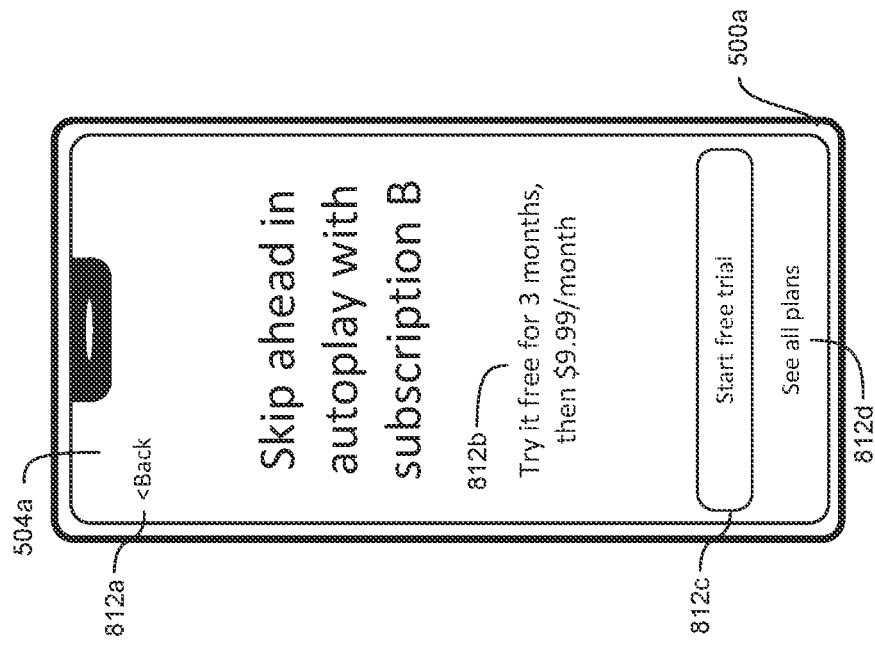
FIGS. 8A-8BB illustrate exemplary ways in which an electronic device accesses content items via a content delivery service in accordance with some embodiments.
Figure 8Y:
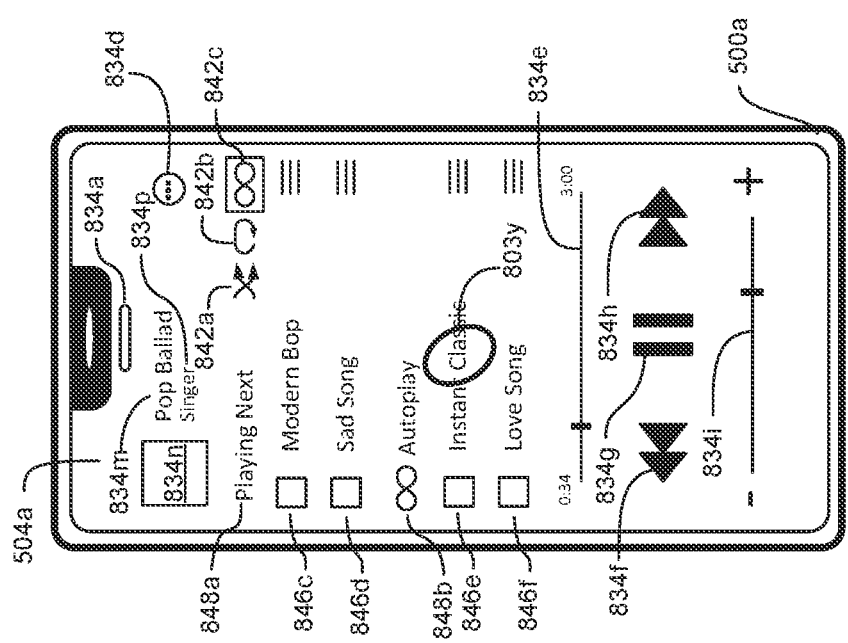
Figure 8B:
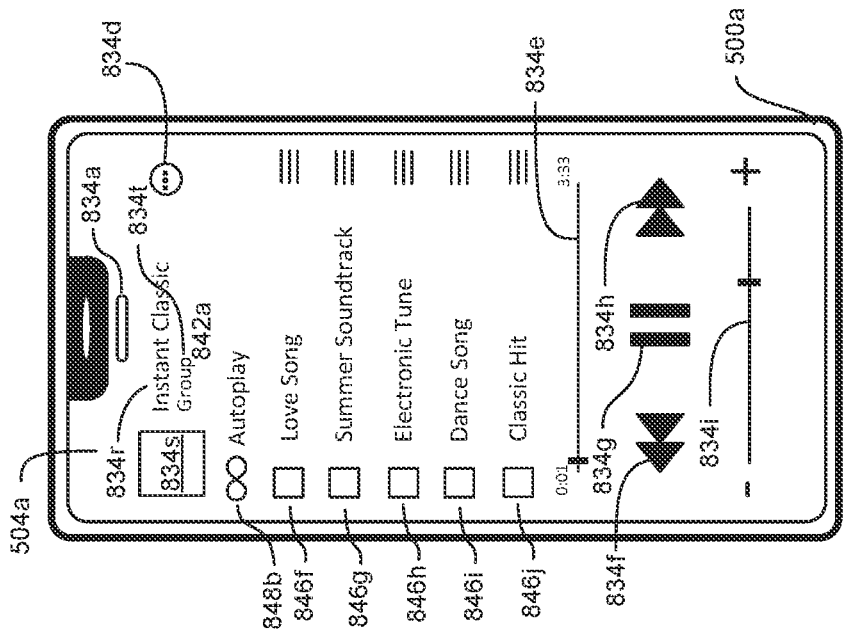
Figure 8A:
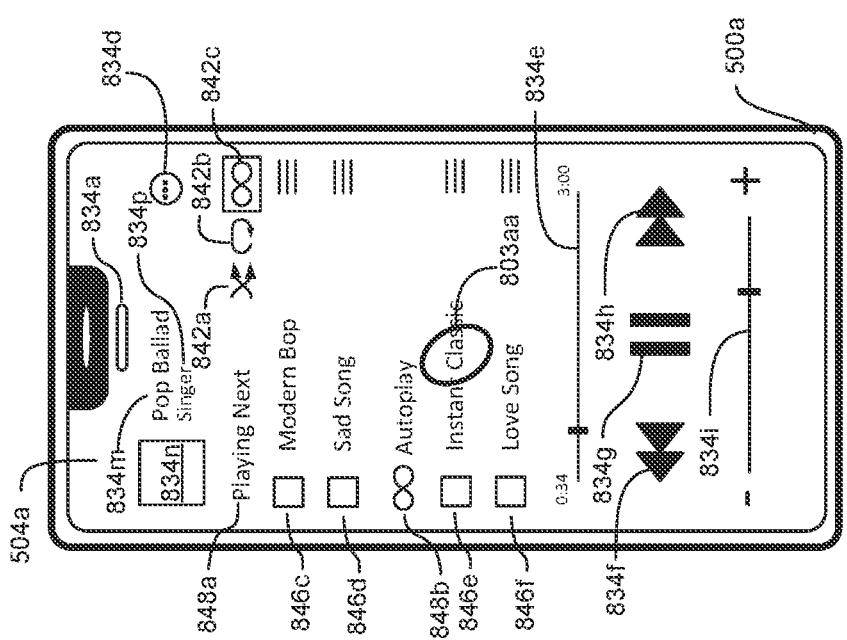

FIGS. 8A-8BB illustrate exemplary ways in which an electronic device 500a accesses content items via a content delivery service in accordance with some embodiments. The embodiments in these figures are used to illustrate the processes described below, including the processes described with reference to FIG. 9. Although FIGS. 8A-8BB illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8BB.

In some embodiments, various subscriptions to a content service are available. For example, for a respective content service, a subscription that entitles the user to access content items via voice inputs and non-voice inputs (e.g., a "voice and non-voice subscription" or "Subscription B") is available and a subscription that entitles the user to access content items via voice inputs, but not via non-voice inputs (e.g., a "voice-only subscription" or "Subscription A") is available. In some embodiments, a voice input is an input detected by a microphone in communication with the electronic device 500a into which the user speaks requests to access content items via the content delivery service. In some embodiments, a non-voice input is an input detected by another (e.g., non-voice-detecting) input device in communication with the electronic device 500a, such as inputs detected by a touch screen (e.g., inputs selecting selectable options displayed via the touch screen or another display generation component in communication with the electronic device). The description herein discusses examples related to the voice-only subscription, which can correspond to "subscription A" in the drawings and the voice and non-voice subscription, which can correspond to "subscription B" in the drawings. In some embodiments, in response to a voice input requesting to play a content item, the electronic device 500a initiates playback of the content item irrespective of whether the user account is subscribed to the content delivery service with the voice-only subscription or the voice and non-voice subscription. In some embodiments, in response to a non-voice input corresponding to a request to play a content item, the electronic device 500a initiates playback of a predetermined subset of the content item, but not another portion of the content item (e.g., the entire content item) if the user is subscribed to the content delivery service with the voice-only subscription. In some embodiments, in response to a non-voice input corresponding to a request to play a content item, the electronic device 500a initiates playback of the content item, including the predetermined subset and the other portion of the content item (e.g., the entire content item) if the user is subscribed to the content delivery service with the voice and non-voice subscription.

In FIG. 8A, for example, the electronic device 500a displays a user interface of an application associated with the content delivery service (e.g., an application installed on the electronic device 500a via with the user is able to browse and/or play content items available via the content delivery service). The user interface (e.g., a "product page" user interface) is associated with a collection of content items (e.g., an album of music) accessible via the content delivery service, for example. In some embodiments, the product page user interface includes a selectable option 802a that, when selected, causes the electronic device 500a to navigate back to a user interface that was displayed prior to display of the user interface illustrated in FIG. 8A. In some embodiments, the product page user interface includes a selectable option 802b that, when selected, causes the electronic device 500a to add the collection of content items to a content library of the user account (e.g., if the user account is subscribed to the content service). In some embodiments, if the user account is not subscribed to the content delivery service, selection of selectable option 802b causes the electronic device 500a to initiate a process to subscribe to the content delivery service to enable the user account to build a content library with the content delivery service. In some embodiments, the product page user interface includes a selectable option 802c that, when selected, causes the electronic device 500a to display a menu with additional selectable options that, when selected, cause the electronic device 500a to perform respective actions associated with the collection of content items. In some embodiments, the product page user interface includes an image 802d associated with the collection of content items, such as album artwork. In some embodiments, the product page user interface includes an indication 802e of the name of the collection of content items. In some embodiments, the product page user interface includes an indication 802f of an artist of the content items included in the collection of content items. In some embodiments, the product page user interface includes a plurality of indications 804a-d of content items included in the collection of content items. In some embodiments, if the user account is subscribed to the content delivery service with the voice and non-voice subscription, in response to detecting selection of one of the indications 804a-d, the electronic device 500a initiates playback of the content item.

In some embodiments, the product page user interface further includes a navigation bar 806a including selectable option 808a-e associated with various user interfaces of the application, such as a "listen now" user interface associated with option 808a, a "browse" user interface associated with option 808b, a "radio" user interface associated with option 808c, a "library" user interface associated with option 808d, and a "search" user interface associated with option 808e. For example, the "listen now" user interface associated with option 808a is a user interface that includes representations of content items suggested to the user for playback based on the content consumption history of the user account and/or based on listening trends among other users of the content delivery service. As another example, the "browse" user interface associated with option 808b is a user interface that includes representations of various content items available via the content delivery service sorted by artist, genre, and/or other criteria. As another example, the "radio" user interface associated with option 808c includes information about and selectable options to play streaming radio content accessible via the content delivery service. As another example, the "library" user interface associated with option 808d includes representations of content items included in a user's content library, such as content owned by the user or content accessible via the content delivery service added to the library (e.g., if the user account is subscribed to the voice and non-voice subscription). As another example, the "search" user interface associated with option 808e includes a user interface element to which an input defining a search query can be directed, thus enabling the user to search for particular items of content available via the content delivery service.

As shown in FIG. 8A, while the user account is not subscribed to the content delivery service with either the voice-only subscription or the voice and non-voice subscription, the electronic device 500a detects an input (e.g., via contact 803a) corresponding to a request to play a respective content item (e.g., "Twinkle, Twinkle Little Star"). For example, the input is selection (e.g., via contact 803a) of representation 804b. In some embodiments, in response to the input illustrated in FIG. 8A, the electronic device 500a presents the user interface illustrated in FIG. 8B.

FIG. 8B illustrates an exemplary user interface for subscribing to the content service with either the voice-only subscription or the voice and non-voice subscription. In some embodiments, the user interface in FIG. 8B is displayed in response to the input illustrated in FIG. 8A. As shown in FIG. 8B, in some embodiments, the user interface includes an option 805a to navigate back to the previously displayed user interface (e.g., the user interface illustrated in FIG. 8A) without subscribing to the content delivery service, information 805b about the voice-only subscription, information 805c about the voice and non-voice subscription, a selectable option 805d that, when selected, causes the electronic device 500a to initiate a process to subscribe to the voice-only subscription, a selectable option 805e that, when selected, causes the electronic device 500a to subscribe to the voice and non-voice subscription, and an option 805f to view additional subscriptions that provide access to the content delivery service (e.g., subscription bundles that also include subscriptions to other services, such as video streaming services, cloud storage services, a games subscription, a news subscription, etc.).

As shown in FIG. 8B, in some embodiments, the electronic device 500a detects selection (e.g., via contact 803b) of the selectable option 805d for subscribing to the voice-only subscription to the content delivery service. In some embodiments, in response to detecting selection of option 805d, the electronic device 500a enrolls the user account in a free trial subscription to the voice-only subscription to the content delivery service that automatically renews when the free trial period ends.

FIG. 8C illustrates the product page user interface while the user account is subscribed to the voice-only subscription to the content delivery service. In some embodiments, the product page user interface in FIG. 8C is the same as the product page user interface in FIG. 8A except for the differences that will now be described. For example, while the user account is subscribed to the content delivery service with the voice-only subscription, the product page user interface includes an indication 816 instructing the user to provide voice inputs to cause the electronic device 500a to play content items via the content delivery service. As another example, the navigation bar 806a is updated to no longer include the "browse" option 808b described above with reference to FIG. 8A. In some embodiments, the representations 804a-d of content items included in the collection of content items are updated to include options 810b that, when selected, would initiate a process to add a respective content item corresponding to the selected option 810b to a content library of the user if the user account was subscribed to the content delivery service with the voice and non-voice subscription.

In some embodiments, while the user account is subscribed to the content delivery service with the voice-only subscription, in response to detecting selection of a representation 804a-d of a content item included in the collection of content items, the electronic device 500a presents a predetermined subset of the content item without playing another portion of the content item (e.g., the whole content item). For example, in FIG. 8C, the electronic device 500a detects selection, via contact 803c, of option 804b associated with the content item "Twinkle Twinkle Little Star." As will be described in more detail below with reference to FIG. 8D, in some embodiments, in response to the input in FIG. 8C, the electronic device 500a presents a predefined sample of the content item without presenting another portion of the content item (e.g., the whole content item).

FIG. 8D illustrates an example of the electronic device 500a presenting the product page user interface while presenting the predefined sample of a content item in response to the input illustrated in FIG. 8C. In some embodiments, the electronic device 500a updates the product page user interface to include an indication 826 instructing the user to provide a voice input to initiate a process to play the entire content item, an image 824e associated with the predefined portion of the content item, an indication 824f of the predefined portion of the content item, an option 824c to pause playback of the predefined portion of the content item, an option 824d to skip ahead to the next content item in a playback queue of the electronic device. In some embodiments, indication 826 includes an option 828a to cease display of the indication 826 (e.g., while continuing the play the predefined portion of the content item without the other portion of the content item) and an option 828b to enroll the user account in a subscription to the content delivery service with a voice and non-voice subscription (e.g., while continuing the play the predefined portion of the content item without the other portion of the content item). In some embodiments, the electronic device 500a detects a voice input 810a corresponding to a request to play the content item. In some embodiments, the electronic device 500a receives the voice input 810a while displaying the user interface illustrated in FIG. 8D. In some embodiments, the electronic device 500a receives the voice input 810a while displaying a different user interface, such as the home screen user interface illustrated in FIG. 4A. In some embodiments, the electronic device 500a receives the voice input 810a while not displaying a user interface (e.g., the display generation component 504a is off or on standby or the electronic device 500a is not in communication with a display generation component). In some embodiments, in response to the voice input 810a, the electronic device 500a initiates playback of the content item, including the predefined sample and another portion of the content item (e.g., the entire content item), as shown in FIG. 8E.

FIG. 8E illustrates an example of the electronic device 500a playing the content item in response to the voice input 810a illustrated in FIG. 8D. In some embodiments, while playing the content item, the electronic device 500a presents an indication 824g that the content item is currently playing.

In some embodiments, if the user account is subscribed to the content delivery service with the voice and non-voice subscription, the electronic device 500a initiates playback of (e.g., entire) content items in response to voice inputs and non-voice inputs. For example, in FIG. 8F, the electronic device 500a presents the product page user interface while the user account is subscribed to the content delivery service with the voice and non-voice subscription. Because the user is subscribed to the voice and non-voice subscription, the navigation bar 806b of the product page user interface includes the browse option 808b and the product page user interface includes a selectable option 844a to play the collection of content items in a predefined order (e.g., the order in which representations 804a-d are displayed) and a selectable option 844b to play the collection of content items in an order other than the predefined order. In some embodiments, while the user account is subscribed to the content delivery service with the voice-only subscription, the product page does not include the options 844a and 844b, as shown in FIG. 8C, for example.

As shown in FIG. 8F, in some embodiments, the electronic device 500a detects selection, via contact 803f, of one of the representations 804b of content items included in the collection of content items. In some embodiments, in response to the input illustrated in FIG. 8F, the electronic device 500a presents the content item (e.g., the entire content item) and updates the product page user interface as shown in FIG. 8G.

FIG. 8G illustrates an example of the electronic device 500a presenting the product page user interface while playing a content item in response to the input illustrated in FIG. 8F. As shown in FIG. 8G, while playing the content item, the electronic device 500a displays, in the product page user interface, an image 824e associated with the content item, an indication 824g of the content item, an option 824c to pause the content item, and an option 824d to skip ahead to the next content item in a content item playback queue of the electronic device 500a. Thus, in some embodiments, while the user account is subscribed to the voice and non-voice subscription to the content delivery service, the electronic device 500a plays content items in response to selection of selectable options displayed by the electronic device 500a.

In some embodiments, the electronic device 500a displays indications including information about the various voice assistant inputs the electronic device 500a will accept related to the content delivery service in a search user interface of the application associated with the content delivery service, as shown in FIGS. 8H-8I. In some embodiments, the electronic device 500a displays these indications irrespective of whether the user is subscribed to the content delivery service and irrespective of which subscription—voice-only or voice and non-voice—the user account is subscribed to. In some embodiments, the electronic device 500*a* only displays the indications when the user account is subscribed to the content delivery service with the voice-only subscription (e.g., and does not display the indications when the user account is not subscribed to the content delivery service or when the user account is subscribed with the voice and non-voice subscription).

FIG. 8H illustrates an example of the electronic device 500*a* presenting the search user interface. FIG. 8H shows the search user interface with the navigation bar 806*a* associated with the voice-only subscription to the content delivery service, but, in some embodiments, if the user account is subscribed to the content delivery service with the voice and non-voice subscription, the electronic device 500*a* would display the user interface illustrated in FIG. 8H with the navigation bar 806*b* illustrated in FIGS. 8F-8G, for example.

In some embodiments, the search user interface includes a user interface element 818*a* to which an input defining a search term is directed to cause the electronic device 500*a* to search the content delivery service for content items and/or collections of content items corresponding to the search term, and a plurality of selectable options 820*a-d* corresponding to genres of content that, when selected, cause the electronic device 500*a* to present representations of content items in the selected genre. As shown in FIG. 8H, in some embodiments, the search user interface further includes an indication 818*b* of a voice input corresponding to the content delivery service. For example, the indication 818*b* includes text informing the user that the electronic device 500*a* will initiate playback of a content item in response to a voice input requesting playback of the content item. As another example, the indication 818*b* includes text that, if read by the user in a voice input directed to the voice assistant, would cause the electronic device 500*a* to initiate playback of a respective content item.

FIG. 8I illustrates another example of the electronic device 500*a* presenting the search user interface. In some embodiments, the search user interface in FIG. 8I is the same as the search user interface in FIG. 8H, except the indication 818*c* includes text informing the user that the electronic device 500*a* will indicate to the user the content item that is playing in response to a voice input requesting the name of the content item currently playing. As another example, the indication 818*c* includes text that, if read by the user in a voice input directed to the voice assistant, would cause the electronic device 500*a* to provide an indication of the content item currently playing on the electronic device 500*a*.

As described above with reference to FIGS. 8C-8D, in some embodiments, while the user account is subscribed to the content delivery service with the voice-only subscription, the electronic device 500*a* initiates playback of a predefined subset of a content item without playing another portion of the content item (e.g., the whole content item) in response to detecting selection of a user interface element for initiating playback of the content item. In some embodiments, in response to detecting selection of a user interface element corresponding to a previous voice input, the electronic device 500*a* initiates playback of the (e.g., entire) content item corresponding to the voice input even if the user is subscribed to the content delivery service with the voice-only subscription, or if the user is subscribed to the content delivery service with the voice and non-voice subscription, as will now be described with reference to FIGS. 8J-8K.

FIG. 8J illustrates an example of the electronic device 500*a* presenting the "listen now" user interface of the content delivery application while the user is subscribed to the voice-only subscription to the content delivery service. In some embodiments, the "listen now" user interface includes indications 822*a* and 822*b* of suggested voice inputs based on, for example, content consumption history of the user or listening trends of a plurality of users subscribed to the content delivery service, indications 830*a-d* of voice inputs previously provided by the user to the electronic device 500*a* related to the content delivery service and/or indications of content items previously played via the content delivery service (e.g., in response to voice inputs), and the navigation bar 806*a* associated with the voice-only subscription to the content delivery service. In some embodiments, the indications 822*a* and 822*b* include text that, if read by the user in a voice input directed to the voice assistant, would cause the electronic device 500*a* to initiate playback of respective content items corresponding to the voice input. In some embodiments, if the user were subscribed to the content delivery service with the voice and non-voice subscription, the electronic device 500*a* would display the same user interface illustrated in FIG. 8J, except with the voice and non-voice navigation bar 806*b* described above with reference to FIG. 8F instead of navigation bar 806*a*.

In some embodiments, the representations 830*a-d* of previously-provided voice inputs (e.g., and/or previously-played content items) include images 832*a* associated with the content items (or collections of content items) corresponding to the respective voice input and an indication 832*b* of the voice input provided. For example, representations 830*a* and 830*d* correspond to voice inputs requesting playback of respective content items, representation 830*b* corresponds to a voice input requesting playback of content items by a respective artist, and representation 830*c* corresponds to a voice input requesting playback of a respective collection of content items. In some embodiments, the representations 830*a-d* include text that, if read by the user in a voice input directed to the voice assistant, would cause the electronic device 500*a* to initiate playback of respective content. As shown in FIG. 8J, the electronic device 500*a* detects selection (e.g., via contact 803*j*) of indication 830*a* corresponding to a voice input requesting playback of a respective content item. In response to the input illustrated in FIG. 8J, the electronic device 500*a* initiates playback of the content item, as shown in FIG. 8K. In some embodiments, the electronic device 500*a* plays the content items in response to selection of one of the indications 830*a-d* because the indications 830*a-d* correspond to voice inputs previously received by the electronic device 500*a*.

FIG. 8K illustrates an example of how the electronic device 500*a* updates the listen now user interface while playing a respective content item (e.g., a whole content item, not just a predefined sample) in response to the non-voice input illustrated in FIG. 8J. As shown in FIG. 8K, the electronic device 500*a* displays image 824*e* associated with the content item, an indication 824*g* of the content item, an option 824*c* to pause the content item, and an option 824*d* to skip ahead to the next content item in a content item playback queue of the electronic device 500*a* while playing the content item. In some embodiments, the electronic device 500*a* plays the content item in response to the non-voice input received while the user account is subscribed to the voice-only subscription because the non-voice input was directed to a representation of a previously-received voice input.

In some embodiments, various functions of the content delivery application are available while the user is subscribed to the content delivery service with the voice and non-voice subscription, but not while the user is subscribed with the voice only subscription. FIGS. 8L-8BB illustrate various examples of the user providing an input to perform a function that the electronic device 500a performs if the user is subscribed to the voice and non-voice subscription and does not perform if the user is subscribed to the voice only subscription.

In some embodiments, the electronic device 500a is able to add content items available through the content delivery service to a library of the user account if the user account is subscribed with the voice and non-voice subscription, but not if the user account is subscribed with the voice-only subscription. FIG. 8L illustrates an example of the electronic device 500a receiving a request to add a respective content item to the content library while the user account is subscribed to the content delivery service with the voice-only subscription. In some embodiments, the electronic device 500a displays the product page user interface associated with the voice-only subscription described above with reference to FIG. 8C and detects selection of option 810b (e.g., via contact 803L) corresponding to a request to add the "Intro" content item to the content library from the content delivery service. In some embodiments, because the user is subscribed to the content delivery service with the voice-only subscription, in response to the input illustrated in FIG. 8L, the electronic device 500a presents the user interface illustrated in FIG. 8M without adding the content item to the content library.

FIG. 8M illustrates an example of the electronic device 500a presenting a user interface with information about the voice and non-voice subscription. In some embodiments, the electronic device 500a displays the user interface in response to the input illustrated in FIG. 8L. As shown in FIG. 8M, the user interface optionally includes a selectable option 812a that, when selected, causes the electronic device 500a to navigate back to the previously-displayed user interface (e.g., the user interface illustrated in FIG. 8L), information 812b about the voice and non-voice subscription, a selectable option 812c that, when selected, causes the electronic device 500a to initiate a process to subscribe the user to the voice and non-voice subscription, and an option 812d that, when selected, causes the electronic device 500a to display a user interface with information about other subscription plans that give the user access to the voice and non-voice subscription to the content delivery service, such as subscription bundles described above.

In some embodiments, if the user account is subscribed to the content delivery service with the voice and non-voice subscription, in response to an input corresponding to a request to add a content item accessible via the content delivery service to the content library of the user account, the electronic device 500a adds the content item to the content library. For example, FIG. 8N illustrates the electronic device 500a displaying the product page user interface while the user is subscribed to the content delivery service with the voice and non-voice subscription. The product page user interface illustrated in FIG. 8N can the be same as the product page user interface described above with reference to FIG. 8F, for example. As shown in FIG. 8N, in some embodiments, the electronic device 500a detects selection (e.g., via contact 803n) of the selectable option 810b to add the content item "Intro" to the content library of the user account. In response to the input illustrated in FIG. 8N, in some embodiments, the electronic device 500a adds the content item to the content library of the user account and updates the user interface as shown in FIG. 8O.

FIG. 8O illustrates an example of the electronic device 500a displaying the product page user interface with an indication 814 that the electronic device 500a added a content item to the content library in response to the input illustrated in FIG. 8N. In some embodiments, the electronic device 500a ceases display of the selectable option to add the content item to the content library that was previously displayed within representation 804a, as shown in FIG. 8N.

In some embodiments, in response to detecting a request to present time-synced lyrics for a content item that is received while the user is subscribed to the content delivery service with the voice-only subscription, the electronic device 500a forgoes presenting the time-synced lyrics and presents a user interface with information about and a selectable option to subscribe to the content service with the voice and non-voice subscription. In some embodiments, if, instead, the input is received while the user account is subscribed to the voice and non-voice subscription, in response to receiving the input, the electronic device 500a presents the time-synced lyrics.

FIG. 8P illustrates an example of the electronic device 500a presenting a now playing user interface of the content delivery application. In some embodiments, the now playing user interface includes an interactive element 834a that, when the electronic device 500a detects a respective gesture directed to the interactive element 834a (e.g., a downward swipe starting from the interactive element 834a), causes the electronic device 500a to cease display of the now playing user interface and display a previously-displayed user interface of the content application. In some embodiments, the now playing user interface further includes an image 802d associated with a content item currently playing on the electronic device 500a, the title 834b of the content item currently playing on the electronic device 500a, the artist 834c of the content item currently playing on the electronic device 500a, a selectable option 834d for presenting a menu of actions associated with the content item currently playing on the electronic device 500a, a scrubber bar 834e, an option 834f to play a previous content item in a content item playback queue, an option 834g to pause the content item, an option 834h to skip to the next content item in a content item playback queue, an interactive element 834i for adjusting the playback volume of audio content of the content item, a time-synced lyrics option 834j, an audio output option 834k, and a playback queue option 834L.

As shown in FIG. 8P, in some embodiments, the electronic device 500a detects selection (e.g., via contact 803p) of the time-synced lyrics option 834j. In some embodiments, because the user is subscribed to the content delivery service with the voice-only subscription when the input in FIG. 8P is received, in response to the input, the electronic device 500a forgoes presenting the time-synced lyrics and presents the user interface illustrated in FIG. 8Q. In some embodiments, the electronic device 500a continues to play the content item while displaying the user interface in FIG. 8Q.

FIG. 8Q illustrates a user interface with information about the voice and non-voice subscription to the content delivery service and options 812c and 812d for initiating a process to subscribe to the voice and non-voice subscription to the content delivery service. In some embodiments, the user interface in FIG. 8Q includes similar elements as the user interface described above with reference to FIG. 8M.

In some embodiments, while the user is subscribed to the content delivery service with the voice and non-voice subscription, in response to an input corresponding to a request to present time-synced lyrics, the electronic device 500a presents the time-synced lyrics. FIG. 8R illustrates an example of the electronic device 500a displaying the now playing user interface while the user is subscribed to the content delivery service with the voice and non-voice subscription. In some embodiments, the now playing user interface in FIG. 8R is the same as or similar to the now playing user interface, described above with reference to FIG. 8P, that is displayed while the user is subscribed to the voice-only subscription to the content delivery service. As shown in FIG. 8R, in some embodiments, the electronic device 500a detects selection (e.g., via contact 803r) of the time-synced lyrics option 834j. In some embodiments, in response to receiving the input illustrated in FIG. 8R while the user account is subscribed to the content delivery service, the electronic device 500a presents the time-synced lyrics as shown in FIG. 8S.

FIG. 8S illustrates an example of the electronic device 500a presenting time synced lyrics corresponding to the content item that is playing. In some embodiments, the electronic device 500a presents the time synced lyrics in response to the user input illustrated in FIG. 8R. In some embodiments, the time-synced lyrics user interface 840 in FIG. 8S includes an image 836a associated with the content item that is currently playing on the electronic device, an indication 836b of the title and artist of the content item that is currently playing on the electronic device 500a, an option 836c to view a menu of actions associated with the content item currently playing on the electronic device 500a, an indication 836d instructing the user how to initiate sharing of a portion of the time-synced lyrics, and indications 838a-d of the time-synced lyrics (e.g., text versions of the lyrics of the song arranged according to the positions of those lyrics in the song). In some embodiments, as the content item continues to play, the electronic device 500a presents a portion 838a of the lyrics that corresponds to the currently-playing portion of the content item and portions 838b-838d of the lyrics corresponding to portions of the content item after the currently-playing portion of the content item. In some embodiments, the electronic device 500a updates the portions 838a-d of the lyrics displayed as playback of the content item progresses.

In some embodiments, the electronic device 500a displays a user interface including representations of content items in a playback queue. The electronic device 500a optionally is configured to play the content items in the playback queue in the order of the playback queue, for example. In some embodiments, if the user is subscribed to the content delivery service with the voice and non-voice subscription, in response to detecting selection of one of the representations of a content item in the playback queue, the electronic device 500a initiates playback of the selected content item without playing other content items between the currently-playing content item and the selected content item. In some embodiments, if the user is subscribed to the content delivery service with the voice-only subscription, in response to the input selecting the representation of the content item in the playback queue, the electronic device 500a forgoes skipping ahead in the queue and displays information about the voice and non-voice subscription and selectable options for initiating a process to subscribe to the voice and non-voice subscription.

FIG. 8T illustrates an example of the electronic device 500a displaying the now playing user interface while the user account is subscribed to the content delivery service with the voice-only subscription. In some embodiments, the now playing user interface in FIG. 8T is the same as or similar to the now playing user interface described above with reference to FIG. 8P. As shown in FIG. 8T, in some embodiments, the electronic device 500a detects selection (e.g., via contact 803t) of the playback queue option 834L. In some embodiments, in response to the input illustrated in FIG. 834L, the electronic device 500a presents the playback queue user interface illustrated in FIG. 8U.

FIG. 8U illustrates an example of the electronic device 500a displaying a playback queue user interface while the user account is subscribed to the content delivery service with the voice-only subscription. In some embodiments, the playback queue user interface includes an image 802d corresponding to a respective content item currently playing on the electronic device 500a, an indication 834b of the title of the respective content item, an indication 834c of the artist of the respective content item, and a selectable option 834d that, when selected, causes the electronic device 500a to display a menu of actions corresponding to the respective content item. In some embodiments, the playback queue user interface includes representations 846a-d of content items included in a playback queue of the electronic device 500a that will play in the order in which the representations 846a-d are displayed in the playback queue user interface. For example, each representation 846a of a respective content item can include an image 844a corresponding to the respective content item, an indication 844b of the title of the respective content item, and a user interface element 844c for rearranging the playback order of the content items in the playback queue.

In some embodiments, the representations 846a-d of the content items in the content item playback queue that will be played after the currently-playing content item is done playing or skipped are displayed beneath a "playing next" header 848a. In some embodiments, the playback queue user interface further includes a selectable option 842a to toggle a setting to play content items (e.g., from a collection of content items, such as a playlist or album, from the playback queue) in a shuffled order, an option 842b to toggle a setting to repeat the collection of the content items or playback queue after it has been played through, and an option 842c to toggle an "autoplay" setting to play content items selected based on the content items in the playback queue and/or the content consumption history of the user more generally after completing playback of the content items in the content item queue. In some embodiments, as shown in FIG. 8U, the "autoplay" setting is activated. Thus, in some embodiments, the electronic device 500a presents an additional section of the playback queue user interface including an "autoplay" header 848b under which representations of content items that will play after the content items in the playback queue are displayed. In some embodiments, the playback queue user interface is scrollable, thereby enabling the user to scroll the user interface to view the representations of content items under the "autoplay" header. In some embodiments, the playback queue user interface further includes selectable options for modifying playback of the respective content item that is currently playing, including scrubber bar 834e, a skip back option 834f, a pause option 834g, a skip ahead option 834h, and a user interface element 834i for adjusting playback volume.

As shown in FIG. 8U, in some embodiments, the electronic device 500a detects selection (e.g., via contact 803u) of one of the content items. In some embodiments, if the user were subscribed to the content delivery service with the voice and non-voice subscription, the input in FIG. 8U would cause the electronic device 500a to play the content item corresponding to the representation 846b, as will be described in more detail below with reference to FIGS. 8W and 8X. Because the user account is subscribed to the voice-only subscription to the content delivery service when the input in FIG. 8U is received, in some embodiments, the electronic device 500*a* continues to play the content item that is currently playing, does not skip to the content item corresponding to representation 846*b*, and presents the user interface illustrated in FIG. 8V.

FIG. 8V illustrates an example of the electronic device 500*a* presenting a user interface with information about the voice and non-voice subscription to the content delivery service and selectable options 812*c* and 812*d* for subscribing to the voice and non-voice subscription to the content delivery service. In some embodiments, the user interface in FIG. 8V is displayed in response to the user input illustrated in FIG. 8U. The user interface illustrated in FIG. 8V can be the same as or similar to the user interface described above with reference to FIG. 8M.

In some embodiments, while the user account is subscribed to the voice and non-voice subscription to the content delivery service, in response to detecting selection of one of the representations of content items in the playback queue, the electronic device 500*a* initiates playback of the content item corresponding to the selected representation. FIG. 8W illustrates an example of the electronic device 500*a* displaying the playback queue user interface while the user account is subscribed to the content delivery service with the voice and non-voice subscription. In some embodiments, the playback queue user interface illustrated in FIG. 8W can be the same as or similar to the playback queue user interface described above with reference to FIG. 8U. In some embodiments, the electronic device 500*a* detects selection (e.g., via contact 803*w*) of one of the representations 846*b* of content items included in the playback queue. In some embodiments, in response to detecting the input illustrated in FIG. 8W, the electronic device 500*a* initiates playback of the respective content item corresponding to representation 846*b* and removes playback items positioned in the playback queue before the respective content item from the playback queue (e.g., the content item corresponding to representation 846*a*). In some embodiments, the electronic device 500*a* initiates playback of the respective content item without removing any other content items from the playback queue. In some embodiments, the electronic device 500*a* updates the playback queue user interface as shown in FIG. 8X in response to the input illustrated in FIG. 8W.

FIG. 8X illustrates an example of the electronic device 500*a* presenting an updated playback queue user interface while the user account is subscribed to the content delivery service with the voice and non-voice subscription. In some embodiments, the electronic device 500*a* displays the updated playback queue user interface in FIG. 8X in response to the input illustrated in FIG. 8W. As described above, in response to the input illustrated in FIG. 8W, the electronic device 500*a* initiates playback of the respective content item corresponding to the selected representation, so the electronic device 500*a* updates the playback queue user interface to include an image 834*n* corresponding to the respective content item, an indication 834*m* of the title of the respective content item, an indication 834*p* of the artist of the respective content item, and a selectable option 834*d* for presenting a menu of actions corresponding to the respective content item. In some embodiments, the electronic device 500*a* updates the playback queue to remove the respective content item that is now playing and any content items that were positioned before the respective content item in the queue. For example, FIG. 8X does not include representations 846*a* and 846*b* illustrated in FIG. 8W. In some embodiments, the electronic device 500*a* does not remove content items from the queue that are positioned before the selected content item. For example, the electronic device 500*a* could continue to display representation 846*a* (e.g., above representation 846*c*).

As shown in FIG. 8X, in some embodiments, with fewer content items in the playback queue, the playback queue user interface has more room to display representations of content items selected for "autoplay." For example, the electronic device 500*a* presents indications 846*e* and 846*f* of content items that will play after the content items in the playback queue have played. In some embodiments, the content items in the "autoplay" queue can be selected for playback based on the content items in the playback queue and/or based on the content consumption history of the user. In some embodiments, the electronic device 500*a* will skip ahead to content items in the "autoplay" queue in response to detecting selection of one of the representation 846*e* and 846*f* if the user is subscribed to the voice and non-voice subscription, but not if the user is subscribed to the voice-only subscription in a manner similar to the way the electronic device 500*a* behaves in response to selection of one of the representations of content items in the playback queue, as will now be described with reference to FIGS. 8Y-8BB.

FIG. 8Y illustrates an example of the electronic device 500*a* presenting the playback queue user interface while the user account is subscribed to the content delivery service with the voice-only subscription. In some embodiments, the user interface in FIG. 8Y is similar to or the same as the user interface described above with reference to FIG. 8X. As shown in FIG. 8Y, the electronic device 500*a* detects selection (e.g., via contact 803*y*) of one of the representations 846*e* of content items in the autoplay queue while the user is subscribed to the voice-only subscription to the content delivery service, for example. In some embodiments, in response to the input illustrated in FIG. 8Y, the electronic device 500*a* continues playback of the currently-playing content item, does not skip to the content item corresponding to the selected representation 846*e*, and presents the user interface illustrated in FIG. 8Z.

FIG. 8Z illustrates an example of the electronic device 500*a* presenting a user interface with information about the voice and non-voice subscription to the content delivery service and selectable options 812*c* and 812*d* that, when selected, causes the electronic device 500*a* to initiate a process to subscribe to the content delivery service. In some embodiments, the electronic device 500*a* presents the user interface in FIG. 8Z in response to the input illustrated in FIG. 8Y. In some embodiments, the user interface in FIG. 8Z is similar to the user interface described above with reference to FIG. 8M.

As described above, in some embodiments, in response to detecting selection of a representation of a content item in the "autoplay" queue while the user account is subscribed to the content delivery service with the voice and non-voice subscription, the electronic device 500*a* initiates playback of the content item corresponding to the selected representation. FIG. 8AA illustrates an example of the electronic device 500*a* displaying the playback queue user interface while the user account is subscribed to the content delivery service with the voice and non-voice subscription. For example, the user interface in FIG. 8AA is the same as or similar to the user interface described above with reference to FIG. 8X. In some embodiments, as shown in FIG. 8AA, the electronic device 500*a* detects selection (e.g., via contact 803*aa*) of one of the representations 846*e* of content items in the "autoplay" queue while the user is subscribed to the voice and non-voice subscription to the content delivery service. In some embodiments, in response to the input illustrated in FIG. 8AA, the electronic device 500*a* updates the user interface as shown in FIG. 8BB, ceases playback of the content item that was playing when the input was received, initiates playback of the content item corresponding to representation 846*e*, and optionally removes the content items ahead of the content item corresponding to representation 846*e* from the playback and "autoplay" queues. In some embodiments, the electronic device 500*a* does not remove the content items before the content item corresponding to representation 846*e* from the playback and autoplay queues.

FIG. 8BB illustrates an example of the electronic device 500*a* displaying the updated playback queue user interface. In some embodiments, the electronic device 500*a* displays the updated playback queue user interface in response to the input illustrated in FIG. 8AA. In some embodiments, updating the user interface includes displaying an image 834*s* corresponding to the respective content item corresponding to the representation 846*e* selected in FIG. 8AA, the title 834*r* of the respective content item, the artist 834*t* of the respective content item, and an option 834*d* to display a menu of actions corresponding to the respective content item. In some embodiments, the electronic device 500*a* ceases display of representations 846*c* and 846*d* of content items in the playback queue illustrated in FIG. 8AA and displays representations 846*g-j* of content items in the autoplay queue in response to the input. In some embodiments, however, the electronic device 500*a* does not remove the content items corresponding to representations 846*c* and 846*d* from the playback queue.

FIG. 9 is a flow diagram illustrating a method of accessing content items via a content delivery service in accordance with some embodiments. The method 900 is optionally performed at an electronic device such as device 100, device 300, device 500, device 500*a*, and 500*b* as described above with reference to FIGS. 1A-1B, 2-3, 4A-4B and 5A-5H. Some operations in method 900 are, optionally combined and/or order of some operations is, optionally, changed.

As described below, the method 900 provides ways in which an electronic device accesses content items via content delivery services. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device (e.g., 500*a*) in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device), or a set-top box in communication with a display generation component (e.g., a television screen) and one or more input devices (e.g., a remote control), or a smart speaker (e.g., an electronic device including one or more speakers and input devices), or an in-vehicle infotainment system). In some embodiments, the display generation component is a display integrated with the electronic device (optionally a touch screen display) and/or an external display such as a monitor, projector, television, etc. In some embodiments, the electronic device is different from the electronic device described with reference to method 700, but is in communication with that electronic device and/or is associated with the same user account as that electronic device.

In some embodiments, such as in FIG. 8A, the electronic device (e.g., 500*a*) displays (902), via the display generation component, a content (e.g., browsing, playback, etc.) user interface that includes a representation (e.g., 804*b*) of a content item. In some embodiments, the content item is audio content, such as music or spoken word content, such as a podcast or audiobook. In some embodiments, the content item is video content, such as an episode in a series of episodic content or a movie. In some embodiments, the representation of the content item includes identifying information about the content item, such as the title of the content item.

In some embodiments, such as in FIG. 8A, while displaying the content user interface, the electronic device (e.g., 500*a*) receives (904), via the one or more input devices, a user input (e.g., via contact 803*a*) corresponding to selection of the representation (e.g., 804*b*) of the content item. For example, the representation of the content item is displayed on a touch-sensitive display in communication (e.g., or integrated) with the electronic device and the electronic device detects a contact (e.g., a tap) at the location on the touch-sensitive display at which the representation of the content item is displayed. In some embodiments, the selection is made using a different input device, such as a mouse, keyboard, or remote control. In some embodiments, the user input corresponding to selection of the representation of the content item is not a voice input.

In some embodiments, in response to receiving the user input (906), in accordance with a determination that a user account of the electronic device (e.g., 500*a*) is subscribed, with a first type (e.g., tier) of subscription, to a content delivery service (e.g., a streaming and playback service) that provides access to the content item, the electronic device (e.g., 500*a*) initiates (908) playback of a first predetermined subset of the content item without playing a second subset of the content item, such as in FIG. 8D. In some embodiments, the first type of subscription is a subscription to a content streaming service that entitles the user to access a plurality of content items (e.g., including the content item) via voice inputs, but does not entitle the user to access the plurality of content items via non-voice inputs, such as described with reference to method 700. In some embodiments, because the user input is not a voice input (e.g., the input is selection of a user interface element), the electronic device forgoes presenting the entire content item in response to the user input and instead presents a predetermined portion of the content item. In some embodiments, the first predetermined subset of the content item is a predetermined sample and/or preview of the content item with a duration that is less than a predetermined duration (e.g., 5, 10, 15, 20, 30, 45, 60, etc. seconds) according to a licensing agreement between the content delivery service and the creator, distributor, and/or owner of the content item. In some embodiments, in response to a voice input corresponding to a request to present the content item, in accordance with the determination that the user account of the electronic device is subscribed with the first type of subscription, the electronic device initiates playback of the entire content item. In some embodiments, in addition to presenting the first predetermined subset of the content item, the electronic device displays, via the display generation component, information about subscribing to a second type of subscription that provides access to content items via non-voice input and a selectable option that, when selected, causes the electronic device to initiate a process to subscribe the user account to the second type of subscription.

In some embodiments, in response to receiving the user input (906), in accordance with a determination that the user account is subscribed, with a second type of subscription different from the first type of subscription, to the content delivery service, the electronic device (e.g., 500a) initiates (910) playback of the content item, including the first predetermined subset of the content item and the second subset of the content item, such as in FIG. 8G. In some embodiments, the second type of subscription is a subscription to a content streaming service that entitles the user to access a plurality of content items (e.g., including the content item) via voice inputs and via non-voice inputs. In some embodiments, in response to the user input that is not a voice input (e.g., the input is selection of a user interface element), the electronic device presents the entire content item. In some embodiments, in response to a voice input corresponding to a request to present the content item, in accordance with the determination that the user account of the electronic device is subscribed with the second type of subscription, the electronic device also initiates playback of the entire content item. The above-described manner of initiating playback of the first predefined portion of the content item in accordance with the determination that the user account is subscribed to the first type of subscription provides an efficient way of indicating the content of the content item to the user, which additionally reduces power usage and improves battery life of the electronic device by enabling the user to use the electronic device more quickly and efficiently by reducing the likelihood that the electronic device performs operations that will subsequently be reversed.

In some embodiments, (e.g., in response to the input corresponding to selection of the representation of the content item) in accordance with the determination that the user account is subscribed with the first type of subscription to the content delivery service, such as in FIG. 8D, the electronic device (e.g., 500a) presents information (e.g., 826) (e.g., via the display generation component and/or voice assistant) about how to initiate playback of the content item, including the second subset of the content item. In some embodiments, the first type of subscription to the content delivery service entitles the user to access the (e.g., entire) content item, including the second subset of the content item via a voice input (e.g., directed to a voice assistant of the electronic device or content delivery service). In some embodiments, the information includes an indication that the electronic device will present the (e.g., entire) content item, including the second subset of the content item, in response to a voice input. In some embodiments, in response to detecting a voice input to play the content item while the user is subscribed to the content delivery service with the first type of subscription, the electronic device initiates playback of the content item including the second subset of the content item. In some embodiments, in response to detecting a voice input to play the content item while the user is subscribed to the content delivery service with the first type of subscription and while the electronic device presents the information about how to initiate playback of the content item including the second subset of the content item, the electronic device initiates playback of the content item including the second subset of the content item. Presenting information about how to initiate playback of the content item in accordance with the determination that the user account is subscribed with the first type of subscription to the content delivery service provides an efficient way of educating the user on how to access content items with the first type of subscription, which reduces the time and number of inputs needed to access content items via the content delivery service.

In some embodiments, while the user account is subscribed to the first type of subscription, such as in FIG. 8D, the electronic device (e.g., 500a) receives, via the one or more input devices, a voice input (e.g., 810a) corresponding to a request to play the content item. In some embodiments, in response to the voice input (e.g., 810a in FIG. 8D), the electronic device (e.g., 500a) initiates playback of the content item, including the first predetermined subset of the content item and the second subset of the content item, such as in FIG. 8E. In some embodiments, while the user account is subscribed to the second type of subscription, in response to the voice input, the electronic device initiates playback of the (e.g., entire) content item, including the first predetermined subset of the content item and the second subset of the content item. Initiating playback of the first predetermined subset of the content item and the second subset of the content item in response to the voice input provides an efficient way of accessing the content item with the first type of subscription, which reduces the time and number of inputs needed to access content items with the content delivery service.

In some embodiments, such as in FIG. 8A, in response to receiving the user input (e.g., 803a), in accordance with a determination that the user account is not subscribed to the first type of subscription or the second type of subscription, such as in FIG. 8A (e.g., or any other subscription to the content delivery service), the electronic device (e.g., 500a) presents information (e.g., 805b) about subscribing to the first type of subscription and presenting information (e.g., 805c) about subscribing to the second type of subscription, such as in FIG. 8B. In some embodiments, if the user account is not subscribed to the content delivery service and does not own a respective content item, then the user account is not entitled to access the respective content item. In some embodiments, the information includes a selectable option that, when selected, causes the electronic device to initiate a process to subscribe to the first type of subscription. In some embodiments, the information includes a selectable option that, when selected, causes the electronic device to initiate a process to subscribe to the second type of subscription. In some embodiments, such as in FIG. 8A, in response to receiving the user input (e.g., 803a), in accordance with a determination that the user account is not subscribed to the first type of subscription or the second type of subscription, such as in FIG. 8A (e.g., or any other subscription to the content delivery service), the electronic device (e.g., 500a) initiates playback of the first predetermined subset of the content item without playing the second subset of the content item, such as in FIG. 8D. Presenting the information about subscribing to the first type of subscription and presenting information about subscribing to the second type of subscription provides an efficient way of gaining access to the content item via the content delivery service, which reduces the number of inputs needed to access the (e.g., full) content item including the first predetermined subset and the second subset of the content item.

In some embodiments, such as in FIG. 8H, while the user account is subscribed to the first type of subscription, the electronic device (e.g., 500a) displays, via the display generation component (e.g., 504a), a visual indication (e.g., 818b) of a voice input for accessing one or more respective content items with the first type of subscription. In some embodiments, the electronic device displays the visual indication of the voice input in a user interface associated with one or more content items available via the content delivery service. For example, the user interface includes an indication including text that reads "use the Voice Assistant to make a request" or something similar. In some embodiments, the electronic device displays the visual indication of the voice input in a user interface for searching for one or more content items available via the content delivery service. For example, the visual indication includes text that reads "Ask the voice assistant to play a song. Try 'Twinkle Twinkle Little Star'" (or another song) or similar. Thus, in some embodiments, the text that is presented to the user is text that, if spoken by the user to the voice assistant, would cause the electronic device to play the requested content item using the first type of subscription to the content delivery service. Displaying the visual indication of the voice input provides an efficient way to educate the user on how to access content items via the first type of subscription to the content delivery service, which reduces the time and number of inputs needed to access content items.

In some embodiments, the electronic device (e.g., 500a) displays, via the display generation component (e.g., 504a), a content user interface for searching for content items accessible via the content delivery service, wherein the content user interface for searching includes a visual indication (e.g., 818c) of a suggested voice input for accessing information about content items assessable via the content delivery service. In some embodiments, the content user interface for searching for content items accessible via the content delivery service includes a user interface element that accepts input defining a search term. For example, in response to receiving a sequence of one or more inputs defining a search term and requesting a search, the electronic device displays one or more indications of content items available via the content delivery service that correspond to the search term. In some embodiments, the visual indication includes text indicating that the voice assistant will present information about (e.g., a title, artist, etc.) of a content item in response to a voice input requesting the information. For example, the visual indication includes text that reads "Find out what's playing. Ask the voice assistant 'what song is this?'" or something similar. Thus, in some embodiments, the text that is presented to the user is text that, if spoken by the user to the voice assistant, would cause the electronic device to provide information about the content item that is currently playing via the content delivery service. Displaying the visual indication of the suggested voice input in the user interface for searching for content items provides an efficient way of teaching the user how to access information about content playing via the content delivery service, which reduces the number of inputs needed to present information about the content.

In some embodiments, such as in FIG. 8J, the electronic device (e.g., 500a) displays, via the display generation component (e.g., 504a), a content user interface that includes an indication (e.g., 830a) of a respective content item previously played via (e.g., the first type of subscription to) the content delivery service. In some embodiments, the content user interface includes indications of a plurality of most-recently played content items. In some embodiments, the indications correspond to previously-received voice inputs to play content items, such as requests to play individual items of content (e.g., songs), collections of content items (e.g., albums, playlists), or a plurality of content items that satisfy a respective criterion (e.g., content items having a respective artist, content items similar to a respective content item, content items having a respective genre), and do not include indications for previously-played content items not played in response to received voice inputs. In some embodiments, such as in FIG. 8J, the electronic device (e.g., 500a) receives, via the one or more input devices, an (e.g., non-voice) input (e.g., via contact 803j) corresponding to selection of the indication of the respective content item. In some embodiments, the input is received via a touch screen or another input device. In some embodiments, in response to receiving the input corresponding to selection of the indication of the respective content item, in accordance with a determination that the user account of the electronic device (e.g., 500a) is subscribed with the first type of subscription, the electronic device (e.g., 500a) initiates playback of the respective content item, such as in FIG. 8K. In some embodiments, the electronic device plays content items in response to non-voice inputs corresponding to selection of indications of previously played content in content user interface, but not in response to non-voice inputs corresponding to selection of other indications while the user is subscribed with the first type of subscription. In some embodiments, in response to receiving the input corresponding to selection of the indication of the respective content item, in accordance with a determination that the user account of the electronic device (e.g., 500a) is subscribed with the second type of subscription, the electronic device (e.g., 500a) initiates playback of the respective content item, such as in FIG. 8K. In some embodiments, the electronic device plays content items in response to non-voice inputs corresponding to selection of indications of previously played content in content user interface and in response to non-voice inputs corresponding to selection of other indications while the user is subscribed with the second type of subscription. Initiating playback of the respective content item in response to the non-voice input corresponding to selection of the indication of the respective content item while the user is subscribed with the first type of subscription provides an efficient way of accessing previously-played content items with non-voice inputs, which reduces the number of inputs and time needed to access content items that were previously played.

In some embodiments, such as in FIG. 8C, the electronic device (e.g., 500a) displays, via the display generation component (e.g., 504a), a content user interface associated with a collection of content items (e.g., an album, a playlist). In some embodiments, the user interface is a product page of the collection of content items that includes representations of the content items included in the collection of content items and information about the collection of content items, such as an image associated with the collection of content items (e.g., album artwork), the title of the collection, one or more artists associated with the collection, a description of the collection, and/or other information. In some embodiments, such as in FIG. 8F, in accordance with the determination that the user account is subscribed with the second type of subscription to the content delivery service, the content user interface associated with the collection of content items includes a selectable option (e.g., 844a) that, when selected (e.g., via a non-voice input), causes the electronic device (e.g., 500a) to initiate playback of the collection of content items. In some embodiments, in accordance with the determination that the user account is subscribed with the second type of subscription, the user interface includes a first selectable option that, when selected, causes the electronic device to initiate playback of the collection of content items in a predefined order and a second selectable option that, when selected, causes the electronic device to initiate playback of the collection of content items in a shuffled order. In some embodiments, in accordance with the determination that the user account is subscribed with the second type of subscription, the electronic device initiates playback of the collection of content items in response to a voice input or a non-voice input corresponding to a request to play the collection of content items. In some embodiments, in accordance with the determination that the user account is subscribed with the second type of subscription, in response to non-voice inputs selecting indications of content items included in the collection of content items included in the user interface, the electronic device initiates playback of the content items corresponding to the selected indications. In some embodiments, such as in FIG. 8C, in accordance with the determination that the user account is subscribed with the first type of subscription to the content delivery service, the content user interface associated with the collection of content items does not include the selectable option that, when selected, causes the electronic device (e.g., 500a) to initiate playback of the collection of content items. In some embodiments, in accordance with the determination that the user account is subscribed with the first type of subscription, the content user interface includes a visual indication indicating that the electronic device will initiate playback of the collection of content items in response to a voice input. In some embodiments, in accordance with the determination that the user account is subscribed with the first type of subscription, in response to a voice input corresponding to a request to play the collection of content items or one of the content items in the collection, the electronic device initiates playback of the collection of content items or content item in the collection. In some embodiments, in accordance with the determination that the user account is subscribed with the first type of subscription, in response to non-voice inputs selecting indications of content items included in the collection of content items included in the user interface, the electronic device forgoes playback of the content items corresponding to the selected indications or only plays a predetermined subset of the content items as described above with reference to method 700. Forgoing display of the selectable option in accordance with the determination that the user account is subscribed with the first type of subscription and displaying the selectable option in accordance with the determination that the user account is subscribed with the second type of subscription provides an efficient way of accessing content items in accordance with the subscription to which the user is subscribed, which reduces the time and inputs needed to access content items.

In some embodiments, if the user account is subscribed to the content delivery service with the first subscription, the user is entitled to access content in response to voice inputs, but not in response to non-voice inputs (e.g., non-voice selection of user interface elements). In some embodiments, a voice input includes speaking the name of a content item, collection of content items, artist, genre, etc. to be played. In some embodiments, the voice input is directed to a voice assistant of the electronic device or the content delivery service. In some embodiments, the voice assistant is accessed in response to activation of a physical input device in communication with the electronic device (e.g., a button or switch on the electronic device).

In some embodiments, such as in FIG. 8C, the electronic device (e.g., 500a) displays, via the display generation component (e.g., 504a), a content user interface associated with a collection of content items (e.g., an album, a playlist). In some embodiments, the user interface is a product page of the collection of content items that includes representations of the content items included in the collection of content items and information about the collection of content items, such as an image associated with the collection of content items (e.g., album artwork), the title of the collection, one or more artists associated with the collection, a description of the collection, and/or other information. In some embodiments, such as in FIG. 8C, in accordance with the determination that the user account is subscribed with the first type of subscription to the content delivery service, the content user interface associated with the collection of content items includes a visual indication (e.g., 816) that voice input is required to play the collection of content items. In some embodiments, in accordance with the determination that the user account is subscribed with the first type of subscription, the content user interface does not include a selectable option that, when selected, causes the electronic device to play the collection of content items. In some embodiments, the visual indication is displayed at a location in the user interface at which the selectable option would be displayed if the user was subscribed with the second type of subscription. In some embodiments, in accordance with the determination that the user account is subscribed with the first type of subscription, in response to a voice input corresponding to a request to play the collection of content items or one of the content items in the collection, the electronic device initiates playback of the collection of content items or content item in the collection. In some embodiments, in accordance with the determination that the user account is subscribed with the first type of subscription, in response to non-voice inputs selecting indications of content items included in the collection of content items included in the user interface, the electronic device forgoes playback of the content items corresponding to the selected indications or only plays a predetermined subset of the content items as described above with reference to method 700.

In some embodiments, such as in FIG. 8F, in accordance with the determination that the user account is subscribed with the second type of subscription to the content delivery service, the content user interface associated with the collection of content items does not include the visual indication that voice input is required to play the collection of content items. In some embodiments, in accordance with a determination that the user account is subscribed with the second type of subscription, the electronic device displays one or more selectable options that, when selected, cause the electronic device to initiate playback of the collection of content items, as described above, at the location in the user interface at which the visual indication would be displayed if the user were subscribed with the first type of subscription. In some embodiments, in accordance with the determination that the user account is subscribed with the second type of subscription, the electronic device initiates playback of the collection of content items in response to a voice input or a non-voice input corresponding to a request to play the collection of content items. Displaying the visual indication that voice input is required to play the collection of content items in accordance with the determination that the user account is subscribed with the first type of subscription provides an efficient way of educating the user how to access content items with the first type of subscription, which reduces the time and inputs needed to access content with the content delivery service.

In some embodiments, in accordance with a determination that the user is subscribed with the second type of subscription, user interfaces of a content application associated with the content delivery service include selectable options that, when selected, cause the electronic device to initiate playback of respective content items. In some embodiments, in accordance with a determination that the user is subscribed with the first type of subscription, user interfaces of the content application do not include the selectable options because the first type of subscription entitles the user to access content items through voice inputs, but not through non-voice inputs including selection of selectable options.

In some embodiments, such as in FIG. 8F, the content user interface further includes a navigation bar (e.g., 806b) including a plurality of selectable options (e.g., 808a-e) that, when selected, cause the electronic device (e.g., 500a) to present respective user interfaces associated with the content delivery service. In some embodiments, the respective user interfaces include a "listen now" user interface including indications of content items previously played by the user or recommended to the user based on the user's content consumption history. In some embodiments, the respective user interfaces include a radio user interface including indications of (e.g., internet, streaming) radio stations available via the content delivery service. In some embodiments, the respective user interfaces include a library user interface including indications of content items included in a content library associated with the user account. For example, if the user account is subscribed with the first type of subscription, the library includes content items owned by the user. As another example, if the user account is subscribed with the second type of subscription, the library includes content items owned by the user and content items accessible via the content delivery service added to the library by the user. In some embodiments, the respective user interfaces include a search user interface including a user interface element for searching for content items available via the content delivery service that correspond to a respective search term provided by the user. In some embodiments, such as in FIG. 8F, in accordance with the determination that the user account is subscribed with the second type of subscription to the content delivery service, the plurality of selectable options (e.g., 808a-e) include a respective selectable option (e.g., 808b) that, when selected, causes the electronic device (e.g., 500a) to present a browsing user interface that includes a selectable option for initiating playback of a respective content item accessible via the content service. In some embodiments, the browse user interface includes a plurality of representations of content items available via the content delivery service that, when selected, cause the electronic device to initiate playback of the content item corresponding to the selected indication. In some embodiments, the representations are displayed under headers organizing the representations into categories based on characteristics of the content items, such as artist, genre, release date, and the like. In some embodiments, such as in FIG. 8C, in accordance with the determination that the user account is subscribed with the first type of subscription to the content delivery service, the plurality of selectable options (e.g., 808a and 808c-e) do not include the respective selectable option that, when selected, causes the electronic device (e.g., 500a to present the browsing user interface. In some embodiments, if the user is subscribed with the first type of subscription, the browsing user interface is not accessible on the electronic device because the user is not able to browse and/or play content items in response to non-voice inputs selecting indications of content items in the browse user interface without the second type of subscription. Displaying the option to present the browse user interface in accordance with the determination that the user is subscribed with the second type of subscription and forgoing display of the option to present the browse user interface in accordance with the determination that the user is subscribed with the first type of subscription provides an efficient way of accessing content items with the second subscription and reduces distractions in the user interface for the first type of subscription, which reduces the time and inputs needed to access content items via the content delivery service.

In some embodiments, such as in FIG. 8N, the electronic device (e.g., 500a) displays, in the content user interface, a respective selectable option (e.g., 810b) that, when selected, causes the electronic device (e.g., 500a) to add a respective content item to a content library associated with the user account. In some embodiments, if the user account is subscribed with the first type of subscription, the content library includes content items owned by the user. As another example, if the user account is subscribed with the second type of subscription, the content library includes content items owned by the user and content items accessible via the content delivery service added to the library by the user. In some embodiments, a content application associated with the content delivery service includes a content library user interface that includes visual indications of the content items included in the user's content library. In some embodiments, such as in FIG. 8N, the electronic device (e.g., 500a) receives, via the one or more input devices, an (e.g., non-voice) input (e.g., via contact 803n) corresponding to selection of the respective selectable option (e.g., 810b). In some embodiments, in response to receiving the input (e.g., contact 803n in FIG. 8N) corresponding to selection of the respective selectable option (e.g., 810b), in accordance with the determination that the user account is subscribed with the second type of subscription to the content delivery service, the electronic device (e.g., 500a) adds the respective content item to the content library associated with the user account. In some embodiments, after the respective content item is added to the content library associated with the user account, the user is able to access the content item from a library user interface of the content application associated with the content service. In some embodiments, in response to receiving the input (e.g., 803L in FIG. 8L) corresponding to selection of the respective selectable option (e.g., 810b), in accordance with the determination that the user account is subscribed with the first type of subscription to the content delivery service, the electronic device (e.g., 500a) forgoes adding the respective content item to the content library associated with the user account, such as in FIG. 8M. In some embodiments, in accordance with the determination that the user account is subscribed with the first type of subscription, the content library includes content items owned by the user and does not include content items available via the content delivery service that are not owned by the user. In some embodiments, in response to receiving the input (e.g., 803L in FIG. 8L) corresponding to selection of the respective selectable option (e.g., 810b), in accordance with the determination that the user account is subscribed with the first type of subscription to the content delivery service, the electronic device (e.g., 500a) displays, via the display generation component (e.g., 504a), information (e.g., 812b) about the second type of subscription, such as in FIG. 8M. In some embodiments, the information includes an indication that the second type of subscription enables the user to add content items accessible via the content service but not owned by the user to the content library, pricing and renewal information for the second type of subscription, and a selectable option that, when selected, causes the electronic device to initiate a process to subscribe to the second type of subscription. In some embodiments, displaying the information about the second type of subscription in accordance with the determination that the user account is subscribed with the first type of subscription in response to detecting selection of the respective selectable option provides an efficient way of accessing library functionality, which reduces the number of inputs needed to build a content library with the content delivery service.

In some embodiments, the electronic device (e.g., 500a) displays, via the display generation component (e.g., 504a), a user interface associated with a respective content item that includes a selectable option (e.g., 834j) that, when selected, causes the electronic device (e.g., 500a) to present time-synced lyrics associated with the respective content item. In some embodiments, the user interface is associated with a respective content item that is currently playing on the electronic device. In some embodiments, the user interface includes one or more selectable elements for modifying playback of the content item and information about the content item, such as a title and/or artist of the content item and an image associated with the content item (e.g., album artwork). In some embodiments, the time-synced lyrics are indications of the lyrics that update to present a portion of the lyrics corresponding to a portion of the content item that is currently playing as playback of the content item advances. In some embodiments, such as in FIG. 8R, the electronic device (e.g., 500a) receives, via the one or more input devices, an (e.g., non-voice) input (e.g., contact 803r) corresponding to selection of the selectable option (e.g., 834j). In some embodiments, in response to receiving the input (e.g., contact 8034 in FIG. 8R) corresponding to the selection of the selectable option (e.g., 834j), in accordance with the determination that the user account is subscribed with the second type of subscription to the content delivery service, the electronic device (e.g., 500a) displays, via the display generation component (e.g., 504a), the time-synced lyrics (e.g., 838a-d) associated with the respective content item. In some embodiments, the time-synced lyrics are indications of the lyrics that update to present a portion of the lyrics corresponding to a portion of the content item that is currently playing as playback of the content item advances. In some embodiments, the electronic device continues playback of the content item while presenting the time-synched lyrics. In some embodiments, in response to receiving the input (e.g., contact 803p in FIG. 8P) corresponding to the selection of the selectable option (e.g., 834j), in accordance with the determination that the user account is subscribed with the first type of subscription to the content delivery service, the electronic device (e.g., 500a) forgoes displaying the time-synced lyrics associated with the respective content item, such as in FIG. 8Q. In some embodiments, in response to receiving the input (e.g., contact 803p in FIG. 8P) corresponding to the selection of the selectable option (e.g., 834j), in accordance with the determination that the user account is subscribed with the first type of subscription to the content delivery service, the electronic device (e.g., 500a) displays, via the display generation component (e.g., 504a), information (e.g., 812b) about the second type of subscription. In some embodiments, the information includes an indication that the second type of subscription enables the user to view time-synced lyrics associated with content items available via the content delivery service, pricing and renewal information for the second type of subscription, and a selectable option that, when selected, causes the electronic device to initiate a process to subscribe to the second type of subscription. In some embodiments, the electronic device continues playback of the content item while presenting the information about the second type of subscription. In some embodiments, displaying the information about the second type of subscription in accordance with the determination that the user account is subscribed with the first type of subscription in response to detecting selection of the respective selectable option provides an efficient way of accessing time-synced lyrics functionality, which reduces the number of inputs needed to view time-synced lyrics associated with content items available via the content delivery service.

In some embodiments, the electronic device plays content items in an order indicated by a playback queue. In some embodiments, if the user is subscribed with the first type of subscription, the user is able to view the playback queue but unable to play content items in response to detecting a non-voice input selecting an indication of a content item in the queue. In some embodiments, if the user is subscribed with the second type of subscription, the user is able to view the playback queue and able to play content items in response to detecting a non-voice input corresponding to selection of a indication of a content item in the playback queue.

In some embodiments, such as in FIG. 8AA, the electronic device (e.g., 500a) displays, via the display generation component (e.g., 504a), a content user interface including a visual indication (e.g., 846e) of a respective content item that the electronic device (e.g., 504a) is configured to play after playing one or more content items in a playback queue (e.g., including a content item the electronic device is currently playing). In some embodiments, the electronic device plays content items in an order indicated by a playback queue. In some embodiments, the user interface includes visual indications of the content items included in the playback queue presented in the order in which the content items will be played. In some embodiments, the playback queue includes content items placed into the content item playback queue by the user and an autoplay section including content items configured to play after the content items added to the queue by the user. In some embodiments, the content items in the autoplay section of the playback queue are selected by the electronic device based on content consumption history of the user, the content items added to the playback queue by the user, and/or a collection of content items from which the electronic device is playing content items. In some embodiments, such as in FIG. 8AA, the electronic device (e.g., 500a) receives, via the one or more input devices, an (e.g., non-voice) input (e.g., contact 803aa) corresponding to selection of the visual indication (e.g., 846e) of the respective content item (e.g., displayed in the autoplay section of the playback queue). In some embodiments, in response to receiving the input (e.g., via contact 803y in FIG. 8Y) corresponding to selection of the visual indication (e.g., 846e) of the respective content item, such as in FIG. 8Y, in accordance with the determination that the user account is subscribed with the first type of subscription to the content delivery service, in accordance with a determination that the user account owns the respective content item, the electronic device (e.g., 500a) initiates playback of the respective content item (e.g., without initiating playback of one or more content items at positions in the queue between the content item that is currently playing and the respective content item), in a manner similar to the manner in FIG. 8BB. In some embodiments, in response to receiving the input (e.g., via contact 803y in FIG. 8Y) corresponding to selection of the visual indication (e.g., 846e) of the respective content item, such as in FIG. 8Y, in accordance with the determination that the user account is subscribed with the first type of subscription to the content delivery service, in accordance with a determination that the user account does not own the respective content item, the electronic device (e.g., 500*a*) forgoes playback of the respective content item (e.g., and continuing to play the content item that was playing when the input was received), such as in FIG. 8Z. In some embodiments, in accordance with the determination that the user account is subscribed with the first type of subscription to the content delivery service and in accordance with a determination that the user account does not own the respective content item, in response to receiving the input corresponding to selection of the visual indication of the respective content item, the electronic device presents a user interface including information about subscribing to the second type of subscription to the content delivery service. In some embodiments, the information includes an indication that the second type of subscription enables the user to skip ahead in the playback queue, pricing and renewal information for the second type of subscription, and a selectable option that, when selected, causes the electronic device to initiate a process to subscribe to the second type of subscription. In some embodiments, in response to receiving the input (e.g., via contact 803*aa* in FIG. 8AA) corresponding to selection of the visual indication (e.g., 846*e*) of the respective content item, such as in FIG. 8AA, in accordance with the determination that the user account is subscribed with the second type of subscription to the content delivery service, the electronic device (e.g., 500*a*) initiates playback of the respective content item irrespective of whether or not the user account owns the respective content item (e.g., without initiating playback of one or more content items at positions in the queue between the content item that is currently playing and the respective content item), such as in FIG. 8BB. Playing the respective content item in the queue in response to selection of the visual indication of the respective content item provides an efficient way of accessing content items in an order other than the playback queue order, which reduces the time it takes to play the respective content item.

In some embodiments, such as in FIG. 8W, (e.g., while playing a content item), the electronic device (e.g., 500*a*) displays, via the display generation component (e.g., 504*a*), a content user interface including a visual indication (e.g., 846*b*) of a respective content item that is included in a playback queue. In some embodiments, the electronic device plays content items in an order indicated by a playback queue. In some embodiments, the user interface includes visual indications of the content items included in the playback queue presented in the order in which the content items will be played. In some embodiments, such as in FIG. 8W, the electronic device (e.g., 500*a*) receives, via the one or more input devices, an (e.g., non-voice) input (e.g., via contact 803*w*) corresponding to selection of the visual indication (e.g., 846*b*) of the respective content item. In some embodiments, in response to receiving the input (e.g., via contact 803*w* in FIG. 8W) corresponding to selection of the visual indication (e.g., 846*b*) of the respective content item, in accordance with the determination that the user account is subscribed with the second type of subscription to the content delivery service, such as in FIG. 8W, the electronic device (e.g., 500*a*) initiates playback of the respective content item (e.g., without initiating playback of one or more content items at positions in the queue between the content item that is currently playing and the respective content item), such as in FIG. 8X. In some embodiments, in response to receiving the input (e.g., via contact 803*u* in FIG. 8U) corresponding to selection of the visual indication (e.g., 846*b*) of the respective content item, in accordance with the determination that the user account is subscribed with the first type of subscription to the content delivery service, the electronic device (e.g., 500*a*) forgoes playback of the respective content item, such as in FIG. 8V. In some embodiments, in accordance with the determination that the user account is subscribed with the first type of subscription to the content delivery service and in accordance with a determination that the user account does not own the respective content item, in response to receiving the input corresponding to selection of the visual indication of the respective content item, the electronic device presents a user interface including information about subscribing to the second type of subscription to the content delivery service. In some embodiments, the information includes an indication that the second type of subscription enables the user to skip ahead in the playback queue, pricing and renewal information for the second type of subscription, and a selectable option that, when selected, causes the electronic device to initiate a process to subscribe to the second type of subscription. In some embodiments, the playback queue includes only content items available via the content delivery service and does not include content items owned by the user, so the user is unable to play the content items in the queue in response to a non-voice input if the user account is subscribed with the first type of subscription. In some embodiments, the playback queue includes only content items owned by the user and the electronic device plays content items owned by the user in response to a non-voice input selecting indications of the content items in the queue irrespective of which type of subscription the user account is subscribed to. In some embodiments, it is not possible to include both content items owned by the user and content items accessed via the content delivery service in the same playback queue.

Playing the respective content item in the queue in response to selection of the visual indication of the respective content item provides an efficient way of accessing content items in an order other than the playback queue order, which reduces the time it takes to play the respective content item.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the ways of accessing content items via a content delivery service described above with reference to method 900 optionally have one or more of the characteristics of the ways of subscribing to content delivery services described herein with reference to other methods described herein (e.g., method 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 9 are, optionally, implemented by components depicted in FIGS. 1A-1B. For example, displaying operation 902 and receiving operation 904 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, determining the content consumption history associated with a user account enables the electronic device to recommend additional content items that are relevant to the user. Accordingly, use of such personal information data enables users to discover content relevant to their tastes. Further, other uses for personal information data that benefit the user are also contemplated by the present disclosure. For instance, subscription information may be used to provide the user with additional portions of content items.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can select not to share information about their content consumption history.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users are able to browse, play, stream, and share (e.g., portions of) content without sharing their content consumption history.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method comprising:
at an electronic device in communication with a display generation component and one or more input devices:
displaying, via the display generation component, a content user interface that includes a representation of a content item;

while displaying the content user interface, receiving, via the one or more input devices, a user input corresponding to selection of the representation of the content item; and in response to receiving the user input:
  in accordance with a determination that a user account of the electronic device is subscribed, with a first type of subscription, to a content delivery service that provides access to the content item, initiating playback of a first predetermined subset of the content item without playing a second subset of the content item; and
  in accordance with a determination that the user account is subscribed, with a second type of subscription different from the first type of subscription, to the content delivery service, initiating playback of the content item, including the first predetermined subset of the content item and the second subset of the content item;

while the user account is subscribed to the first type of subscription, receiving, via the one or more input devices, a voice input corresponding to a request to play the content item; and in response to the voice input, initiating playback of the content item, including the first predetermined subset of the content item and the second subset of the content item, wherein the first type of subscription to the content delivery service allows for access to the first predetermined subset of the content item and the second subset of the content item in response to voice input, but does not allow access to the second subset of the content item in response to non-voice input.

2. The method of claim 1, further comprising:
in accordance with the determination that the user account is subscribed with the first type of subscription to the content delivery service, presenting information about how to initiate playback of the content item, including the second subset of the content item.

3. The method of claim 1, further comprising:
in response to receiving the user input:
  in accordance with a determination that the user account is not subscribed to the first type of subscription or the second type of subscription:
    presenting information about subscribing to the first type of subscription and presenting information about subscribing to the second type of subscription; and
    initiating playback of the first predetermined subset of the content item without playing the second subset of the content item.

4. The method of claim 1, further comprising:
while the user account is subscribed to the first type of subscription, displaying, via the display generation component, a visual indication of a voice input for accessing one or more respective content items with the first type of subscription.

5. The method of claim 1, further comprising:
displaying, via the display generation component, a content user interface for searching for content items accessible via the content delivery service, wherein the content user interface for searching includes a visual indication of a suggested voice input for accessing information about content items assessable via the content delivery service.

6. The method of claim 1, further comprising:
displaying, via the display generation component, a content user interface that includes an indication of a respective content item previously played via the content delivery service;
receiving, via the one or more input devices, an input corresponding to selection of the indication of the respective content item; and
in response to receiving the input corresponding to selection of the indication of the respective content item:
  in accordance with a determination that the user account of the electronic device is subscribed with the first type of subscription, initiating playback of the respective content item; and
  in accordance with a determination that the user account of the electronic device is subscribed with the second type of subscription, initiating playback of the respective content item.

7. The method of claim 1, further comprising:
displaying, via the display generation component, a content user interface associated with a collection of content items, wherein:
  in accordance with the determination that the user account is subscribed with the second type of subscription to the content delivery service, the content user interface associated with the collection of content items includes a selectable option that, when selected, causes the electronic device to initiate playback of the collection of content items; and
  in accordance with the determination that the user account is subscribed with the first type of subscription to the content delivery service, the content user interface associated with the collection of content items does not include the selectable option that, when selected, causes the electronic device to initiate playback of the collection of content items.

8. The method of claim 1, further comprising:
displaying, via the display generation component, a content user interface associated with a collection of content items, wherein:
  in accordance with the determination that the user account is subscribed with the first type of subscription to the content delivery service, the content user interface associated with the collection of content items includes a visual indication that voice input is required to play the collection of content items; and
  in accordance with the determination that the user account is subscribed with the second type of subscription to the content delivery service, the content user interface associated with the collection of content items does not include the visual indication that voice input is required to play the collection of content items.

9. The method of claim 1, wherein:
the content user interface further includes a navigation bar including a plurality of selectable options that, when selected, cause the electronic device to present respective user interfaces associated with the content delivery service,
in accordance with the determination that the user account is subscribed with the second type of subscription to the content delivery service, the plurality of selectable options include a respective selectable option that, when selected, causes the electronic device to present a browsing user interface that includes a selectable option for initiating playback of a respective content item accessible via the content delivery service, and in accordance with the determination that the user account is subscribed with the first type of subscription to the content delivery service, the plurality of selectable options do not include the respective selectable option that, when selected, causes the electronic device to present the browsing user interface.

10. The method of claim 1, further comprising:
displaying, in the content user interface, a respective selectable option that, when selected, causes the electronic device to add a respective content item to a content library associated with the user account;
receiving, via the one or more input devices, an input corresponding to selection of the respective selectable option; and
in response to receiving the input corresponding to selection of the respective selectable option:
  in accordance with the determination that the user account is subscribed with the second type of subscription to the content delivery service, adding the respective content item to the content library associated with the user account; and
  in accordance with the determination that the user account is subscribed with the first type of subscription to the content delivery service:
    forgoing adding the respective content item to the content library associated with the user account; and
    displaying, via the display generation component, information about the second type of subscription.

11. The method of claim 1, further comprising:
displaying, via the display generation component, a user interface associated with a respective content item that includes a selectable option that, when selected, causes the electronic device to present time-synced lyrics associated with the respective content item;
receiving, via the one or more input devices, an input corresponding to selection of the selectable option; and
in response to receiving the input corresponding to the selection of the selectable option:
  in accordance with the determination that the user account is subscribed with the second type of subscription to the content delivery service, displaying, via the display generation component, the time-synced lyrics associated with the respective content item; and
  in accordance with the determination that the user account is subscribed with the first type of subscription to the content delivery service:
    forgoing displaying the time-synced lyrics associated with the respective content item; and
    displaying, via the display generation component, information about the second type of subscription.

12. The method of claim 1, further comprising:
displaying, via the display generation component, a content user interface including a visual indication of a respective content item that the electronic device is configured to play after playing one or more content items in a playback queue;
receiving, via the one or more input devices, an input corresponding to selection of the visual indication of the respective content item; and
in response to receiving the input corresponding to selection of the visual indication of the respective content item:
  in accordance with the determination that the user account is subscribed with the first type of subscription to the content delivery service:
    in accordance with a determination that the user account owns the respective content item, initiating playback of the respective content item; and
    in accordance with a determination that the user account does not own the respective content item, forgoing playback of the respective content item; and
  in accordance with the determination that the user account is subscribed with the second type of subscription to the content delivery service, initiating playback of the respective content item irrespective of whether or not the user account owns the respective content item.

13. The method of claim 1, further comprising:
displaying, via the display generation component, a content user interface including a visual indication of a respective content item that is included in a playback queue;
receiving, via the one or more input devices, an input corresponding to selection of the visual indication of the respective content item; and
in response to receiving the input corresponding to selection of the visual indication of the respective content item:
  in accordance with the determination that the user account is subscribed with the second type of subscription to the content delivery service, initiating playback of the respective content item; and
  in accordance with the determination that the user account is subscribed with the first type of subscription to the content delivery service, forgoing playback of the respective content item.

14. An electronic device, comprising:
one or more processors;
memory; and
one or more programs, wherein the one or more programs are stored in the memory and configured to be executed by the one or more processors, the one or more programs including instructions for:
  displaying, via a display generation component, a content user interface that includes a representation of a content item;
  while displaying the content user interface, receiving, via one or more input devices, a user input corresponding to selection of the representation of the content item; and
  in response to receiving the user input:
    in accordance with a determination that a user account of the electronic device is subscribed, with a first type of subscription, to a content delivery service that provides access to the content item, initiating playback of a first predetermined subset of the content item without playing a second subset of the content item; and
    in accordance with a determination that the user account is subscribed, with a second type of subscription different from the first type of subscription, to the content delivery service, initiating playback of the content item, including the first predetermined subset of the content item and the second subset of the content item;
  while the user account is subscribed to the first type of subscription, receiving, via the one or more input devices, a voice input corresponding to a request to play the content item; and in response to the voice input, initiating playback of the content item, including the first predetermined subset of the content item and the second subset of the content item, wherein the first type of subscription to the content delivery service allows for access to the first predetermined subset of the content item and the second subset of the content item in response to voice input, but does not allow access to the second subset of the content item in response to non-voice input.

15. A non-transitory computer readable storage medium storing one or more programs, the one or more programs comprising instructions, which when executed by one or more processors of an electronic device, cause the electronic device to perform a method comprising:

displaying, via a display generation component, a content user interface that includes a representation of a content item;

while displaying the content user interface, receiving, via one or more input devices, a user input corresponding to selection of the representation of the content item; and in response to receiving the user input:
in accordance with a determination that a user account of the electronic device is subscribed, with a first type of subscription, to a content delivery service that provides access to the content item, initiating playback of a first predetermined subset of the content item without playing a second subset of the content item; and in accordance with a determination that the user account is subscribed, with a second type of subscription different from the first type of subscription, to the content delivery service, initiating playback of the content item, including the first predetermined subset of the content item and the second subset of the content item;

while the user account is subscribed to the first type of subscription, receiving, via the one or more input devices, a voice input corresponding to a request to play the content item; and in response to the voice input, initiating playback of the content item, including the first predetermined subset of the content item and the second subset of the content item, wherein the first type of subscription to the content delivery service allows for access to the first predetermined subset of the content item and the second subset of the content item in response to voice input, but does not allow access to the second subset of the content item in response to non-voice input.

16. The method of claim 1, wherein receiving, via the one or more input devices, the user input corresponding to selection of the representation of the content item comprises receiving, via the one or more input devices, a non-voice user input corresponding to selection of the representation of the content item.

17. The method of claim 1, further comprising:
while the user account is subscribed to the second type of subscription, receiving, via the one or more input devices, a second voice input corresponding to a request to play the content item; and
in response to the second voice input, initiating playback of the content item, including the first predetermined subset of the content item and the second subset of the content item.

18. The electronic device of claim 14, the one or more programs further including instructions for:
in accordance with the determination that the user account is subscribed with the first type of subscription to the content delivery service, presenting information about how to initiate playback of the content item, including the second subset of the content item.

19. The electronic device of claim 14, the one or more programs further including instructions for:
in response to receiving the user input:
in accordance with a determination that the user account is not subscribed to the first type of subscription or the second type of subscription:
presenting information about subscribing to the first type of subscription and presenting information about subscribing to the second type of subscription; and
initiating playback of the first predetermined subset of the content item without playing the second subset of the content item.

20. The electronic device of claim 14, the one or more programs further including instructions for:
while the user account is subscribed to the first type of subscription, displaying, via the display generation component, a visual indication of a voice input for accessing one or more respective content items with the first type of subscription.

21. The electronic device of claim 14, the one or more programs further including instructions for:
displaying, via the display generation component, a content user interface for searching for content items accessible via the content delivery service, wherein the content user interface for searching includes a visual indication of a suggested voice input for accessing information about content items assessable via the content delivery service.

22. The electronic device of claim 14, the one or more programs further including instructions for:
displaying, via the display generation component, a content user interface that includes an indication of a respective content item previously played via the content delivery service;
receiving, via the one or more input devices, an input corresponding to selection of the indication of the respective content item; and
in response to receiving the input corresponding to selection of the indication of the respective content item:
in accordance with a determination that the user account of the electronic device is subscribed with the first type of subscription, initiating playback of the respective content item; and
in accordance with a determination that the user account of the electronic device is subscribed with the second type of subscription, initiating playback of the respective content item.

23. The electronic device of claim 14, the one or more programs further including instructions for:
displaying, via the display generation component, a content user interface associated with a collection of content items, wherein:
in accordance with the determination that the user account is subscribed with the second type of subscription to the content delivery service, the content user interface associated with the collection of content items includes a selectable option that, when selected, causes the electronic device to initiate playback of the collection of content items; and in accordance with the determination that the user account is subscribed with the first type of subscription to the content delivery service, the content user interface associated with the collection of content items does not include the selectable option that, when selected, causes the electronic device to initiate playback of the collection of content items.

24. The electronic device of claim 14, the one or more programs further including instructions for:
displaying, via the display generation component, a content user interface associated with a collection of content items, wherein:
in accordance with the determination that the user account is subscribed with the first type of subscription to the content delivery service, the content user interface associated with the collection of content items includes a visual indication that voice input is required to play the collection of content items; and
in accordance with the determination that the user account is subscribed with the second type of subscription to the content delivery service, the content user interface associated with the collection of content items does not include the visual indication that voice input is required to play the collection of content items.

25. The electronic device of claim 14, wherein:
the content user interface further includes a navigation bar including a plurality of selectable options that, when selected, cause the electronic device to present respective user interfaces associated with the content delivery service,
in accordance with the determination that the user account is subscribed with the second type of subscription to the content delivery service, the plurality of selectable options include a respective selectable option that, when selected, causes the electronic device to present a browsing user interface that includes a selectable option for initiating playback of a respective content item accessible via the content delivery service, and
in accordance with the determination that the user account is subscribed with the first type of subscription to the content delivery service, the plurality of selectable options do not include the respective selectable option that, when selected, causes the electronic device to present the browsing user interface.

26. The electronic device of claim 14, the one or more programs further including instructions for:
displaying, in the content user interface, a respective selectable option that, when selected, causes the electronic device to add a respective content item to a content library associated with the user account;
receiving, via the one or more input devices, an input corresponding to selection of the respective selectable option; and
in response to receiving the input corresponding to selection of the respective selectable option:
in accordance with the determination that the user account is subscribed with the second type of subscription to the content delivery service, adding the respective content item to the content library associated with the user account; and
in accordance with the determination that the user account is subscribed with the first type of subscription to the content delivery service:
forgoing adding the respective content item to the content library associated with the user account; and
displaying, via the display generation component, information about the second type of subscription.

27. The electronic device of claim 14, the one or more programs further including instructions for:
displaying, via the display generation component, a user interface associated with a respective content item that includes a selectable option that, when selected, causes the electronic device to present time-synced lyrics associated with the respective content item;
receiving, via the one or more input devices, an input corresponding to selection of the selectable option; and
in response to receiving the input corresponding to the selection of the selectable option:
in accordance with the determination that the user account is subscribed with the second type of subscription to the content delivery service, displaying, via the display generation component, the time-synced lyrics associated with the respective content item; and
in accordance with the determination that the user account is subscribed with the first type of subscription to the content delivery service:
forgoing displaying the time-synced lyrics associated with the respective content item; and
displaying, via the display generation component, information about the second type of subscription.

28. The electronic device of claim 14, the one or more programs further including instructions for:
displaying, via the display generation component, a content user interface including a visual indication of a respective content item that the electronic device is configured to play after playing one or more content items in a playback queue;
receiving, via the one or more input devices, an input corresponding to selection of the visual indication of the respective content item; and
in response to receiving the input corresponding to selection of the visual indication of the respective content item:
in accordance with the determination that the user account is subscribed with the first type of subscription to the content delivery service:
in accordance with a determination that the user account owns the respective content item, initiating playback of the respective content item; and
in accordance with a determination that the user account does not own the respective content item, forgoing playback of the respective content item; and
in accordance with the determination that the user account is subscribed with the second type of subscription to the content delivery service, initiating playback of the respective content item irrespective of whether or not the user account owns the respective content item.

29. The electronic device of claim 14, the one or more programs further including instructions for:
displaying, via the display generation component, a content user interface including a visual indication of a respective content item that is included in a playback queue;
receiving, via the one or more input devices, an input corresponding to selection of the visual indication of the respective content item; and
in response to receiving the input corresponding to selection of the visual indication of the respective content item:

in accordance with the determination that the user account is subscribed with the second type of subscription to the content delivery service, initiating playback of the respective content item; and in accordance with the determination that the user account is subscribed with the first type of subscription to the content delivery service, forgoing playback of the respective content item.

30. The electronic device of claim 14, wherein receiving, via the one or more input devices, the user input corresponding to selection of the representation of the content item comprises receiving, via the one or more input devices, a non-voice user input corresponding to selection of the representation of the content item.

31. The electronic device of claim 14, the one or more programs further including instructions for:

while the user account is subscribed to the second type of subscription, receiving, via the one or more input devices, a second voice input corresponding to a request to play the content item; and in response to the second voice input, initiating playback of the content item, including the first predetermined subset of the content item and the second subset of the content item.

32. The non-transitory computer readable storage medium of claim 15, the method further comprising:

in accordance with the determination that the user account is subscribed with the first type of subscription to the content delivery service, presenting information about how to initiate playback of the content item, including the second subset of the content item.

33. The non-transitory computer readable storage medium of claim 15, the method further comprising:

in response to receiving the user input:

in accordance with a determination that the user account is not subscribed to the first type of subscription or the second type of subscription:

presenting information about subscribing to the first type of subscription and presenting information about subscribing to the second type of subscription; and initiating playback of the first predetermined subset of the content item without playing the second subset of the content item.

34. The non-transitory computer readable storage medium of claim 15, the method further comprising:

while the user account is subscribed to the first type of subscription, displaying, via the display generation component, a visual indication of a voice input for accessing one or more respective content items with the first type of subscription.

35. The non-transitory computer readable storage medium of claim 15, the method further comprising:

displaying, via the display generation component, a content user interface for searching for content items accessible via the content delivery service, wherein the content user interface for searching includes a visual indication of a suggested voice input for accessing information about content items assessable via the content delivery service.

36. The non-transitory computer readable storage medium of claim 15, the method further comprising:

displaying, via the display generation component, a content user interface that includes an indication of a respective content item previously played via the content delivery service;

receiving, via the one or more input devices, an input corresponding to selection of the indication of the respective content item; and in response to receiving the input corresponding to selection of the indication of the respective content item:

in accordance with a determination that the user account of the electronic device is subscribed with the first type of subscription, initiating playback of the respective content item; and in accordance with a determination that the user account of the electronic device is subscribed with the second type of subscription, initiating playback of the respective content item.

37. The non-transitory computer readable storage medium of claim 15, the method further comprising:

displaying, via the display generation component, a content user interface associated with a collection of content items, wherein:

in accordance with the determination that the user account is subscribed with the second type of subscription to the content delivery service, the content user interface associated with the collection of content items includes a selectable option that, when selected, causes the electronic device to initiate playback of the collection of content items; and in accordance with the determination that the user account is subscribed with the first type of subscription to the content delivery service, the content user interface associated with the collection of content items does not include the selectable option that, when selected, causes the electronic device to initiate playback of the collection of content items.

38. The non-transitory computer readable storage medium of claim 15, the method further comprising:

displaying, via the display generation component, a content user interface associated with a collection of content items, wherein:

in accordance with the determination that the user account is subscribed with the first type of subscription to the content delivery service, the content user interface associated with the collection of content items includes a visual indication that voice input is required to play the collection of content items; and in accordance with the determination that the user account is subscribed with the second type of subscription to the content delivery service, the content user interface associated with the collection of content items does not include the visual indication that voice input is required to play the collection of content items.

39. The non-transitory computer readable storage medium of claim 15, wherein:

the content user interface further includes a navigation bar including a plurality of selectable options that, when selected, cause the electronic device to present respective user interfaces associated with the content delivery service, in accordance with the determination that the user account is subscribed with the second type of subscription to the content delivery service, the plurality of selectable options include a respective selectable option that, when selected, causes the electronic device to present a browsing user interface that includes a selectable option for initiating playback of a respective content item accessible via the content delivery service, and in accordance with the determination that the user account is subscribed with the first type of subscription to the content delivery service, the plurality of selectable options do not include the respective selectable option that, when selected, causes the electronic device to present the browsing user interface.

40. The non-transitory computer readable storage medium of claim 15, the method further comprising:
displaying, in the content user interface, a respective selectable option that, when selected, causes the electronic device to add a respective content item to a content library associated with the user account;
receiving, via the one or more input devices, an input corresponding to selection of the respective selectable option; and
in response to receiving the input corresponding to selection of the respective selectable option:
in accordance with the determination that the user account is subscribed with the second type of subscription to the content delivery service, adding the respective content item to the content library associated with the user account; and
in accordance with the determination that the user account is subscribed with the first type of subscription to the content delivery service:
forgoing adding the respective content item to the content library associated with the user account; and
displaying, via the display generation component, information about the second type of subscription.

41. The non-transitory computer readable storage medium of claim 15, the method further comprising:
displaying, via the display generation component, a user interface associated with a respective content item that includes a selectable option that, when selected, causes the electronic device to present time-synced lyrics associated with the respective content item;
receiving, via the one or more input devices, an input corresponding to selection of the selectable option; and
in response to receiving the input corresponding to the selection of the selectable option:
in accordance with the determination that the user account is subscribed with the second type of subscription to the content delivery service, displaying, via the display generation component, the time-synced lyrics associated with the respective content item; and
in accordance with the determination that the user account is subscribed with the first type of subscription to the content delivery service:
forgoing displaying the time-synced lyrics associated with the respective content item; and
displaying, via the display generation component, information about the second type of subscription.

42. The non-transitory computer readable storage medium of claim 15, the method further comprising:
displaying, via the display generation component, a content user interface including a visual indication of a respective content item that the electronic device is configured to play after playing one or more content items in a playback queue;
receiving, via the one or more input devices, an input corresponding to selection of the visual indication of the respective content item; and
in response to receiving the input corresponding to selection of the visual indication of the respective content item:
in accordance with the determination that the user account is subscribed with the first type of subscription to the content delivery service:
in accordance with a determination that the user account owns the respective content item, initiating playback of the respective content item; and
in accordance with a determination that the user account does not own the respective content item, forgoing playback of the respective content item; and
in accordance with the determination that the user account is subscribed with the second type of subscription to the content delivery service, initiating playback of the respective content item irrespective of whether or not the user account owns the respective content item.

43. The non-transitory computer readable storage medium of claim 15, the method further comprising:
displaying, via the display generation component, a content user interface including a visual indication of a respective content item that is included in a playback queue;
receiving, via the one or more input devices, an input corresponding to selection of the visual indication of the respective content item; and
in response to receiving the input corresponding to selection of the visual indication of the respective content item:
in accordance with the determination that the user account is subscribed with the second type of subscription to the content delivery service, initiating playback of the respective content item; and
in accordance with the determination that the user account is subscribed with the first type of subscription to the content delivery service, forgoing playback of the respective content item.

44. The non-transitory computer readable storage medium of claim 15, wherein receiving, via the one or more input devices, the user input corresponding to selection of the representation of the content item comprises receiving, via the one or more input devices, a non-voice user input corresponding to selection of the representation of the content item.

45. The non-transitory computer readable storage medium of claim 15, the method further comprising:
while the user account is subscribed to the second type of subscription, receiving, via the one or more input devices, a second voice input corresponding to a request to play the content item; and
in response to the second voice input, initiating playback of the content item, including the first predetermined subset of the content item and the second subset of the content item.

* * * * *